US011291317B2

(12) United States Patent
Weitsman et al.

(10) Patent No.: US 11,291,317 B2
(45) Date of Patent: Apr. 5, 2022

(54) MARKING APPARATUS AND KIT FOR BLIND MOUNT ALIGNMENT

(71) Applicant: CW Consulting Associates, LLC, Saratoga, CA (US)

(72) Inventors: Kevin L. Weitsman, Saratoga, CA (US); Ronald L. Johnson, San Jose, CA (US); Yugen Patrick Lockhart, Palo Alto, CA (US)

(73) Assignee: CW Consulting Associates, LLC, Saratoga, CA (US)

( * ) Notice: Subject to any disclaimer, the term of this patent is extended or adjusted under 35 U.S.C. 154(b) by 0 days.

(21) Appl. No.: 17/425,938

(22) PCT Filed: Jan. 28, 2020

(86) PCT No.: PCT/US2020/015469
§ 371 (c)(1),
(2) Date: Jul. 26, 2021

(87) PCT Pub. No.: WO2020/160033
PCT Pub. Date: Aug. 6, 2020

(65) Prior Publication Data
US 2022/0039567 A1  Feb. 10, 2022

Related U.S. Application Data

(60) Provisional application No. 62/813,649, filed on Mar. 4, 2019, provisional application No. 62/797,907, filed on Jan. 28, 2019.

(51) Int. Cl.
*A47G 1/20* (2006.01)
*B25H 7/04* (2006.01)
(Continued)

(52) U.S. Cl.
CPC .............. *A47G 1/205* (2013.01); *B25H 7/045* (2013.01); *B25H 7/04* (2013.01); *B43K 23/001* (2013.01);
(Continued)

(58) Field of Classification Search
CPC .......... A47G 1/205; B25H 7/045; B25H 7/04; B43K 23/001; B43K 23/016;
(Continued)

(56) References Cited

U.S. PATENT DOCUMENTS 726,086 A * 4/1903 McAlpine ................ B25H 7/04
33/574
2,343,499 A   3/1944 Edwards
(Continued)

FOREIGN PATENT DOCUMENTS

WO   2017053636 A1   3/2017

OTHER PUBLICATIONS

Oct. 24, 2014 Internet Archive screen capture of Home Depot web page for 20 lb. Large Keyhole Hangers, Model #50236.
(Continued)

*Primary Examiner* — Nimeshkumar D Patel
*Assistant Examiner* — Tania Courson
(74) *Attorney, Agent, or Firm* — Lance M. Pritikin

(57) ABSTRACT

A marking apparatus facilitates blind mounting of an object to a mounting surface in a desired alignment using the object as an alignment template. One end of the apparatus is configured to be affixed to a mounting slot or edge of the object, then the other end used to mark the appropriate supporting fastener location on the mounting surface. The object's mounting slots or edges may be represented by mounting hardware components that are flush with, recessed in, or protruding from the local planar surface of the object. To accommodate a broad variety of mounting conditions and (Continued)

mounting hardware, certain embodiments of the apparatus may include selectively adjustable or interchangeable head adapters, distinct head and retention configurations and/or a hardware relief channel A channel adapter is disclosed for use with embodiments of the apparatus having a hardware relief channel. Embodiments of a slot-securable point marking tool are also disclosed.

35 Claims, 52 Drawing Sheets

(51) Int. Cl.
  *F16B 21/09* (2006.01)
  *F16M 11/04* (2006.01)
  *F16B 19/10* (2006.01)
  *B43K 23/016* (2006.01)
  *F16M 13/00* (2006.01)
  *F16M 13/02* (2006.01)
  *B43K 23/00* (2006.01)

(52) U.S. Cl.
  CPC ........... *B43K 23/016* (2013.01); *F16B 19/109* (2013.01); *F16B 21/09* (2013.01); *F16M 11/041* (2013.01); *F16M 13/00* (2013.01); *F16M 13/02* (2013.01)

(58) Field of Classification Search
  CPC ..... F16B 19/109; F16B 21/09; F16M 11/041; F16M 13/00; F16M 13/02
  See application file for complete search history.

(56) References Cited

U.S. PATENT DOCUMENTS

| | | | |
|---|---|---|---|
| 4,202,108 A | 5/1980 | Adams, Jr. et al. | |
| 4,382,337 A | 5/1983 | Bendick | |
| 4,392,425 A | 7/1983 | Capezzuto et al. | |
| 4,466,193 A | 8/1984 | Astle | |
| 4,512,084 A | 4/1985 | Lieberman | |
| 4,794,857 A | 1/1989 | Waters, Sr. | |
| 4,837,942 A | 6/1989 | Watts | |
| 5,477,620 A | 12/1995 | Barnett | |
| 5,927,919 A | 7/1999 | Blankenship et al. | |
| 6,360,661 B1 | 3/2002 | Cheung | |
| 6,421,928 B1 * | 7/2002 | Miller | A47G 1/205 33/520 |
| 6,574,880 B2 | 6/2003 | Lombardo | |
| 6,848,192 B2 | 2/2005 | Partin | |
| 6,898,862 B1 * | 5/2005 | Oberst | A47G 1/205 33/574 |
| 6,908,270 B1 | 6/2005 | Iwata | |
| 6,952,887 B2 | 10/2005 | Muchnik | |
| 6,971,184 B2 | 12/2005 | Prevost | |
| 6,978,551 B2 | 12/2005 | Krake et al. | |
| 6,983,691 B2 | 1/2006 | Shih | |
| 7,032,872 B2 | 4/2006 | Sullivan | |
| 7,185,442 B2 | 3/2007 | Grillo | |
| 7,293,925 B1 | 11/2007 | Sanseviero | |
| 7,350,312 B1 | 4/2008 | Grillo | |
| 7,497,028 B2 | 3/2009 | Nevers et al. | |
| D674,262 S * | 1/2013 | Dressel | D8/64 |
| 8,458,979 B2 | 6/2013 | Ebner et al. | |
| 9,555,540 B1 | 1/2017 | Weitsman | |
| 10,518,403 B2 * | 12/2019 | Weitsman | A47G 1/205 |
| 10,543,593 B2 * | 1/2020 | Weitsman | B25H 7/04 |
| 2002/0083612 A1 | 7/2002 | Prather | |
| 2004/0049936 A1 * | 3/2004 | Newman | B25H 7/04 33/613 |
| 2004/0098875 A1 | 5/2004 | Gould | |
| 2006/0075650 A1 | 4/2006 | Tatum | |
| 2007/0119068 A1 | 5/2007 | Horst | |
| 2007/0283588 A1 | 12/2007 | Gardner et al. | |
| 2008/0315063 A1 | 12/2008 | Gallien | |
| 2009/0165319 A1 * | 7/2009 | Gallien | A47G 1/205 33/666 |
| 2009/0193674 A1 | 8/2009 | Megahed | |
| 2011/0174953 A1 | 7/2011 | Ruiz et al. | |
| 2015/0034794 A1 | 2/2015 | Durante | |
| 2015/0144756 A1 | 5/2015 | Miller | |
| 2017/0008161 A1 | 1/2017 | Weitsman | |
| 2017/0273479 A1 | 9/2017 | Snyder | |
| 2017/0303709 A1 | 10/2017 | Ulloa et al. | |
| 2018/0370017 A1 | 12/2018 | Weitsman | |
| 2019/0070877 A1 | 3/2019 | Flores | |

OTHER PUBLICATIONS

Mar. 12, 2015 Internet Archive screen capture of Parts Express web page for Keyhole Speaker Hanging Kit, Hangman Model KSH4-B.
Sep. 2, 2013 Internet Archive screen capture of E-VisionUK Hotel Solutions web page for Keyhole Brackets.

* cited by examiner

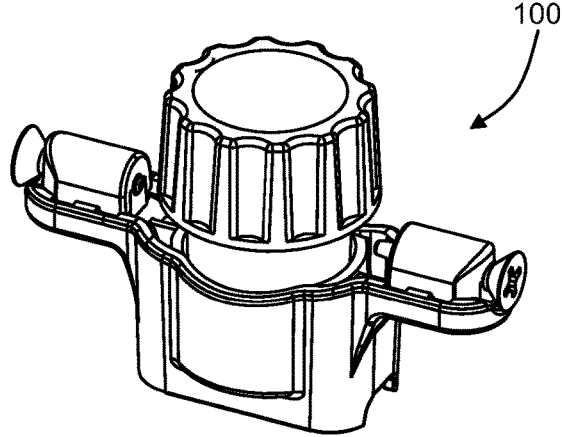
FIG. 1
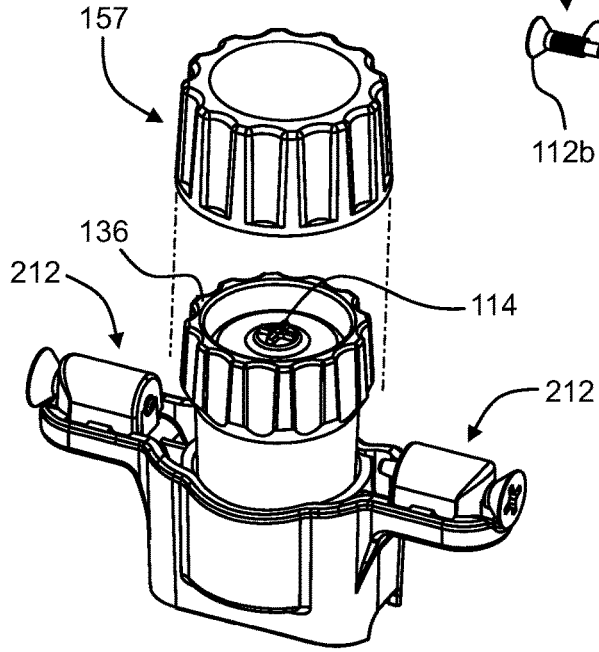
FIG. 2
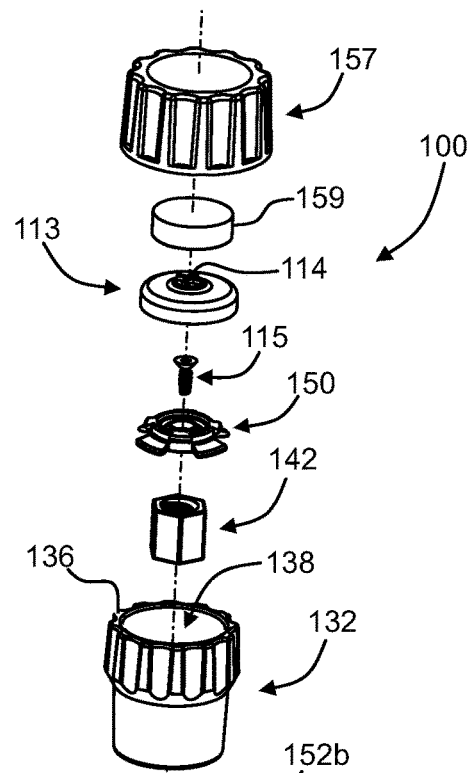
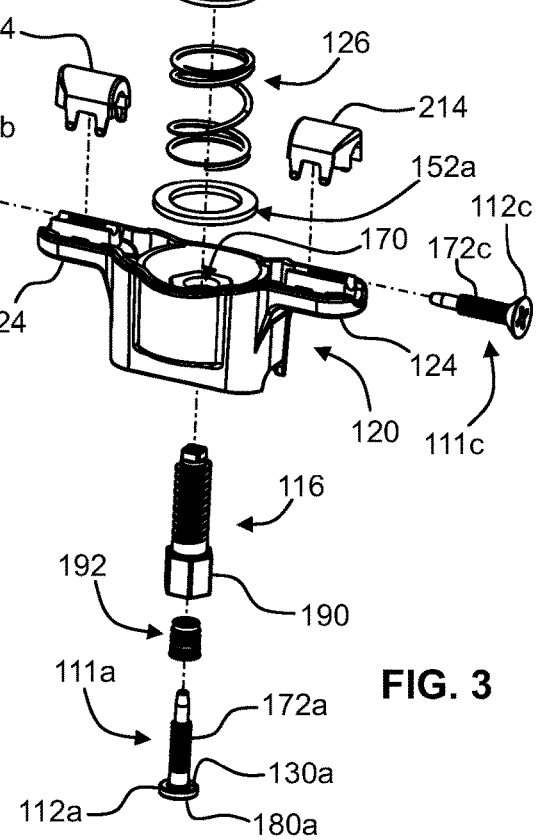
FIG. 3

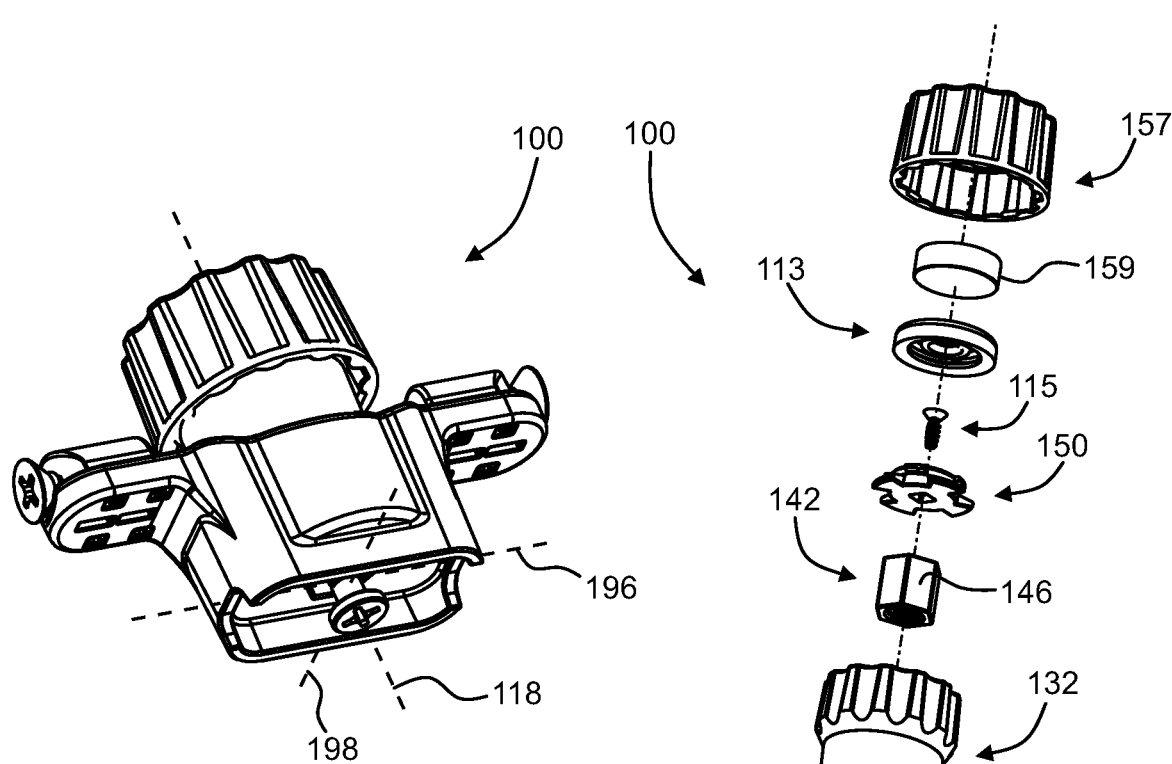
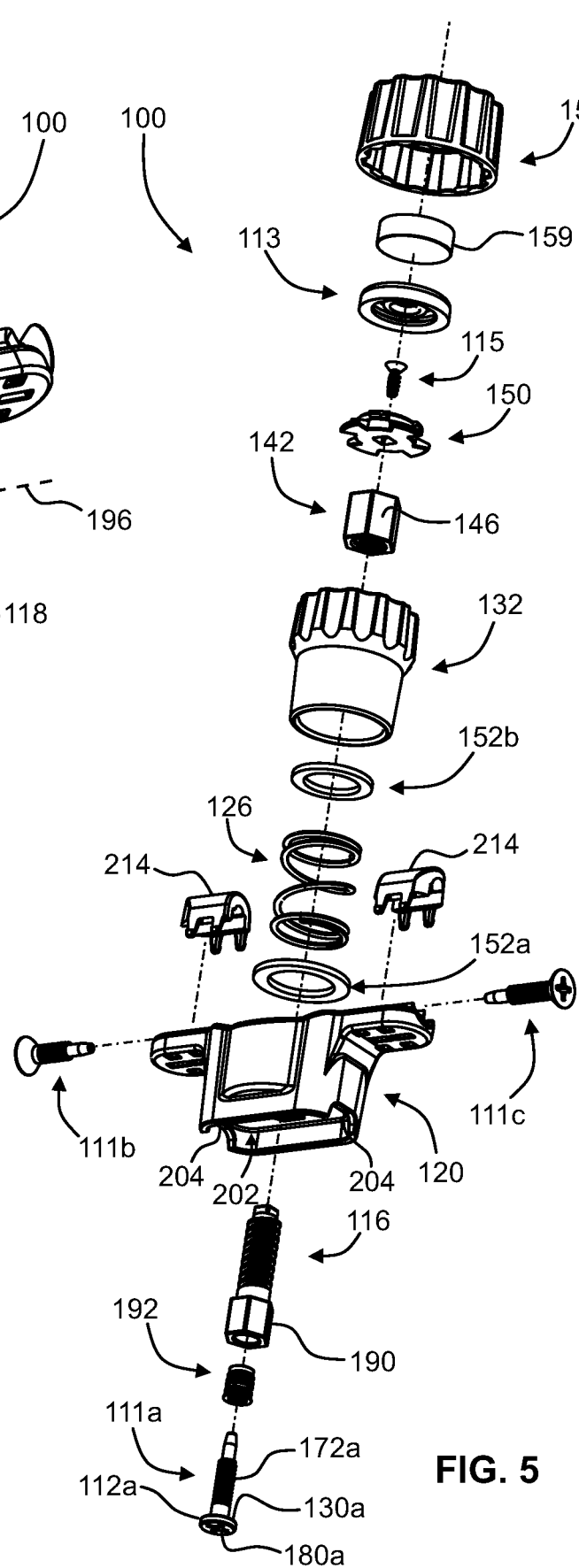
FIG. 4
FIG. 5

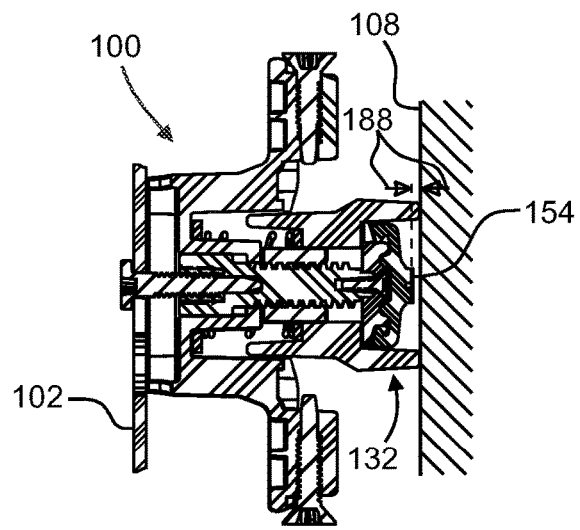
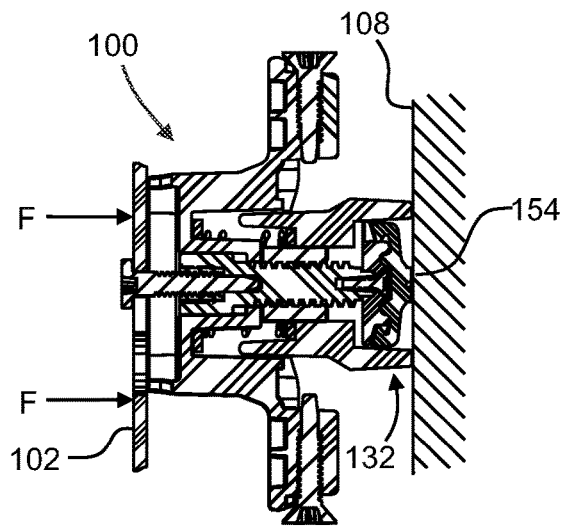
FIG. 29  FIG. 30
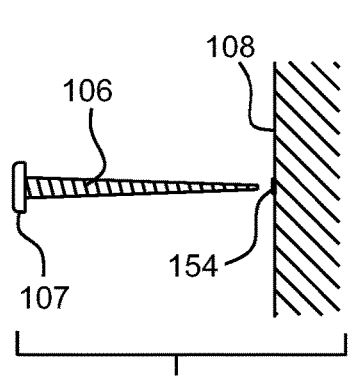
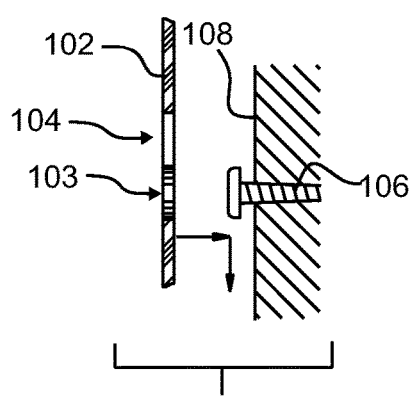
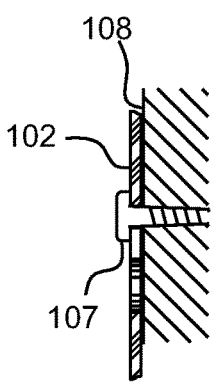
FIG. 31  FIG. 32  FIG. 33

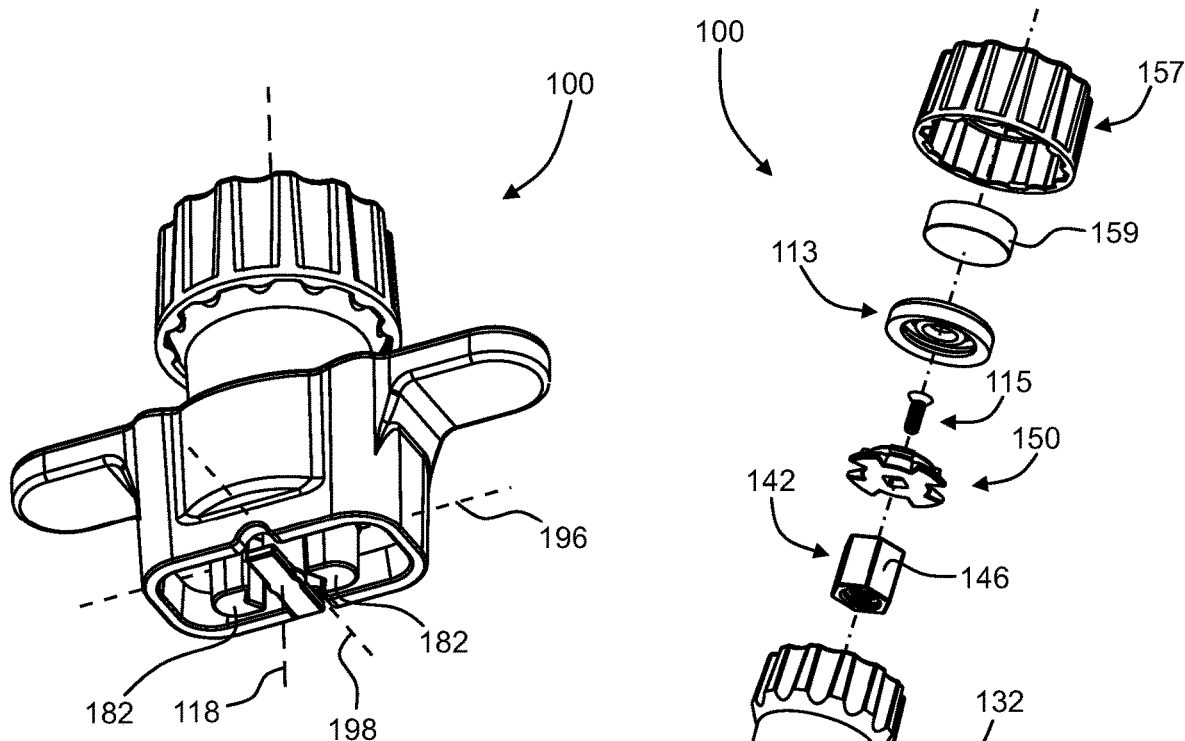
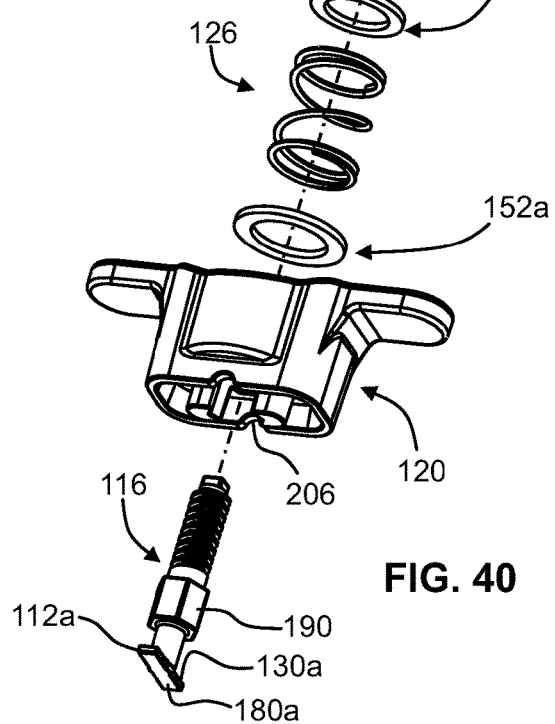
FIG. 39
FIG. 40

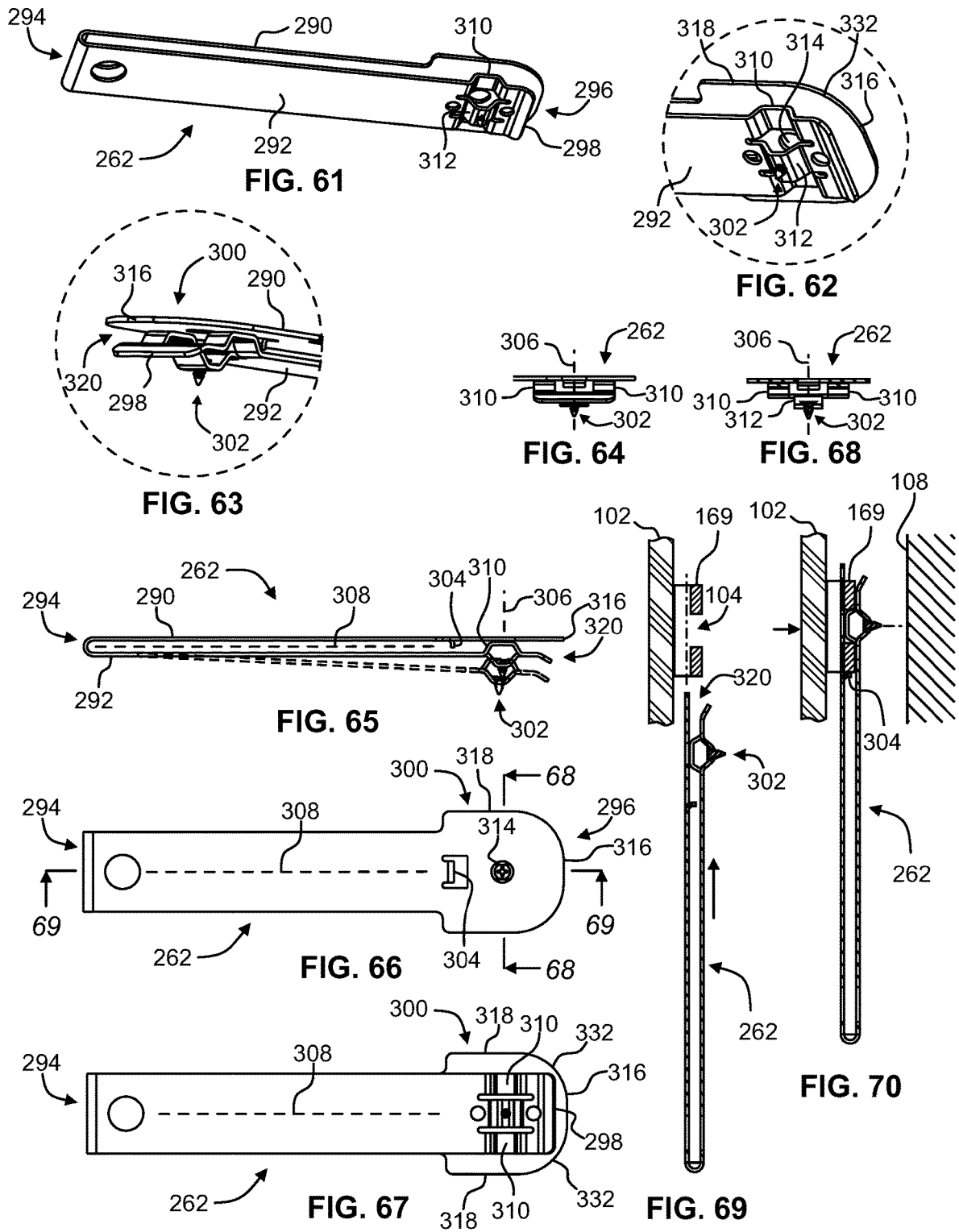

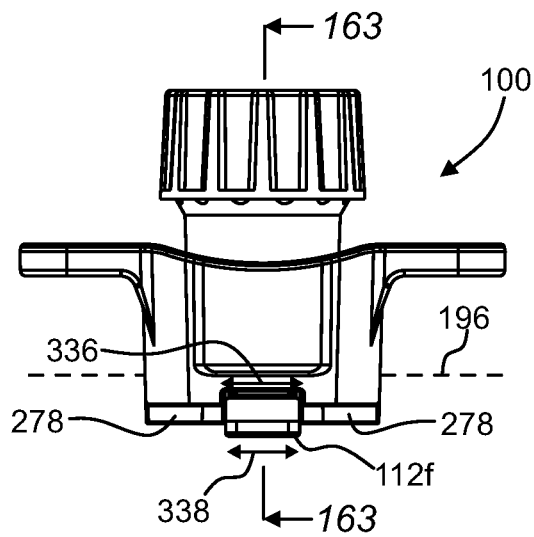
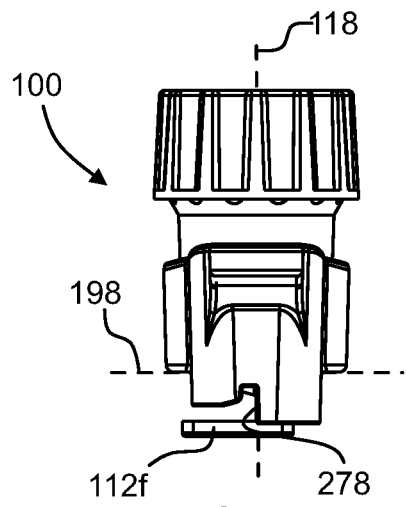
FIG. 157
FIG. 158
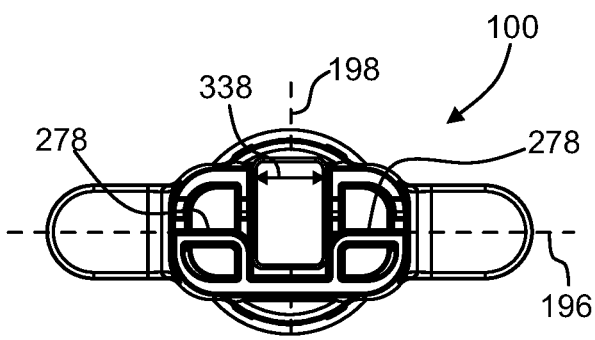
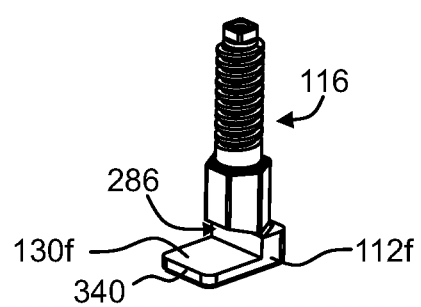
FIG. 159
FIG. 160
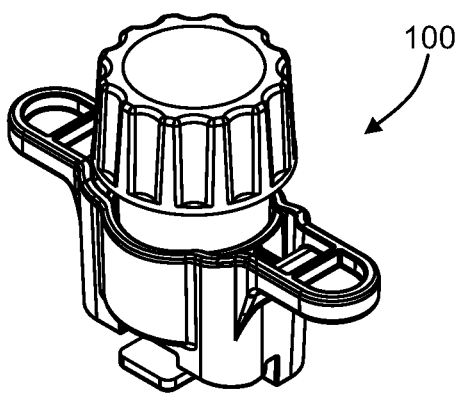
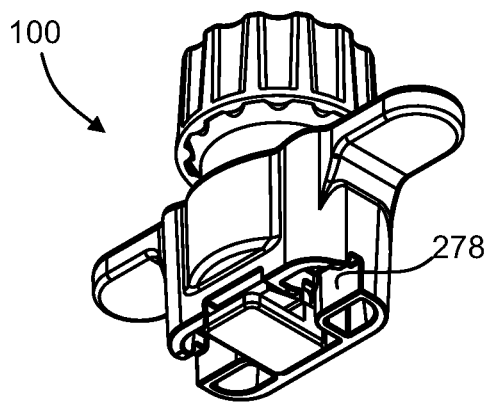
FIG. 161
FIG. 162

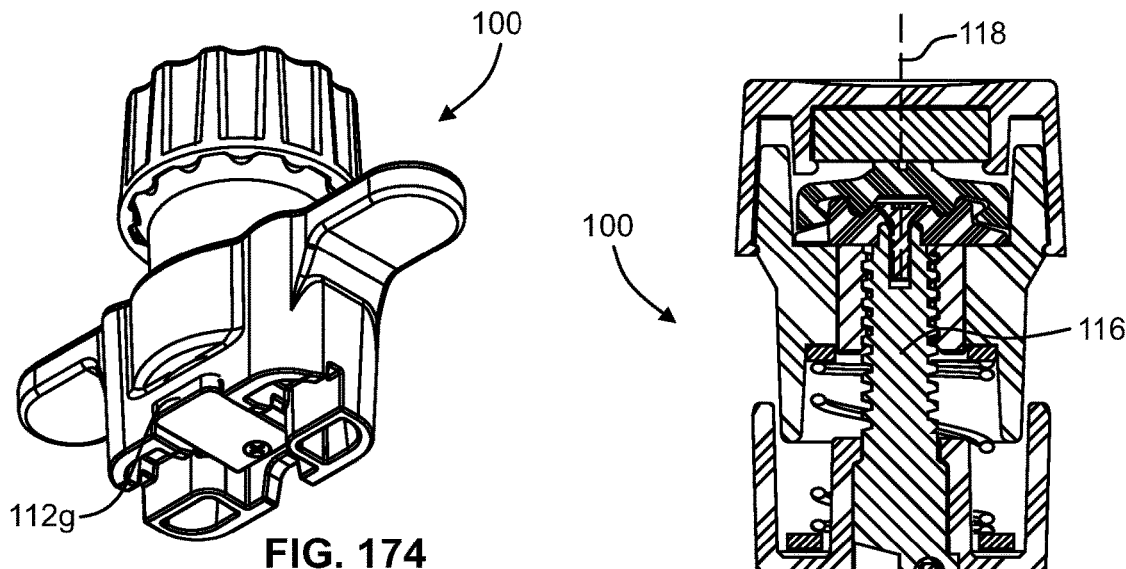
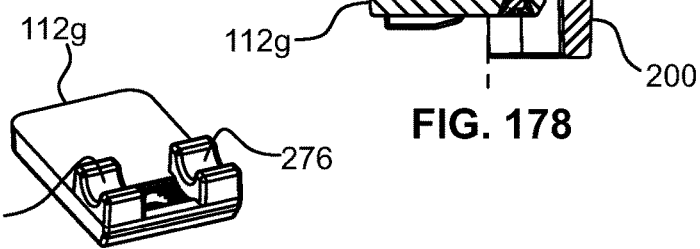
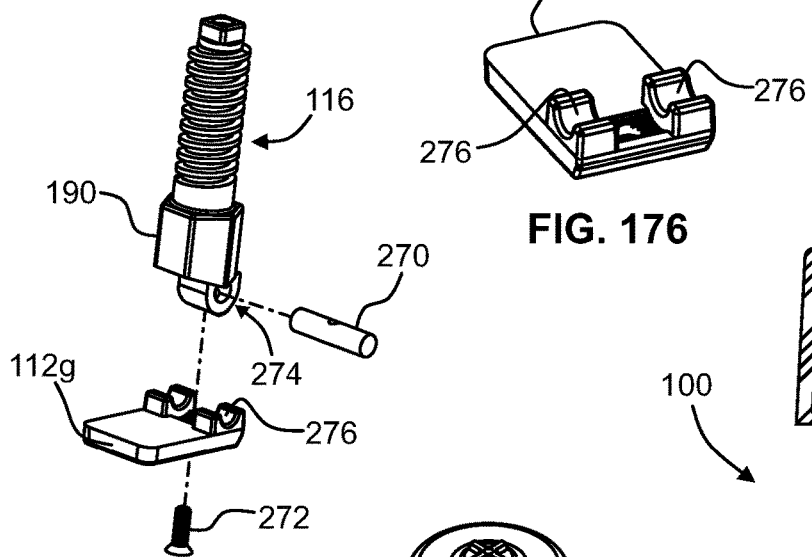
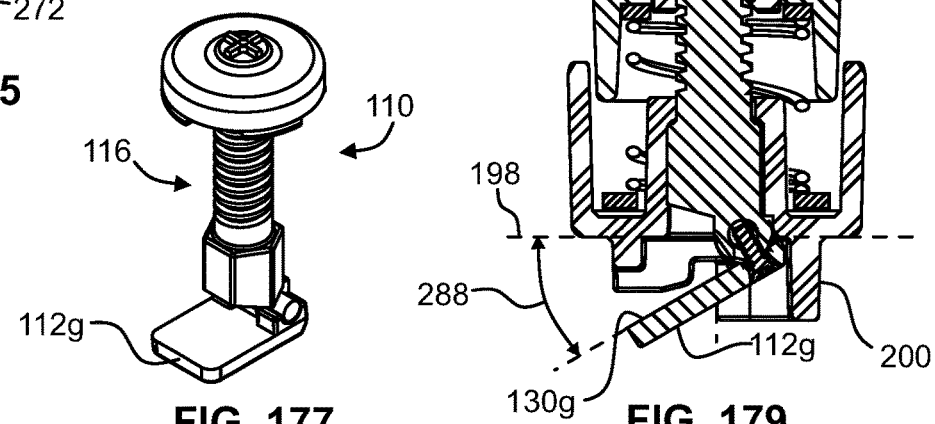

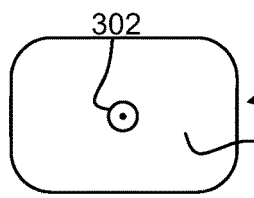
FIG. 180
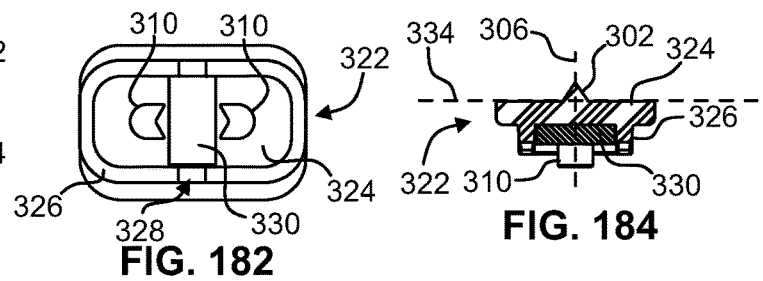
FIG. 182     FIG. 184
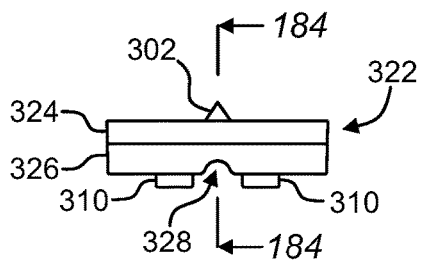
FIG. 181
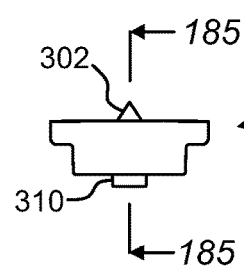
FIG. 183
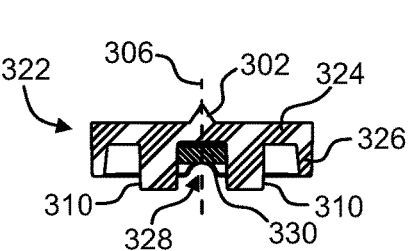
FIG. 185
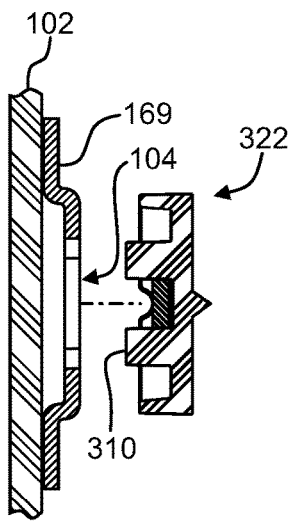
FIG. 186A
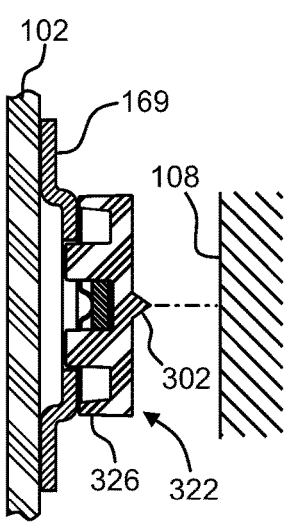
FIG. 187A
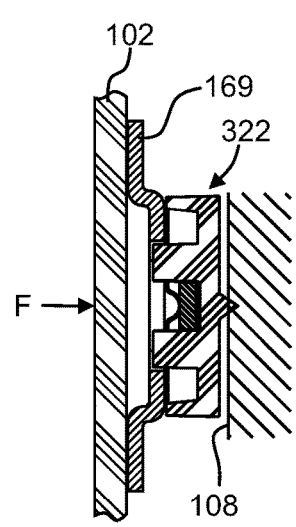
FIG. 188A
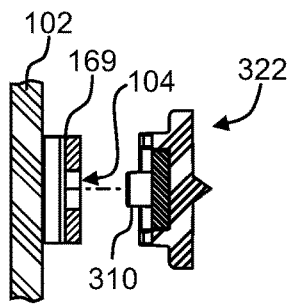
FIG. 186B
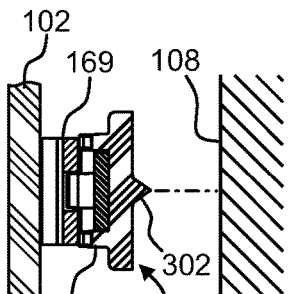
FIG. 187B
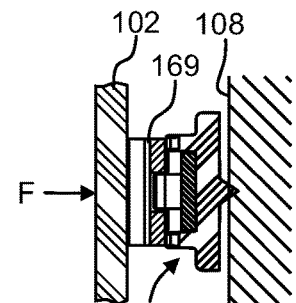
FIG. 188B

MARKING APPARATUS AND KIT FOR BLIND MOUNT ALIGNMENT

RELATED APPLICATIONS

This application is a U.S. national stage of PCT International Patent Application No. PCT/US2020/015469 having an international filing date of Jan. 28, 2020, which claims the benefit of U.S. Provisional Application No. 62/797,907 filed Jan. 28, 2019 and U.S. Provisional Application No. 62/813,649 filed Mar. 4, 2019. All of the above-identified applications are hereby incorporated by reference in their entireties as though fully and completely set forth herein.

TECHNICAL FIELD

The disclosure herein relates generally to devices and methods for mounting objects onto supporting structures. More particularly, the disclosure relates to devices and methods to facilitate placement of blind hardware-mount components, such as mounting screws and hooks which engage a keyhole, slot or thin edge of an object, cleats, sawtooth hangers, and security slot hardware wall clips, on a supporting wall or other structure in a manner which results in desired alignment of the mounted object.

BACKGROUND

Applicant's previously-filed PCT International Patent Application Nos. PCT/US2016/053208 (published on Mar. 30, 2017 as WO 2017/053636) and PCT/US2018/039374 (published on Jan. 3, 2019 as WO 2019/005707), disclosed certain expedients for a blind slide-mount fastener alignment apparatus, kit and method. The instant disclosure presents further innovations which extend beyond the teachings of Applicant's previously-published work and provide solutions to additional problems in the art.

SUMMARY

Certain deficiencies of the prior art are overcome by the provision of embodiments of an apparatus, kit and method in accordance with the present disclosure.

BRIEF DESCRIPTION OF THE DRAWINGS

Further advantages of the present invention may become apparent to those skilled in the art with the benefit of the following detailed description of the preferred embodiments and upon reference to the accompanying drawings in which:

FIG. 1 is a diagrammatic perspective view of one example marking apparatus in accordance with the present disclosure;

FIG. 2 is a diagrammatic perspective view similar to that of FIG. 1, but with the cap element shown removed from the apparatus;

FIG. 3 is a diagrammatic exploded view of the example marking apparatus of FIG. 1;

FIG. 4 is a further diagrammatic perspective view of the example marking apparatus of FIG. 1;

FIG. 5 is a further diagrammatic exploded view of the example marking apparatus shown in FIG. 1;

FIG. 29 is a diagrammatic cross-sectional view of the marking apparatus of FIG. 27, but shown with the cap element removed and in a configuration in which the cover element is in its extended position and is positioned against the mounting surface prior to marking;

FIG. 30 is a diagrammatic cross-sectional view of the marking apparatus of FIG. 27, but shown in a further configuration in which the cover element is forced into its retracted position by pushing the object toward the mounting surface, thereby causing the marking tip to place a respective patch of marking substance on the mounting surface;

FIG. 31 is a diagrammatic partial cross-sectional view of a mounting surface with an apparatus-placed mark thereon, and a fastener being aligned with the marking for installation thereat;

FIG. 32 is a diagrammatic partial cross-sectional view of a mounting surface with a fastener installed therein at the location of an apparatus-placed mark;

FIG. 33 is a diagrammatic partial cross-sectional view of an object mounted to a mounting surface by way of engagement between the object's slot feature and a fastener;

FIG. 39 is a further diagrammatic perspective view of the example marking apparatus of FIG. 36;

FIG. 40 is a further diagrammatic exploded view of the example marking apparatus shown in FIG. 36;

FIG. 61 is a diagrammatic perspective view of an example self-centering slot-securable point-marking tool in accordance with the present disclosure;

FIG. 62 is a diagrammatic magnified partial perspective view of the slot-securable point-marking tool shown in FIG. 61;

FIG. 63 is a further diagrammatic magnified partial perspective view of the slot-securable point-marking tool shown in FIG. 61;

FIG. 64 is a diagrammatic front view of the slot-securable point-marking tool shown in FIG. 61;

FIG. 65 is a diagrammatic side view of the slot-securable point-marking tool shown in FIG. 61, illustrating movement of the tool mouth in a direction parallel to the point axis between a securement configuration and an expanded configuration;

FIG. 66 is a diagrammatic top view of the slot-securable point-marking tool shown in FIG. 61;

FIG. 67 is a diagrammatic bottom view of the slot-securable point-marking tool shown in FIG. 61;

FIG. 68 is a diagrammatic cross-sectional view taken along lines 68-68 of FIG. 66;

FIG. 69 is a diagrammatic cross-sectional view taken along lines 69-69 of FIG. 66, showing the slot-securable point marking tool prior to being secured to a respective security hanger hardware element;

FIG. 70 is a diagrammatic cross-sectional view similar to that of FIG. 69, but showing the slot-securable point marking tool secured to a respective security hanger hardware element so that its point element is aligned with the slot of the hardware element, and the object being pushed forward to mark the mounting surface with the slot location;

FIG. 102 is a diagrammatic perspective view of a marking apparatus of FIG. 101, with the object retention element actuated to an open position with the head portion extended to expand a lip groove;

FIG. 103 is a diagrammatic perspective view similar to that of FIG. 102, but wherein the head portion of the marking apparatus has been inserted into a fastener head opening of a slide mount slot in the object to be mounted;

FIG. 104 is a diagrammatic perspective view similar to that of FIG. 103, but wherein the object retention element is released to move to its gripping position under the force of the spring element;

FIG. 105 is a diagrammatic perspective view of a marking apparatus of FIG. 101, with the object retention element shown actuated to an open position with the head portion extended to expand a lip groove, and illustrating a keyhole hardware element recessed inward of the local planar surface of the object to be mounted;

FIG. 106 is a diagrammatic perspective view similar to that of FIG. 105, but wherein the shank portion of the post element is slid into engagement with the slot end and the object retention element rests squarely on the local horizonal surface of the object to be mounted so that the main axis of the apparatus is orthogonal to that plane;

FIG. 107 is a diagrammatic perspective view of a marking apparatus of FIG. 101, with the object retention element shown actuated to an open position with the head portion extended to expand a lip groove, and illustrating a keyhole hardware element attached on top of the local planar surface of the object to be mounted;

FIG. 108 is a diagrammatic perspective view similar to that of FIG. 107, but wherein the shank portion of the post element has been slid into engagement with the slot end and the object retention element rests squarely on the planar flanges of the keyhole hardware element so that the main axis of the apparatus remains orthogonal to the local horizonal plane of the object;

FIG. 109 is a diagrammatic perspective view illustrating a pair of marking apparatuses secured squarely to the object to be mounted by way of the object's mounting slots;

FIG. 110 is a diagrammatic perspective view similar to that of FIG. 109, but wherein the cap elements of the marking apparatuses are shown having been removed thereby revealing the marking substance deposited on the marking ends;

FIG. 111 is a diagrammatic perspective view illustrating the object with marking apparatuses secured thereto being pushed toward the mounting surface for leaving slot fastener location marks thereon;

FIG. 112 is a diagrammatic perspective view a marking apparatus similar to that shown in FIG. 36, wherein the head portion is elongated along a length orthogonal to the main axis;

FIG. 113 is a diagrammatic perspective view of a marking apparatus of FIG. 112, with the object retention element shown actuated to an open position thereby extending the head portion and expanding a lip groove, and showing a conventional T-screw security hanger hardware element to which the marking apparatus will be secured;

Figure 36:
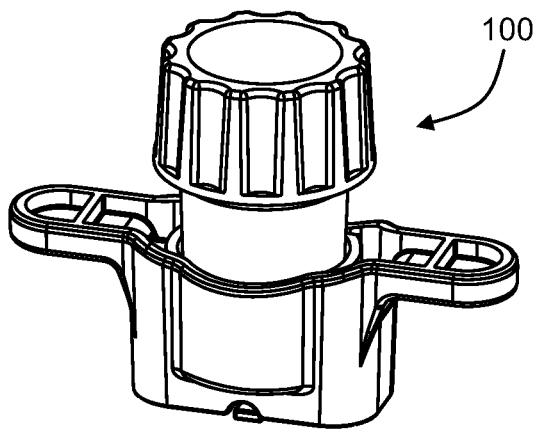
FIG. 36 is a diagrammatic perspective view of a second example marking apparatus in accordance with the present disclosure.
Figure 37:
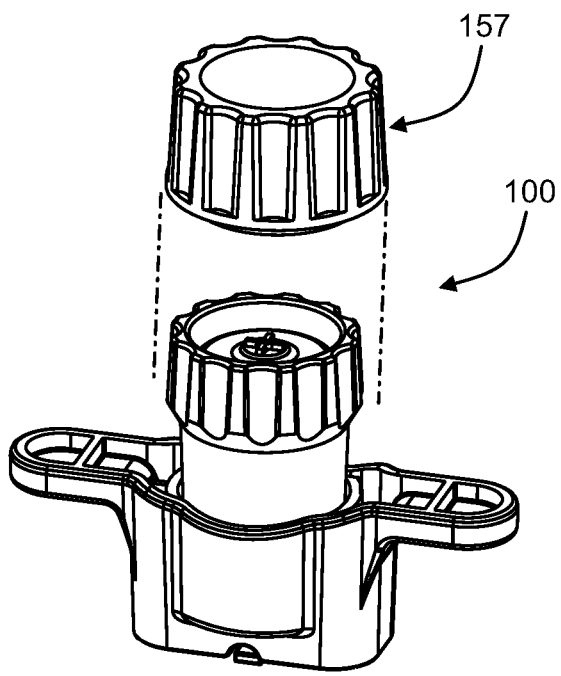
FIG. 37 is a diagrammatic perspective view similar to that of FIG. 36, but with the cap element shown removed from the apparatus.
Figure 38:
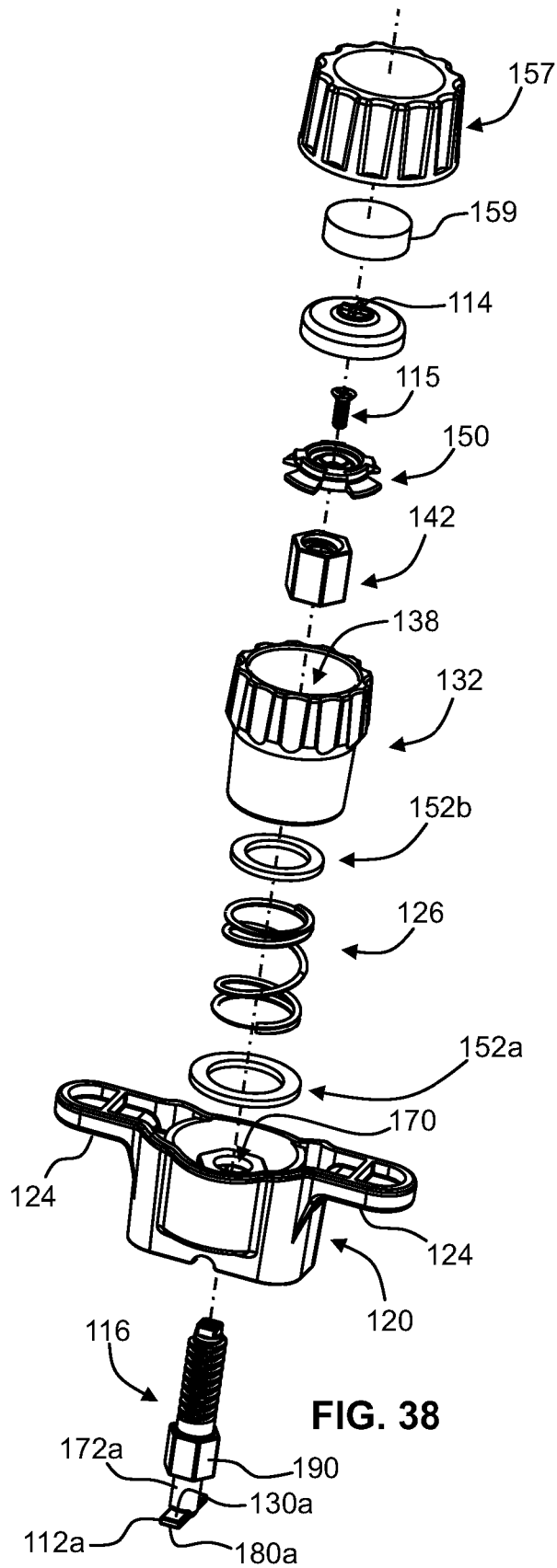
FIG. 38 is a diagrammatic exploded view of the example marking apparatus of FIG. 36.
Figure 101:
FIG. 101 is a diagrammatic perspective view a marking apparatus similar to that shown in FIG. 1, but with the object retention element shown in an open position with the head portion extended.
Figure 102:
Figure 103:
Figure 104:
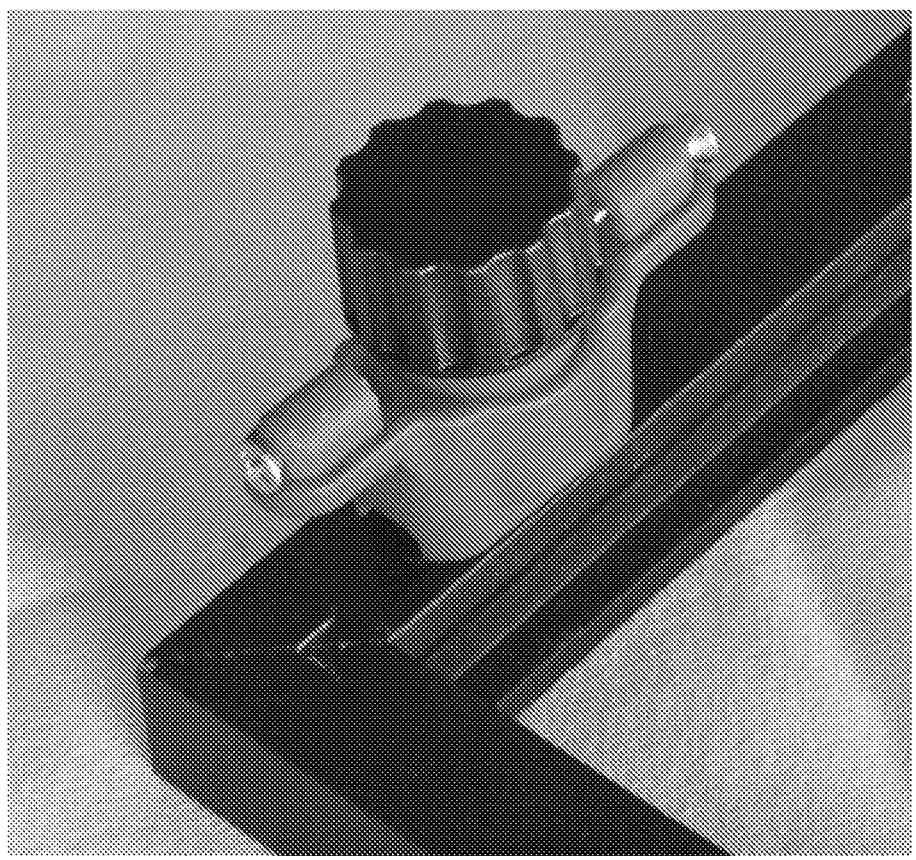
Figure 105:
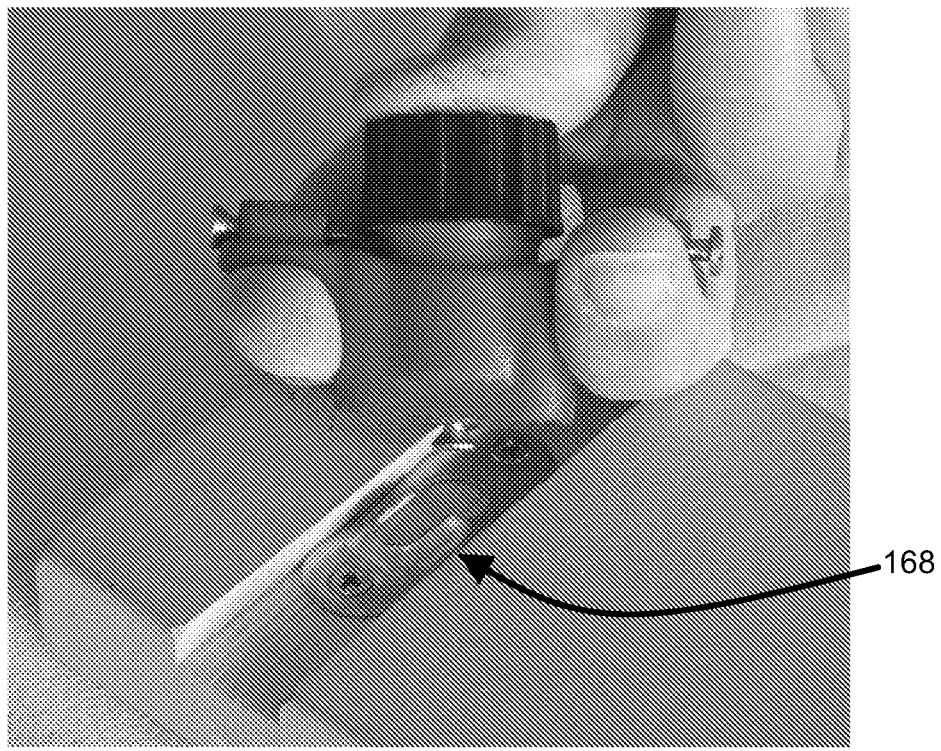
Figure 106:
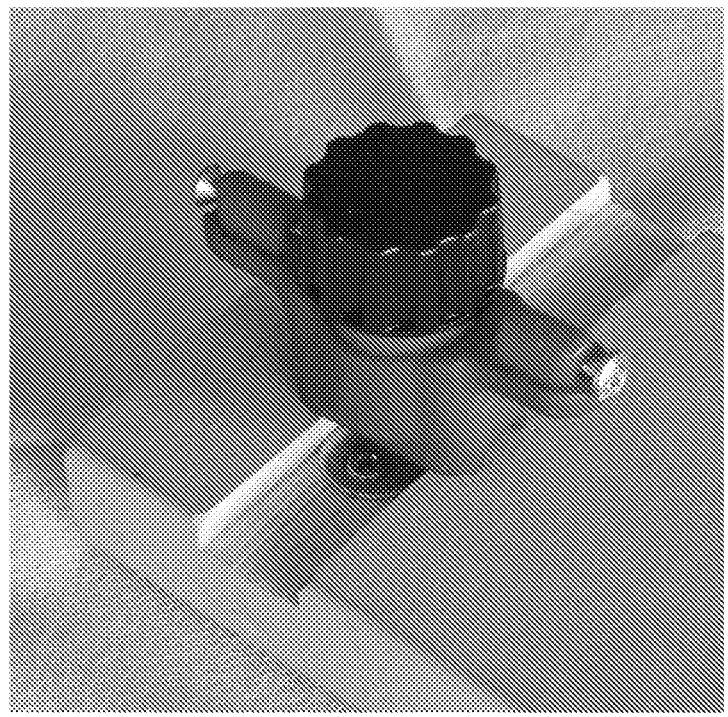
Figure 107:
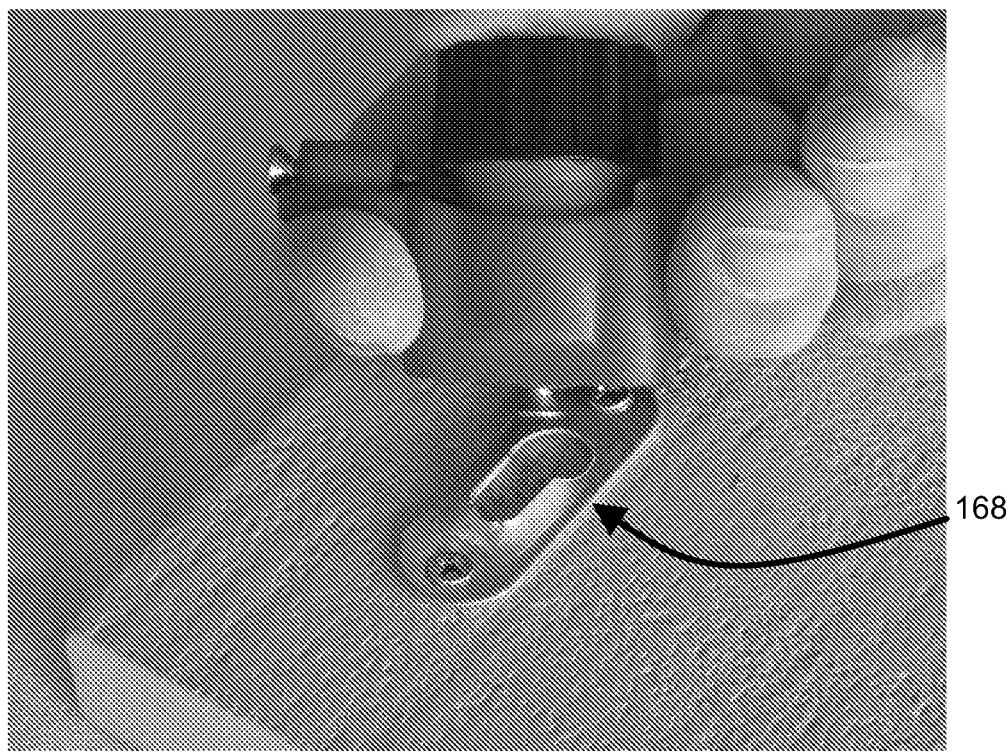
Figure 108:
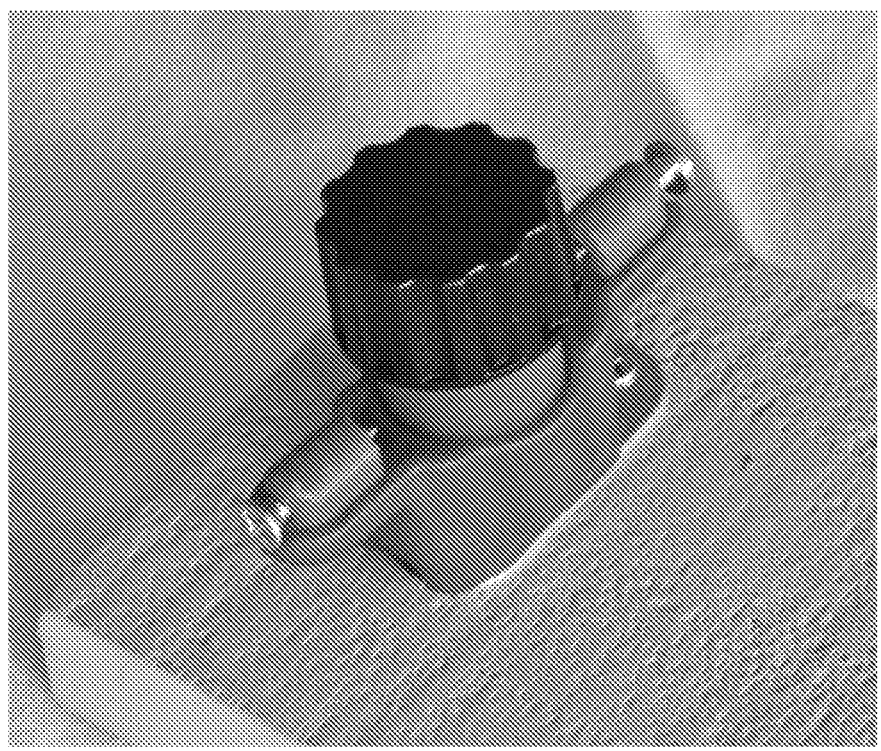
Figure 109:
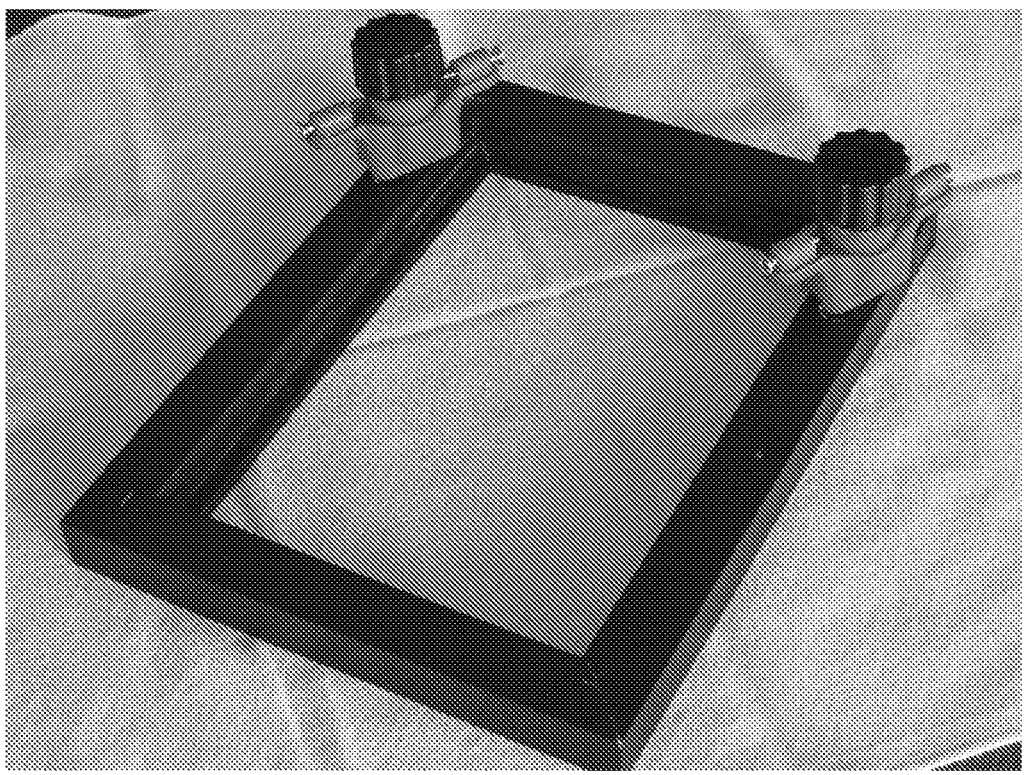
Figure 110:
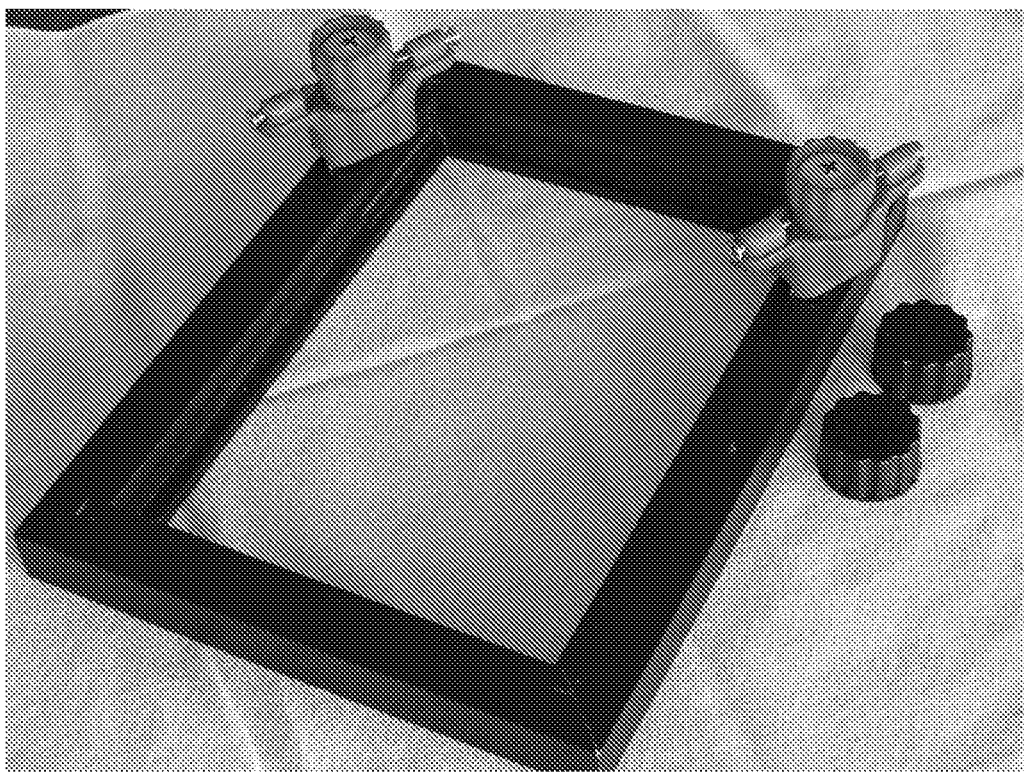
Figure 111:
Figure 112:
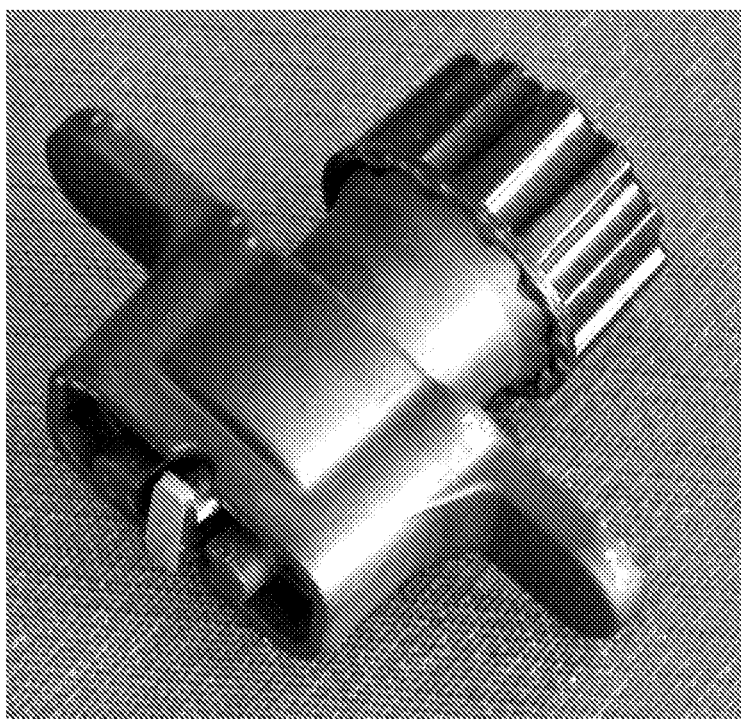
Figure 113:
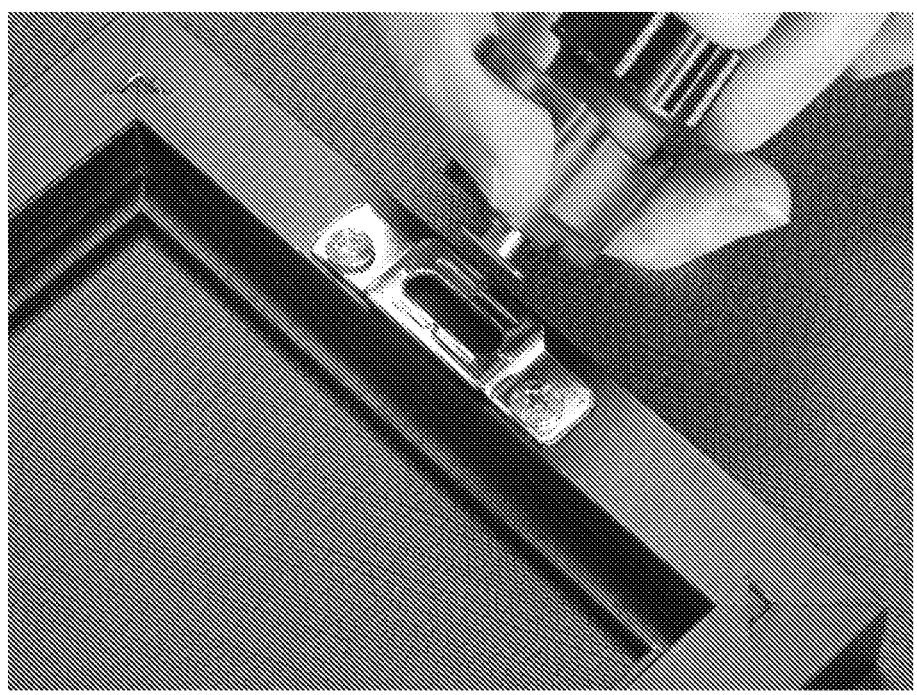
Figure 114:
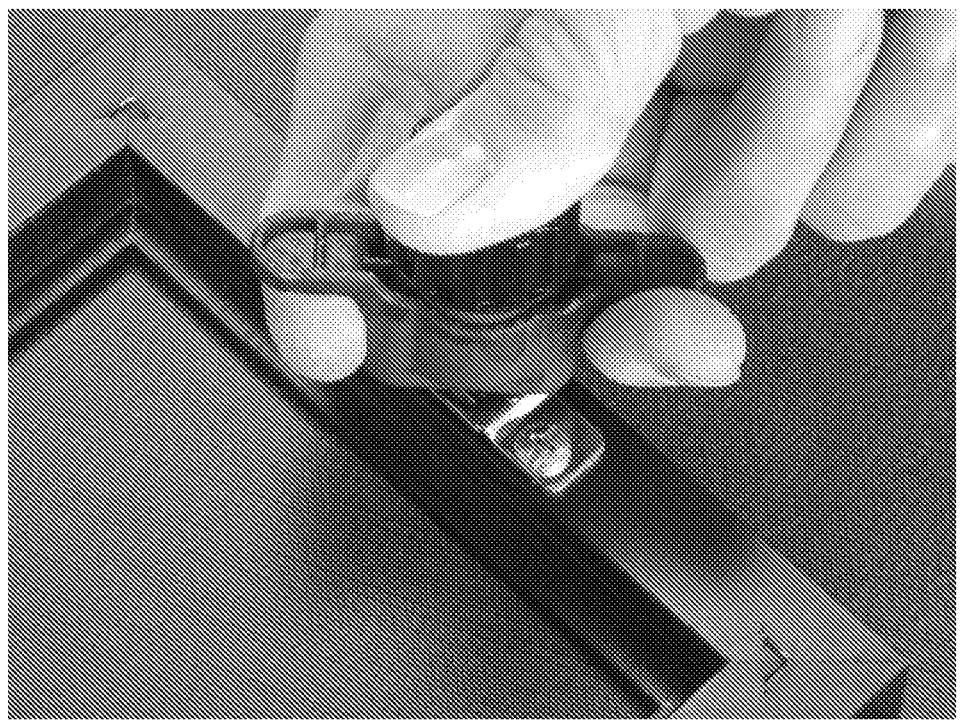
Figure 115:
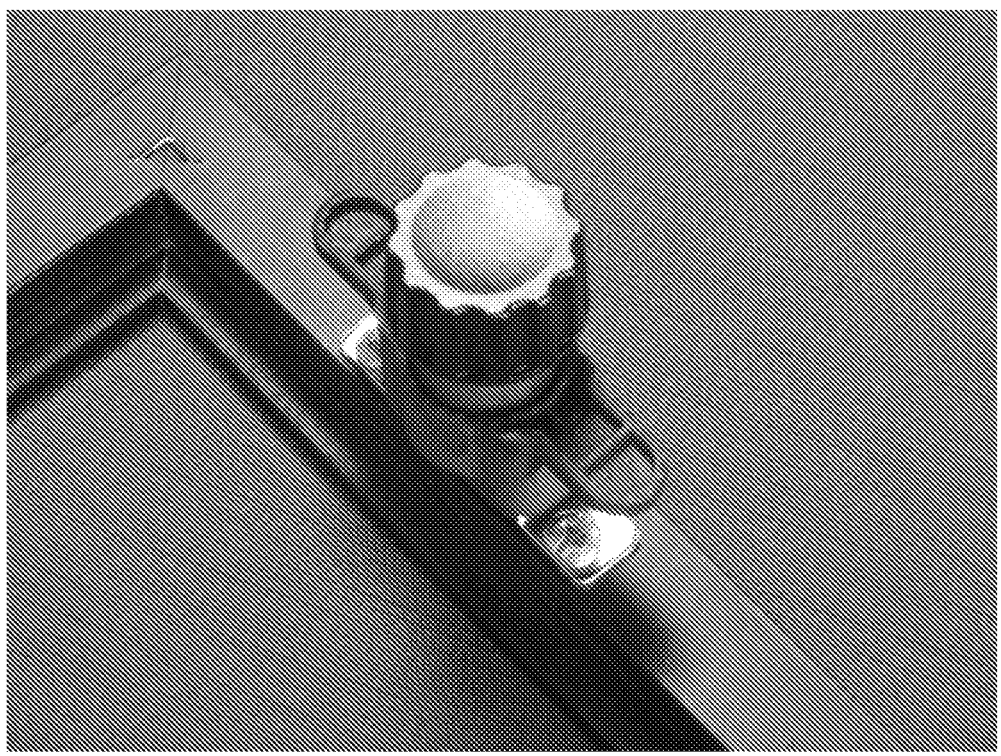
Figure 116:
Figure 117:
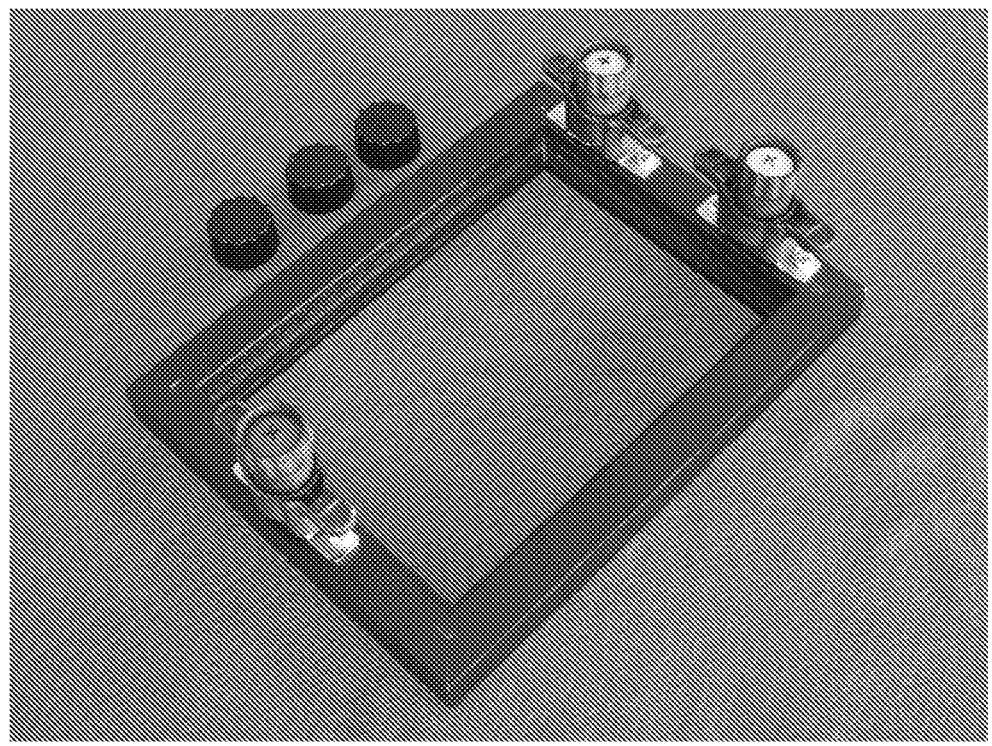
Figure 118:
Figure 119:
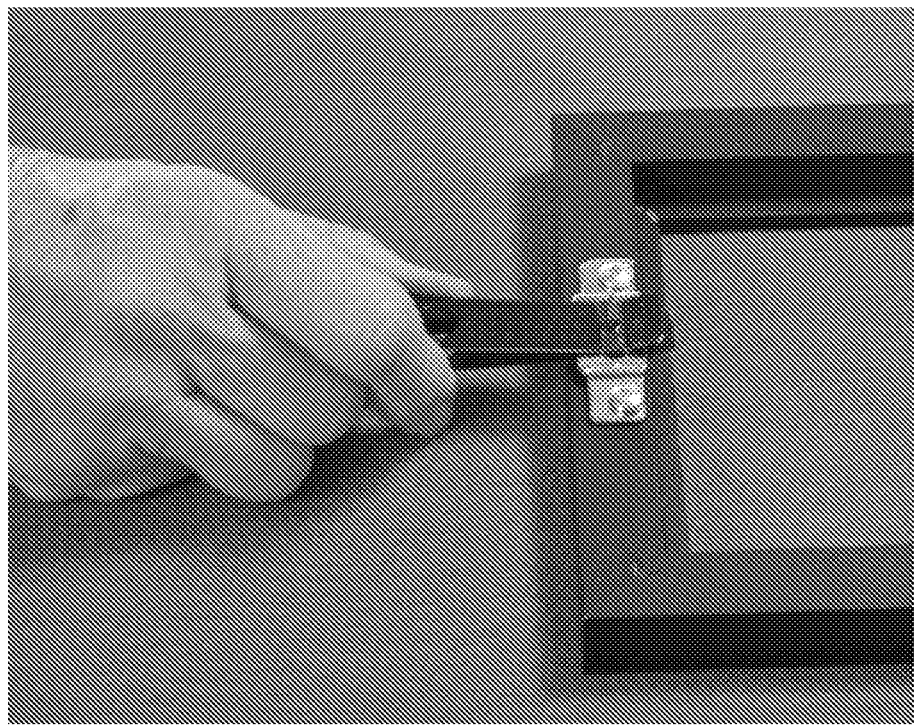
Figure 120:
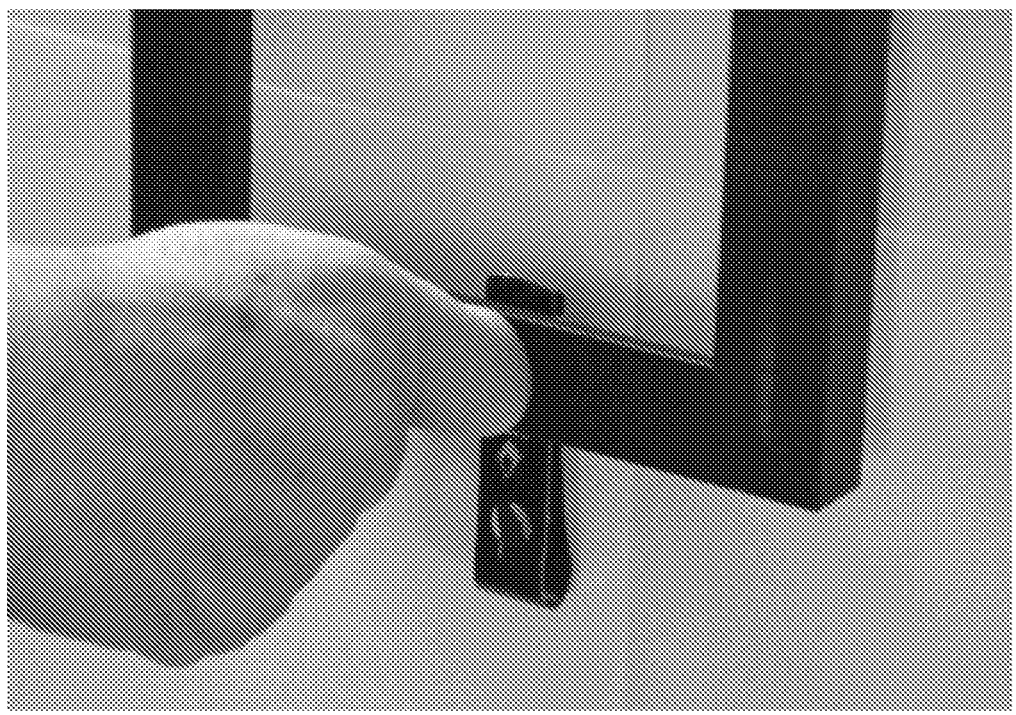
Figure 121:
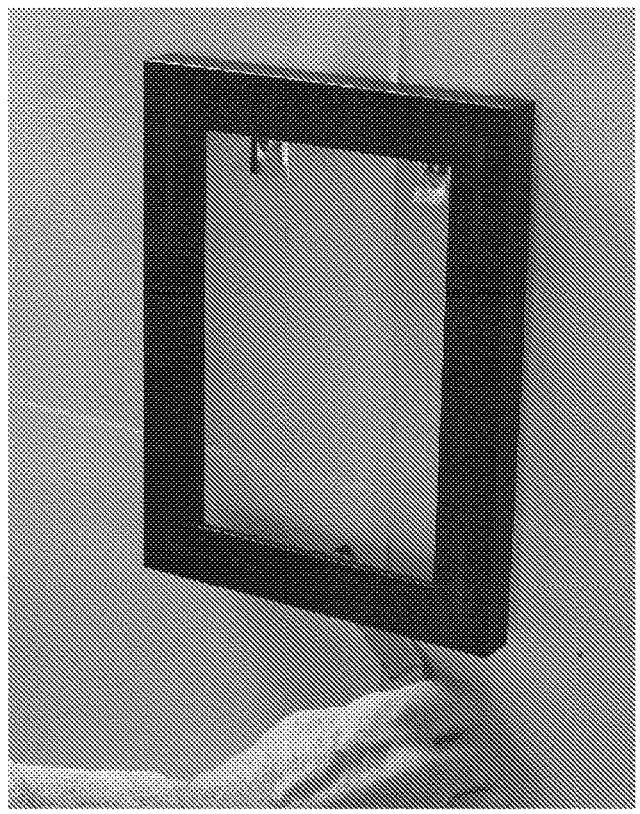
Figure 122:
Figure 123:
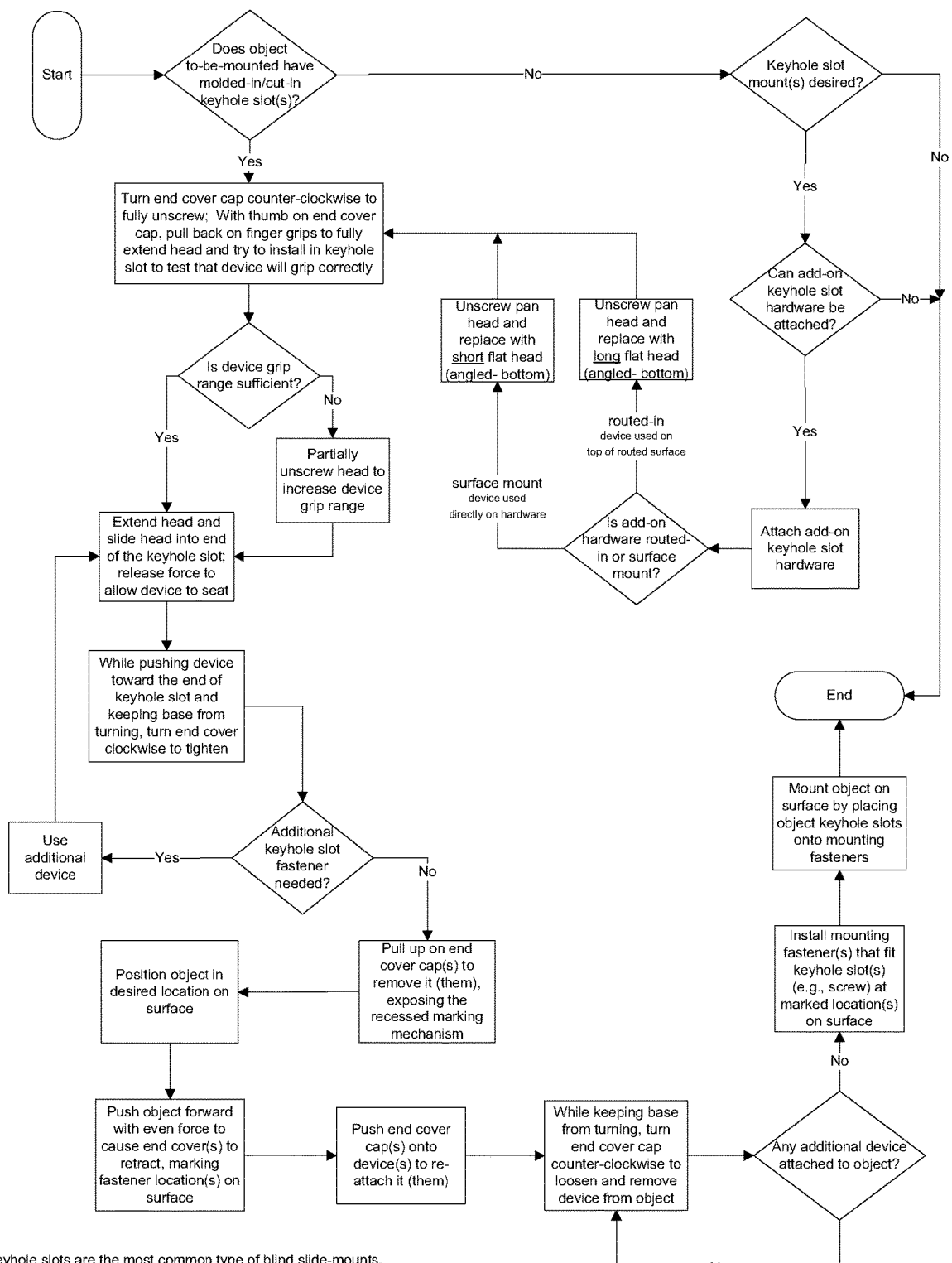
Figure 124:
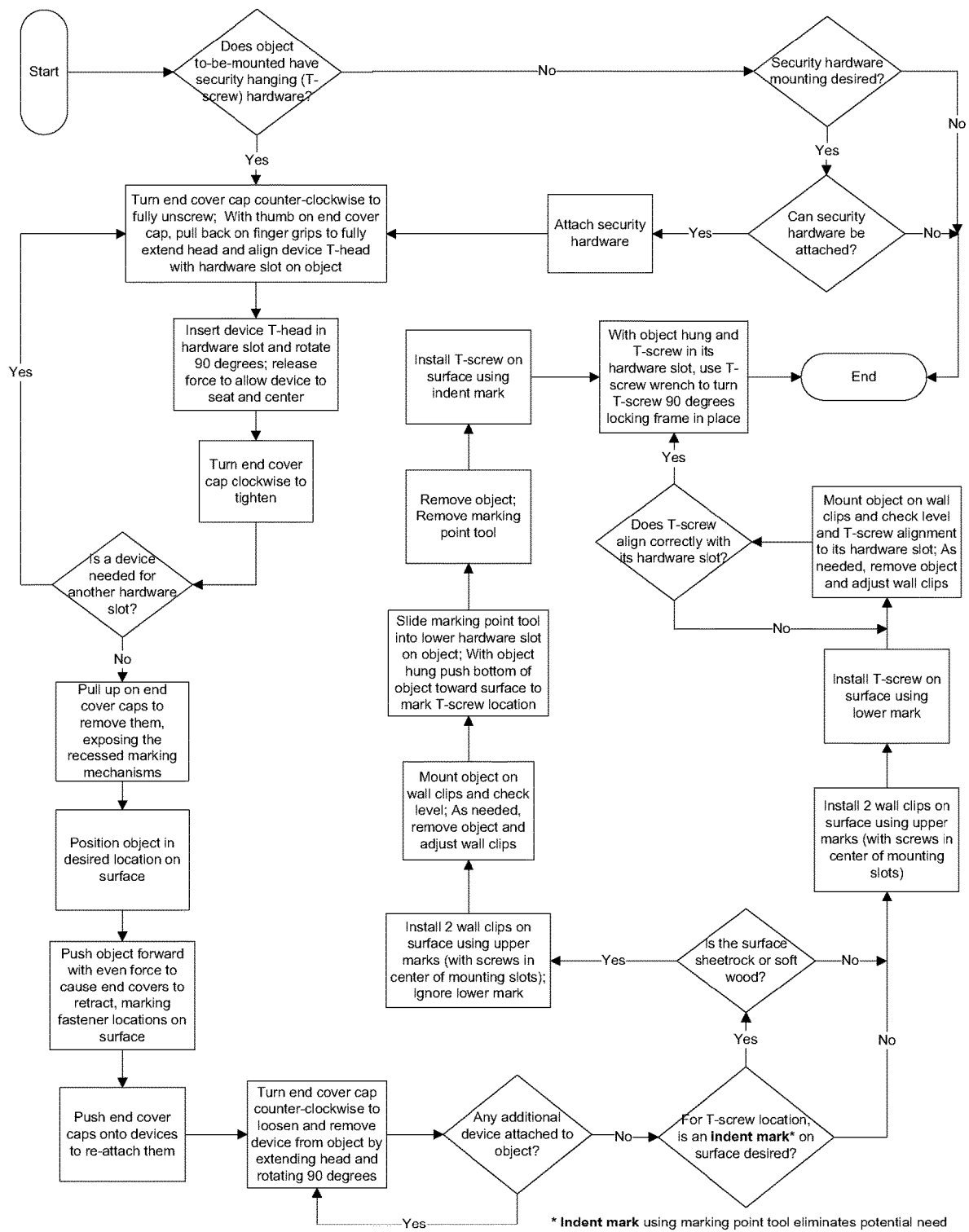
Figure 125:
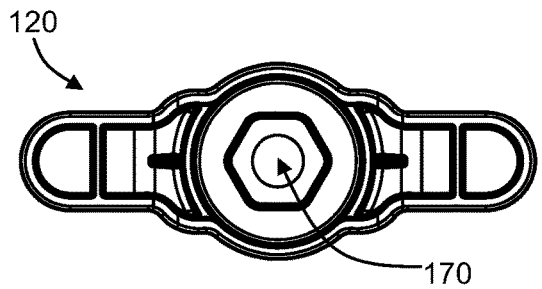
Figure 126:
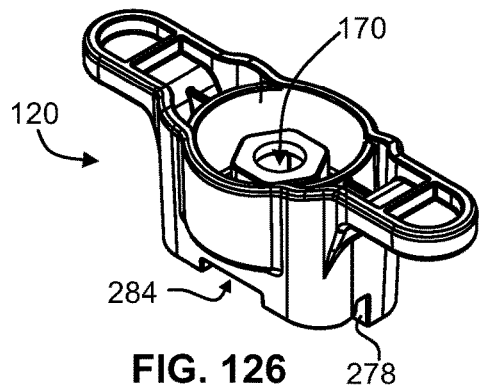
Figure 127:
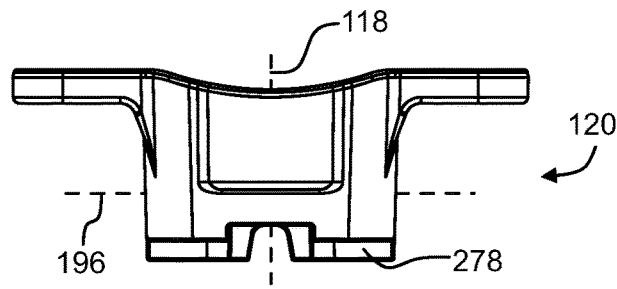
Figure 128:
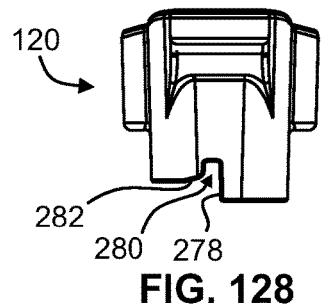
Figure 129:
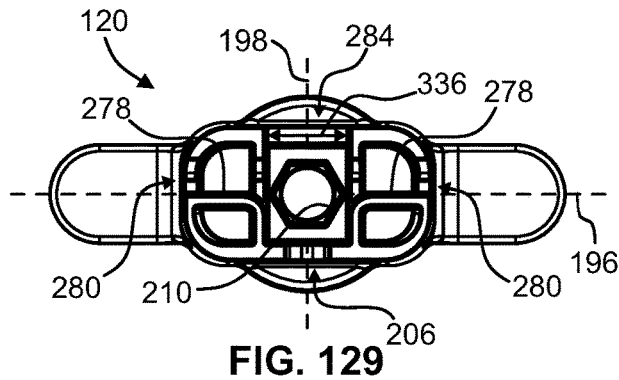
Figure 130:
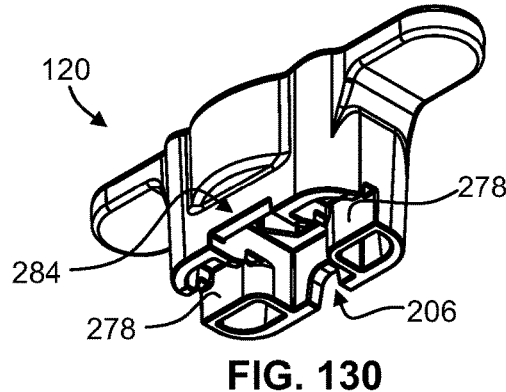
Figure 131:
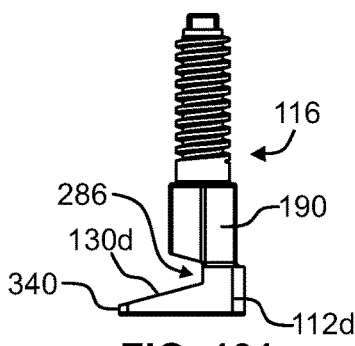
Figure 132:
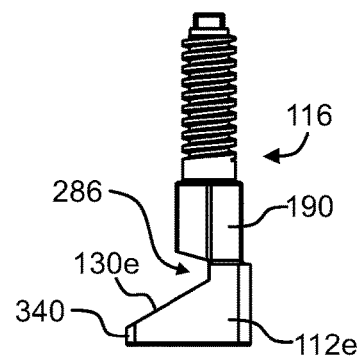
Figure 133:
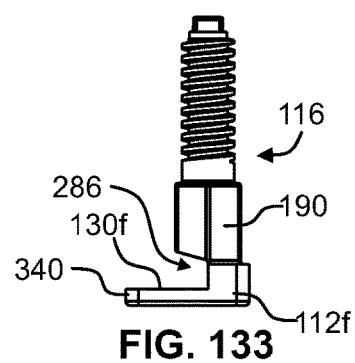
Figure 134:
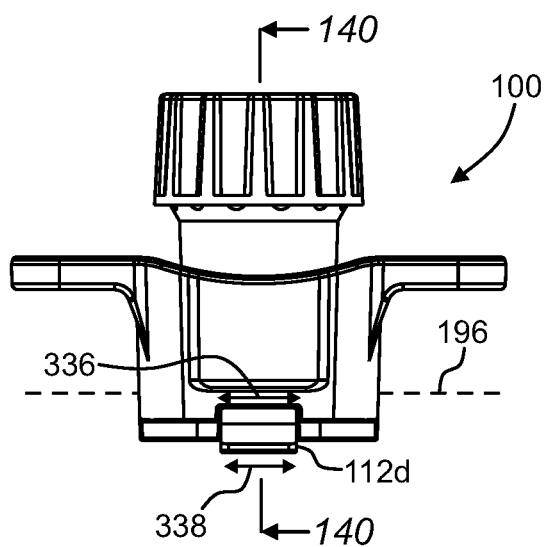
Figure 135:
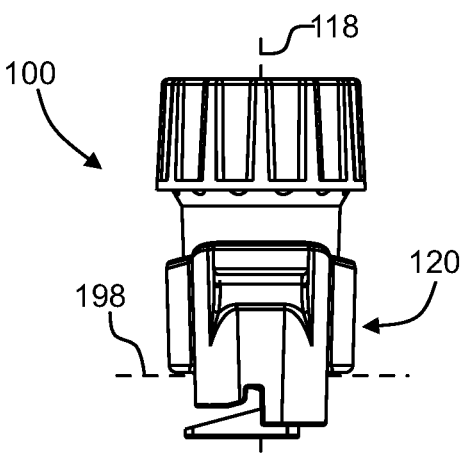
Figure 136:
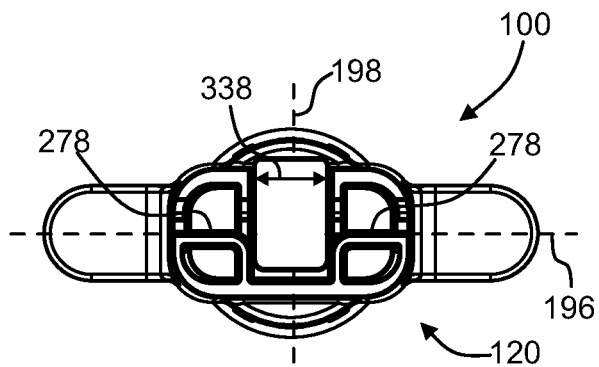
Figure 137:
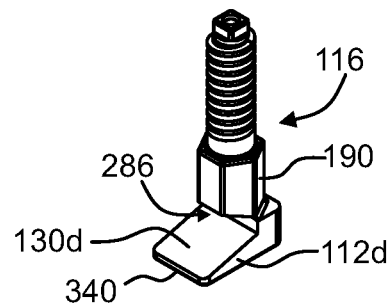
Figure 138:
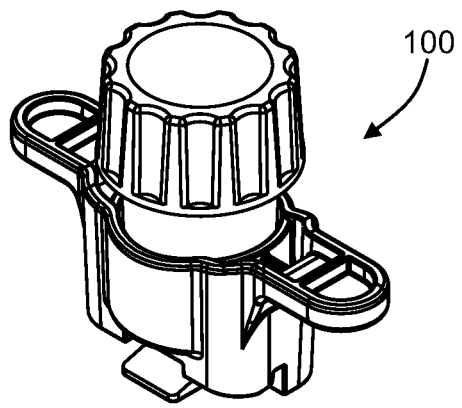
Figure 139:
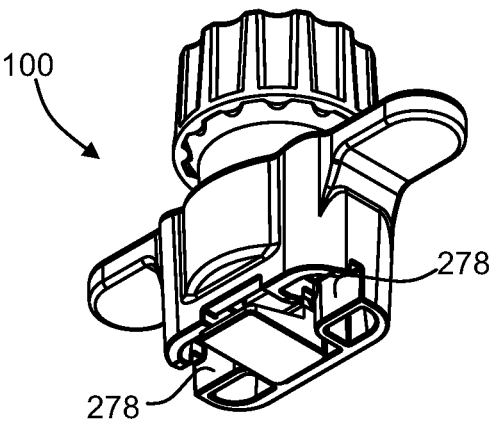
Figure 140:
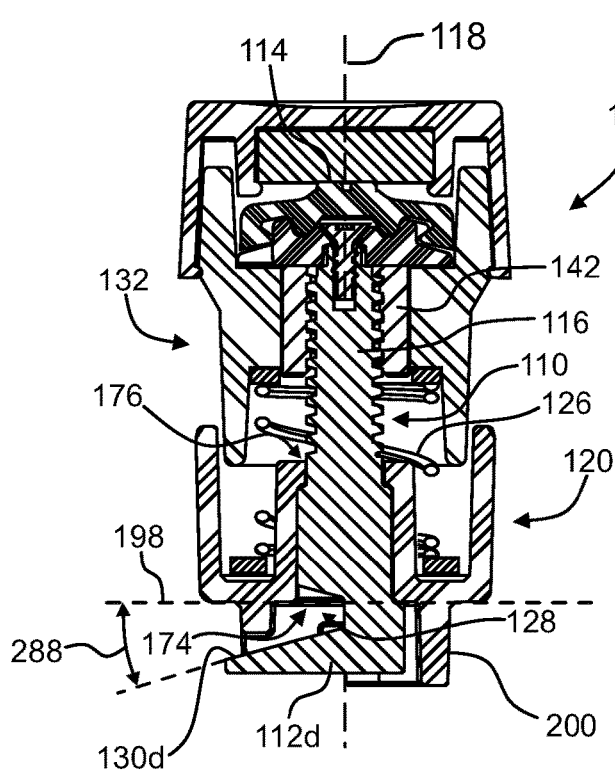
Figure 141:
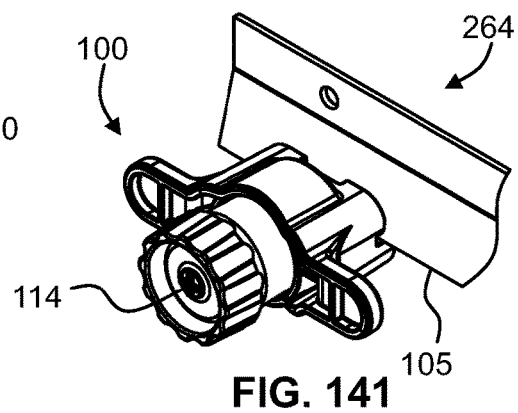
Figure 142:
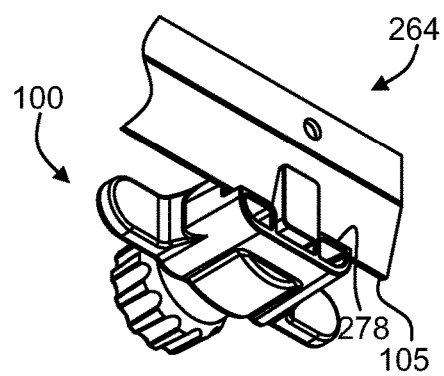
Figure 143:
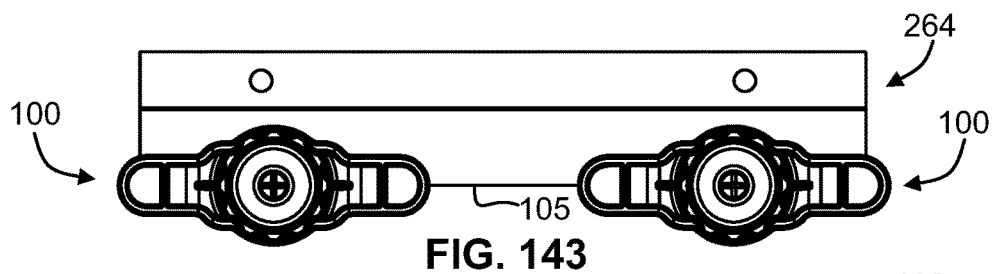
Figure 144:
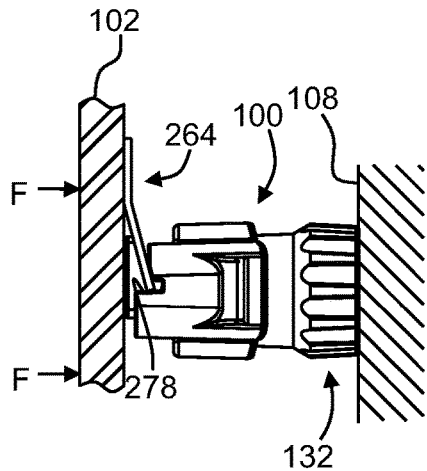
Figure 145:
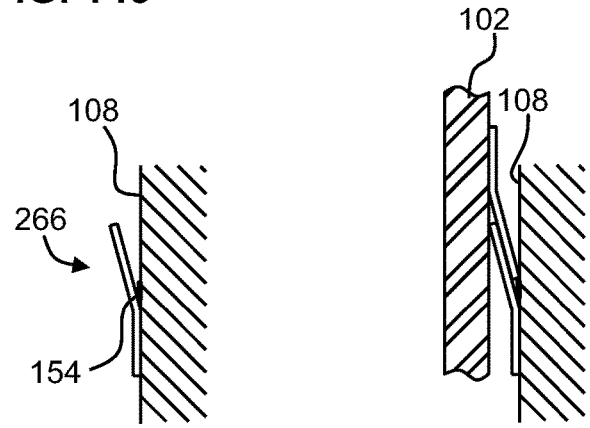
Figure 146:
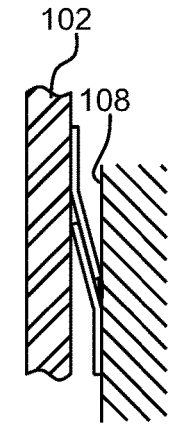
Figure 147:
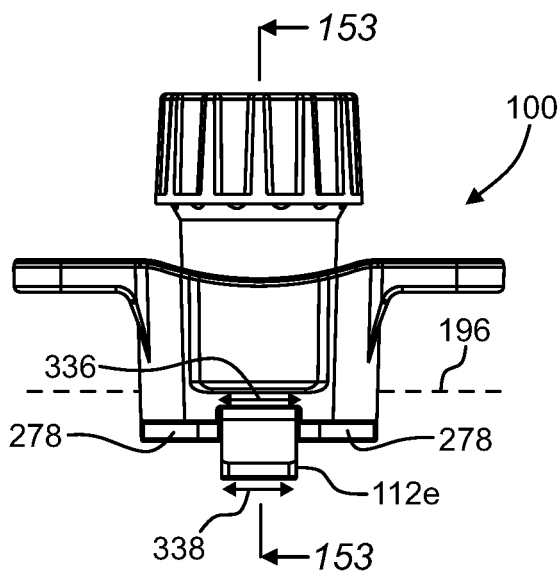
Figure 148:
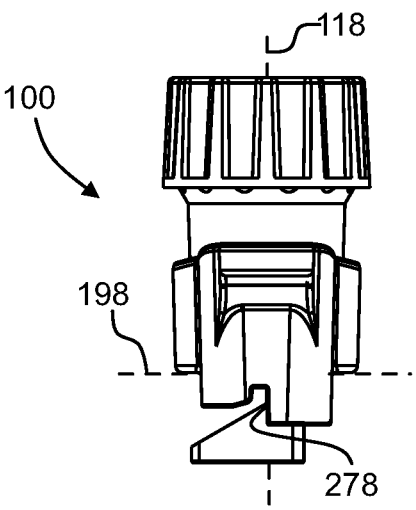
Figure 149:
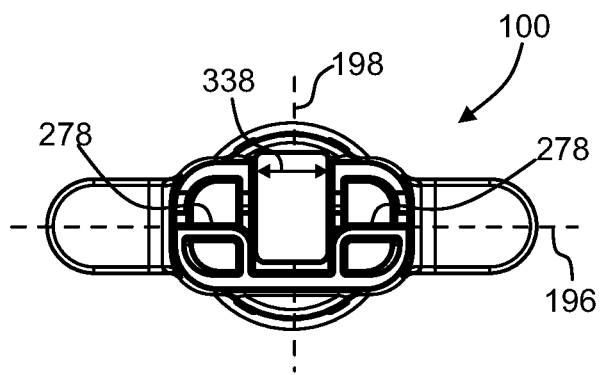
Figure 150:
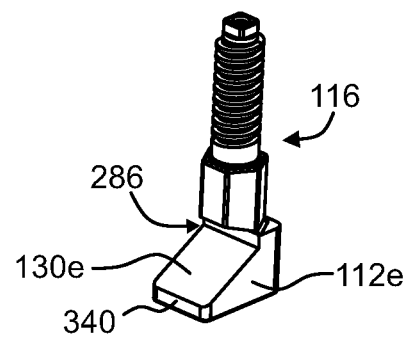
Figure 151:
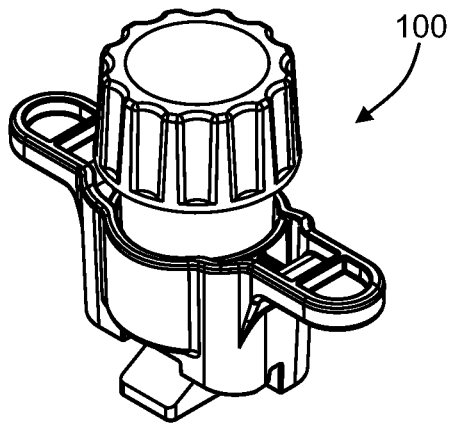
Figure 152:
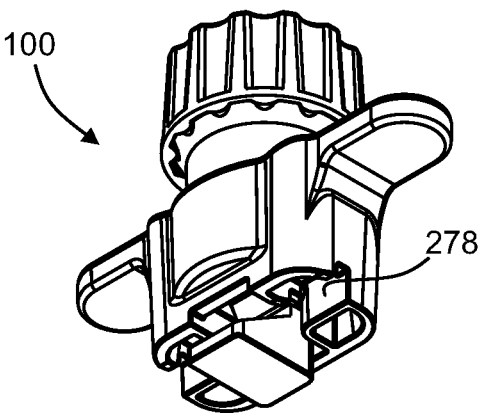
Figure 153:
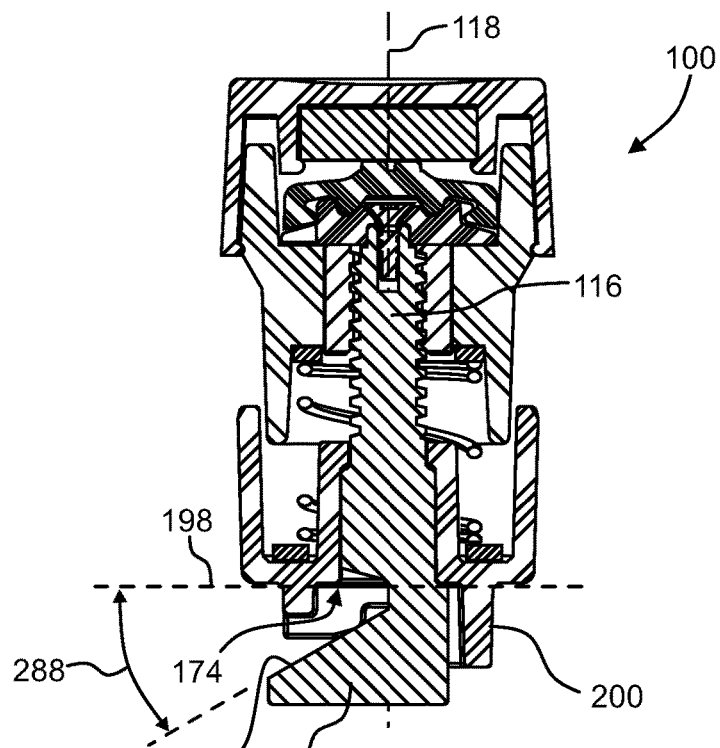
Figure 154:
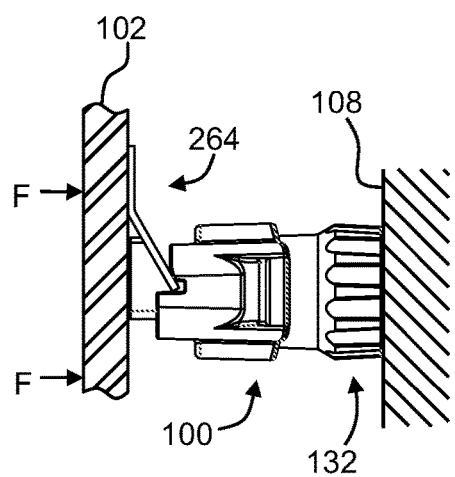
Figure 155:
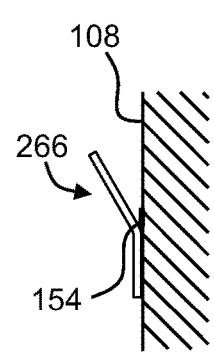
Figure 156:
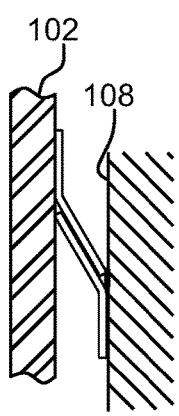
Figure 163:
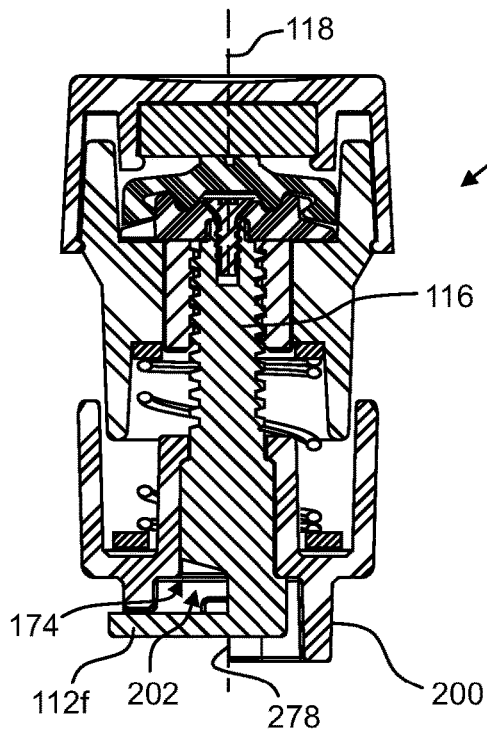
Figure 164:
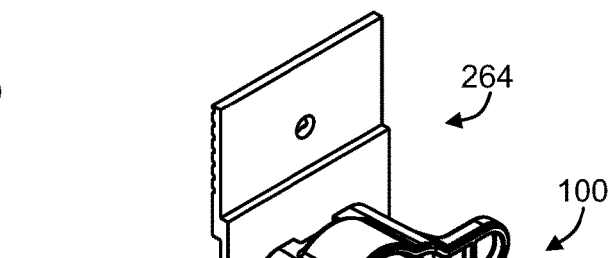
Figure 165:
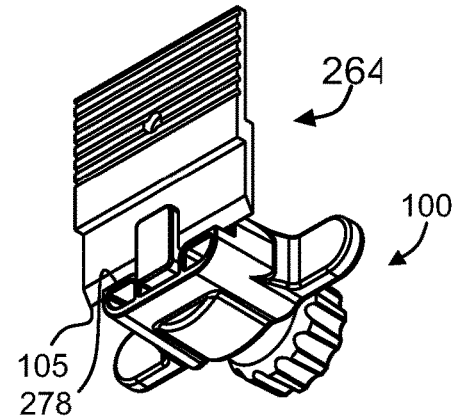
Figure 166:
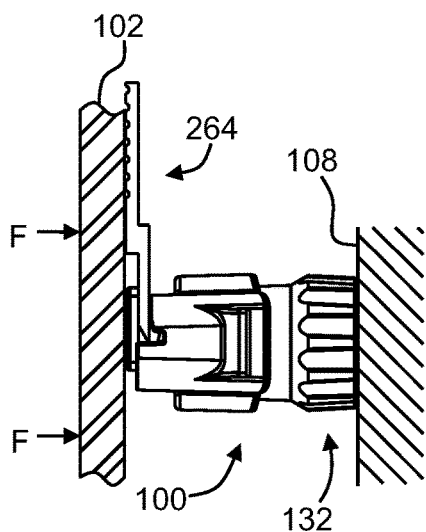
Figures 167, 168:
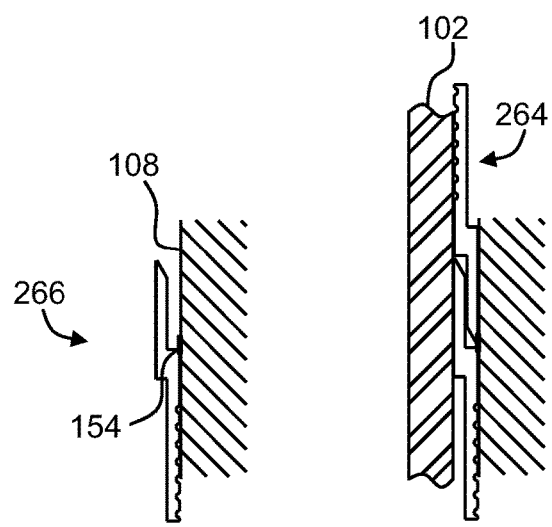
Figure 169:
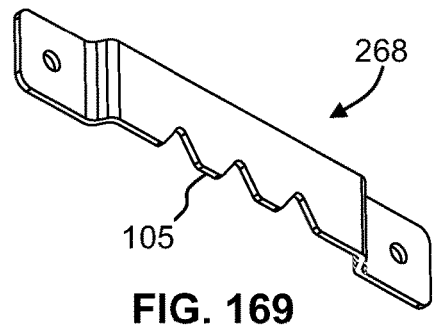
Figure 170:
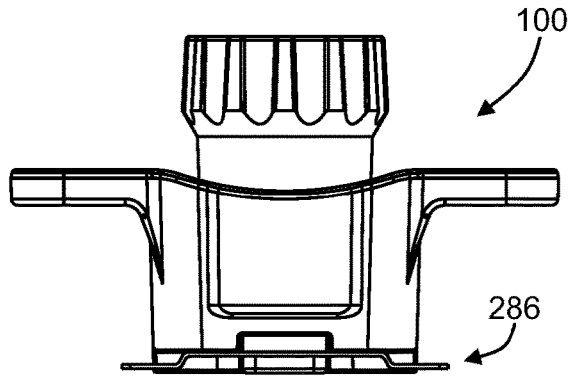
Figure 171:
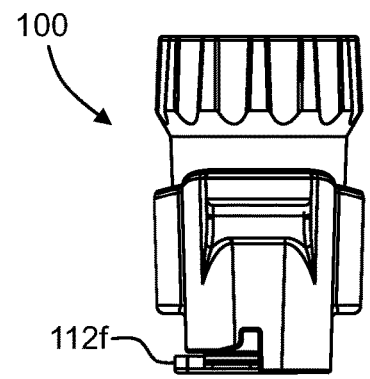
Figure 172:
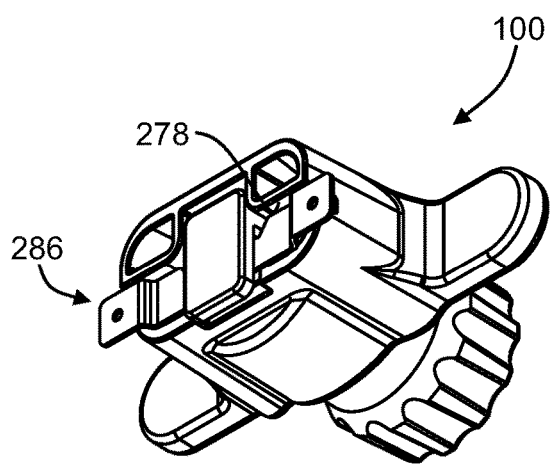
Figure 173:
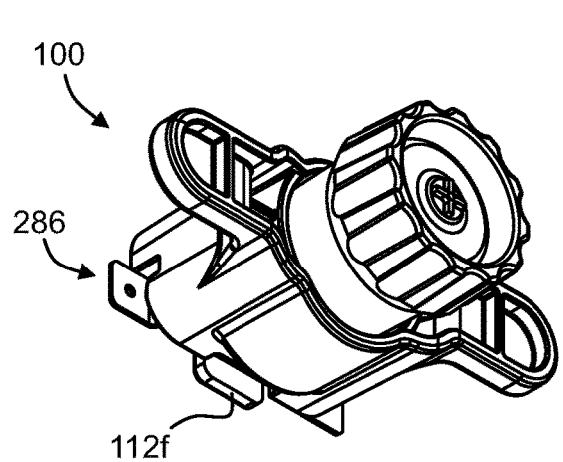
Figure 189:
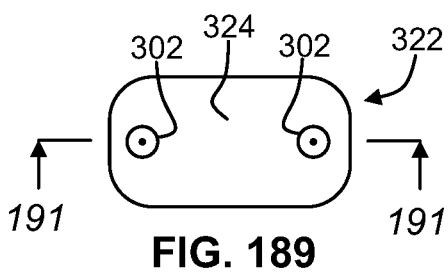
Figure 190:
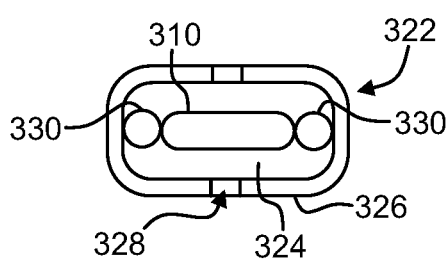
Figure 191:
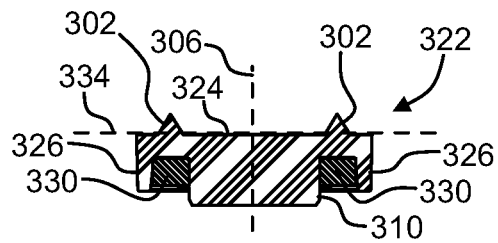
Figure 192:
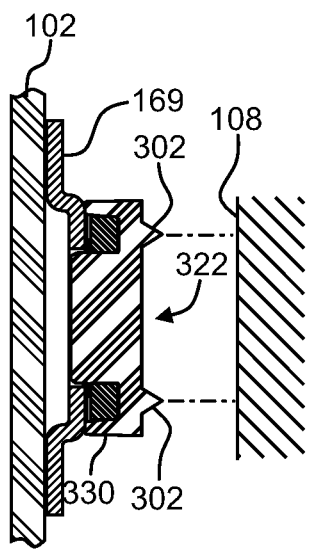
Figure 193:
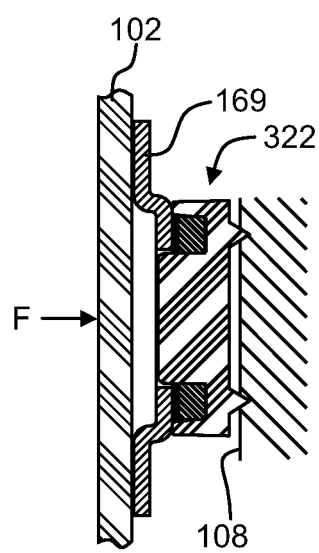
Figure 194:
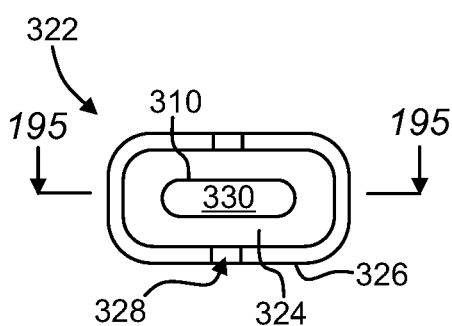
Figure 195:
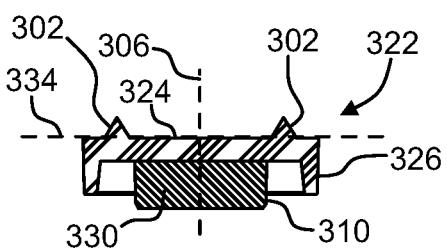

FIG. 114 is a diagrammatic perspective view similar to that of FIG. 101, but wherein the head portion of the marking apparatus has been inserted into a fastener slot in the object to be mounted and the marking apparatus is being rotated 90 degrees with respect to the fastener slot while the object retention element remaining in an open position, thereby trapping the head portion behind the slot;

FIG. 115 is a diagrammatic perspective view similar to that of FIG. 114, but wherein the marking apparatus is fully rotated 90 degrees with respect to the fastener slot thereby trapping the head portion behind the slot and allowing the slot alignment bosses to enter the slot;

FIG. 116 is a diagrammatic perspective view similar to that of FIG. 115, but wherein the cap element and underlying cover element are being rotated clockwise to move the tightening element toward its lock position;

FIG. 117 is a diagrammatic perspective view illustrating three marking apparatuses of the type shown in FIG. 112 secured squarely to the object to be mounted by way of the object's mounting slots similar to that of FIG. 107, and wherein the cap elements of the marking apparatuses have been removed thereby showing the marking substance deposited on the marking ends;

FIG. 118 is a diagrammatic perspective view illustrating the object of FIG. 117 with marking apparatuses secured thereto being pushed toward the mounting surface for leaving slot fastener location marks thereon;

FIG. 119 is a diagrammatic perspective view illustrating an example self-aligning slot-securable point marking tool fully-engaged with the T-screw security hanger hardware element so that the marker tip is aligned with the hardware slot;

FIG. 120 is a diagrammatic perspective view showing the object being pressed forward at the location of the marker tip of the point marking tool to cause the marking tip to mark the mounting surface thereunder;

FIG. 121 is a diagrammatic perspective view of the object shown in FIG. 120 being mounted to the mounting surface by way of the upper fastener brackets and the lower T-screw, wherein a specialized T-head torqueing tool is being used to begin rotating the head of the T-screw from the horizontal orientation toward a vertical orientation;

FIG. 122 is a diagrammatic perspective view similar to that of FIG. 121, but wherein the specialized T-head torqueing tool has fully rotated the head of the T-screw in the mounting surface to a vertical orientation so as to lock the security hardware hanger element on the object being mounted in engagement with the T-screw;

FIG. 123 is a diagrammatic flow chart of one example method for using marking apparatuses in accordance with the present disclosure, particularly marking apparatuses such as the one at FIG. 1;

FIG. 124 is a diagrammatic flow chart of one example method for using marking apparatuses in accordance with the present disclosure, particularly marking apparatuses such as the one at FIG. 36;

FIG. 125 is a diagrammatic top view of an example alternate object retention element configured to be used in conjunction with an alternate head portion for facilitating slotless mounting (e.g., cleat-mounting or sawtooth-mounting) of an object to a mounting surface in a desired alignment using the object as an alignment template;

FIG. 126 is a diagrammatic perspective view of the example alternate object retention element shown in FIG. 125;

FIG. 127 is a diagrammatic front view of the example alternate object retention element shown in FIG. 125;

FIG. 128 is a diagrammatic side view of the example alternate object retention element shown in FIG. 125;

FIG. 129 is a diagrammatic bottom view of the example alternate object retention element shown in FIG. 125;

FIG. 130 is a further diagrammatic perspective view of the example alternate object retention element shown in FIG. 125;

FIG. 131 is a diagrammatic side view of an example shaft member and head portion configured to be used in conjunction with the object retention element such as the one shown in FIG. 125 for facilitating slotless mounting (e.g., cleat-mounting or sawtooth-mounting) of an object to a mounting surface in a desired alignment using the object as an alignment template, wherein the inner face of the head portion has a 15-degree offset from the transverse axis;

FIG. 132 is a diagrammatic side view of an example shaft member and head portion similar to that of FIG. 131, but wherein the inner face of the head portion has a 30-degree offset from the transverse axis;

FIG. 133 is a diagrammatic side view of an example shaft member and head portion similar to that of FIG. 131, but wherein the inner face of the head portion has a 0-degree offset from the transverse axis;

FIG. 134 is a diagrammatic front view of a third example marking apparatus in accordance with the present disclosure, wherein the apparatus is configured for facilitating slotless cleat-mounting of an object to a mounting surface in a desired alignment using the object as an alignment template, and wherein the inner face of the head portion has a 15-degree grip angle with respect to the transverse axis in order to match a respective cleat angle;

FIG. 135 is a diagrammatic side view of the example marking apparatus shown in FIG. 134;

FIG. 136 is a diagrammatic bottom view of the example marking apparatus shown in FIG. 134;

FIG. 137 is a diagrammatic perspective view of an example shaft member and head portion for use with the example marking apparatus shown in FIG. 134;

FIG. 138 is a diagrammatic perspective view of the example marking apparatus shown in FIG. 134;

FIG. 139 is a further diagrammatic perspective view of the example marking apparatus shown in FIG. 134;

FIG. 140 is a diagrammatic cross-sectional view taken across lines 140-140 of FIG. 134;

FIG. 141 is a diagrammatic perspective view showing the apparatus of FIG. 134 grippingly secured to a cleat hardware element for use in mounting a corresponding object to a mounting surface, with the lip alignment detent of the objection retention element engaged by the mounting lip of the cleat hardware element;

FIG. 142 is a further diagrammatic perspective view of the apparatus and cleat hardware element of FIG. 140;

FIG. 143 is a diagrammatic plan view of a pair of apparatuses of FIG. 134 shown grippingly secured to a cleat hardware element, wherein the longitudinal axis of each apparatus is aligned with the mounting lip of the cleat hardware element;

FIG. 144 is a diagrammatic side view illustrating the marking apparatus of FIG. 134 grippingly secured to a cleat hardware element affixed to an object to be mounted, wherein the cover element is shown forced into its retracted position by pushing the object toward the mounting surface, thereby causing the marking tip to place a respective patch of marking substance on the mounting surface;

FIG. 145 is a diagrammatic partial cross-sectional view showing a wall-side cleat hardware element fastened to the mounting surface in alignment with the apparatus-placed mark resulting from the operation shown in FIG. 144;

FIG. 146 is a diagrammatic partial cross-sectional view similar to that of FIG. 145, but wherein the object with its cleat hardware element is hung on the corresponding wall-side cleat hardware element previously fastened to the mounting surface as shown in FIG. 145;

FIG. 147 is a diagrammatic front view of a marking apparatus similar to that of FIG. 134, but wherein the inner face of the head portion has a 30-degree grip angle with respect to the transverse axis in order to match a respective cleat angle;

FIG. 148 is a diagrammatic side view of the example marking apparatus shown in FIG. 147;

FIG. 149 is a diagrammatic bottom view of the example marking apparatus shown in FIG. 147;

FIG. 150 is a diagrammatic perspective view of an example shaft member and head portion for use with the example marking apparatus shown in FIG. 147;

FIG. 151 is a diagrammatic perspective view of the example marking apparatus shown in FIG. 147;

FIG. 152 is a further diagrammatic perspective view of the example marking apparatus shown in FIG. 147;

FIG. 153 is a diagrammatic cross-sectional view taken across lines 153-153 of FIG. 147;

FIG. 154 is a diagrammatic side view illustrating the marking apparatus of FIG. 147 grippingly secured to a cleat hardware element affixed to an object to be mounted, wherein the cover element is shown forced into its retracted position by pushing the object toward the mounting surface, thereby causing the marking tip to place a respective patch of marking substance on the mounting surface;

FIG. 155 is a diagrammatic partial cross-sectional view showing a wall-side cleat hardware element fastened to the mounting surface in alignment with the apparatus-placed mark resulting from the operation shown in FIG. 154;

FIG. 156 is a diagrammatic partial cross-sectional view similar to that of FIG. 145, but wherein the object with its cleat hardware element is hung on the corresponding wall-side cleat hardware element previously fastened to the mounting surface as shown in FIG. 155;

FIG. 157 is a diagrammatic front view of a marking apparatus also similar to that of FIG. 134, but wherein the inner face of the head portion has a 0-degree grip angle with respect to the transverse axis in order to match a respective cleat angle;

FIG. 158 is a diagrammatic side view of the example marking apparatus shown in FIG. 157;

FIG. 159 is a diagrammatic bottom view of the example marking apparatus shown in FIG. 157;

FIG. 160 is a diagrammatic perspective view of an example shaft member and head portion for use with the example marking apparatus shown in FIG. 157;

FIG. 161 is a diagrammatic perspective view of the example marking apparatus shown in FIG. 157;

FIG. 162 is a further diagrammatic perspective view of the example marking apparatus shown in FIG. 157;

FIG. 163 is a diagrammatic cross-sectional view taken across lines 163-163 of FIG. 157;

FIG. 164 is a diagrammatic perspective view showing the apparatus of FIG. 157 grippingly secured to a cleat hardware element for use in mounting a corresponding object to a mounting surface, with the lip alignment detent of the objection retention element engaged by the mounting lip of the cleat hardware element;

FIG. 165 is a further diagrammatic perspective view of the apparatus and cleat hardware element of FIG. 164;

FIG. 166 is a diagrammatic side view illustrating the marking apparatus of FIG. 157 grippingly secured to a cleat hardware element affixed to an object to be mounted, wherein the cover element is shown forced into its retracted position by pushing the object toward the mounting surface, thereby causing the marking tip to place a respective patch of marking substance on the mounting surface;

FIG. 167 is a diagrammatic partial cross-sectional view showing a wall-side cleat hardware element fastened to the mounting surface in alignment with the apparatus-placed mark resulting from the operation shown in FIG. 166;

FIG. 168 is a diagrammatic partial cross-sectional view similar to that of FIG. 167, but wherein the object with its cleat hardware element is hung on the corresponding wall-side cleat hardware element previously fastened to the mounting surface as shown in FIG. 167;

FIG. 169 is a diagrammatic perspective view of a conventional sawtooth hanger hardware element;

FIG. 170 is a diagrammatic front view of a marking apparatus of FIG. 157, but wherein the apparatus is shown grippingly secured to a convention sawtooth hanger hardware element as shown in FIG. 169;

FIG. 171 is a diagrammatic side view of the example marking apparatus and hardware element shown in FIG. 170;

FIG. 172 is a diagrammatic perspective view of the example marking apparatus and hardware element shown in FIG. 170;

FIG. 173 is a further diagrammatic perspective view of the example marking apparatus and hardware element shown in FIG. 170;

FIG. 174 is a diagrammatic perspective view of a fourth example marking apparatus in accordance with the present disclosure, wherein the apparatus is configured for facilitating slotless cleat-mounting of an object to a mounting surface in a desired alignment using the object as an alignment template, and wherein the inner face of the head portion has an adjustable grip angle with respect to the transverse axis in order to allow the apparatus to accommodate a variety of respective cleat angles;

FIG. 175 is a diagrammatic exploded view of one example shaft member and head portion subassembly for use in association with the apparatus shown on FIG. 174;

FIG. 176 is an enlarged diagrammatic perspective view of the head portion in accordance with the subassembly of FIG. 175;

FIG. 177 is a diagrammatic perspective view of a post element in accordance with the apparatus of FIG. 174 and the subassembly of FIG. 175;

FIG. 178 is a diagrammatic cross-sectional view of the apparatus of FIG. 174 showing the inner face of the head portion set to a 0-degree grip angle with respect to the transverse axis in order to match a respective cleat angle;

FIG. 179 is a diagrammatic cross-sectional view similar to that of FIG. 178, but wherein the inner face of the head portion is shown set to a 30-degree grip angle with respect to the transverse axis in order to match a respective cleat angle;

FIG. 180 is a diagrammatic top view of an example magnetic slot-securable point marking tool in accordance with the present disclosure;

FIG. 181 is a diagrammatic front view of the example magnetic slot-securable point marking tool of FIG. 180;

FIG. 182 is a diagrammatic bottom view of the example magnetic slot-securable point marking tool of FIG. 180;

FIG. 183 is a diagrammatic side view of the example magnetic slot-securable point marking tool of FIG. 180;

FIG. 184 is a diagrammatic cross-sectional view taken across lines 184-184 of FIG. 181;

FIG. 185 is a diagrammatic cross-sectional view taken across lines 185-185 of FIG. 183;

FIG. 186A is a diagrammatic cross-sectional view illustrating the magnetic slot-securable point marking tool of FIG. 180 before being magnetically affixed to a hanger hardware element having a fastener slot;

FIG. 186B is a diagrammatic cross-sectional view taken orthogonally to FIG. 186A;

FIG. 187A is a diagrammatic cross-sectional view similar to FIG. 186A, but wherein the magnetic slot-securable point marking tool is shown magnetically affixed to a hanger hardware element of an object, with the slot alignment protuberances being received by the fastener slot of the hardware element;

FIG. 187B is a diagrammatic cross-sectional view taken orthogonally to FIG. 187A;

FIG. 188A is a diagrammatic cross-sectional view similar to FIG. 187A, but wherein the object is being pressed forward to force the tip of the marking point element into the mounting surface, thereby marking the mounting surface thereat;

FIG. 188B is a diagrammatic cross-sectional view taken orthogonally to FIG. 187A;

FIG. 189 is a diagrammatic top view of an alternative example magnetic slot-securable point marking tool in accordance with the present disclosure, including two separate magnetic elements disposed between the offset portion and the unitary slot alignment protuberance, and including two marking point elements;

FIG. 190 is a diagrammatic bottom view of the example magnetic slot-securable point marking tool of FIG. 189;

FIG. 191 is a diagrammatic cross-sectional view taken across lines 191-191 of FIG. 189;

FIG. 192 is a diagrammatic cross-sectional view illustrating the magnetic slot-securable point marking tool of FIG. 189 shown magnetically affixed to a hanger hardware element of an object, with the slot alignment protuberance being received by the fastener slot of the hardware element;

FIG. 193 is a diagrammatic cross-sectional view similar to FIG. 192, but wherein the object is being pressed forward to force the tips of the two marking point elements into the mounting surface, thereby marking the mounting surface thereat;

FIG. 194 is a diagrammatic bottom view of a further alternative example magnetic slot-securable point marking tool in accordance with the present disclosure, wherein the slot alignment protuberance is also the at least one magnetic element; and FIG. 195 is a diagrammatic cross-sectional view taken across lines 195-195 of FIG. 194.

DETAILED DESCRIPTION OF THE PREFERRED EMBODIMENTS

Referring now to the drawings, like reference numerals designate identical or corresponding features throughout the several views.

With reference to the several drawings, various embodiments of a marking apparatus for facilitating blind mounting of an object 102 to a mounting surface 108 in a desired alignment using the object as an alignment template are shown generally at 100.

Exemplary embodiments of a marking apparatus 100 may comprise a post element 110, an object retention element 120 and a cover element 132.

Figure 14:
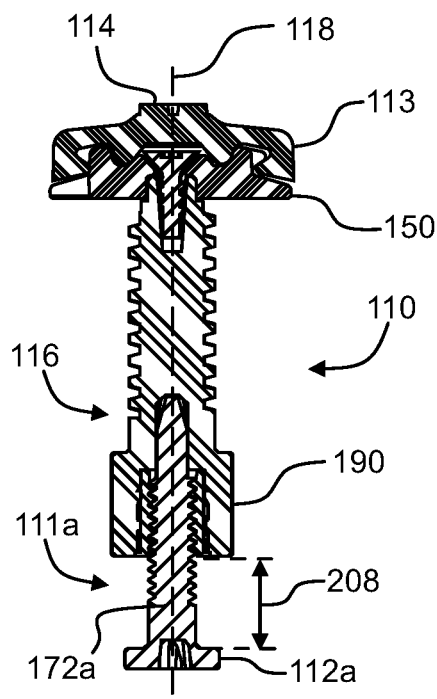
FIG. 14 is a diagrammatic cross-sectional view of a post element from the example marking apparatus of FIG. 1, wherein threaded engagement between the head adapter and the shaft member enables the head distance to be adjusted by relative rotation between the shaft member and the head adapter.
Figure 21:
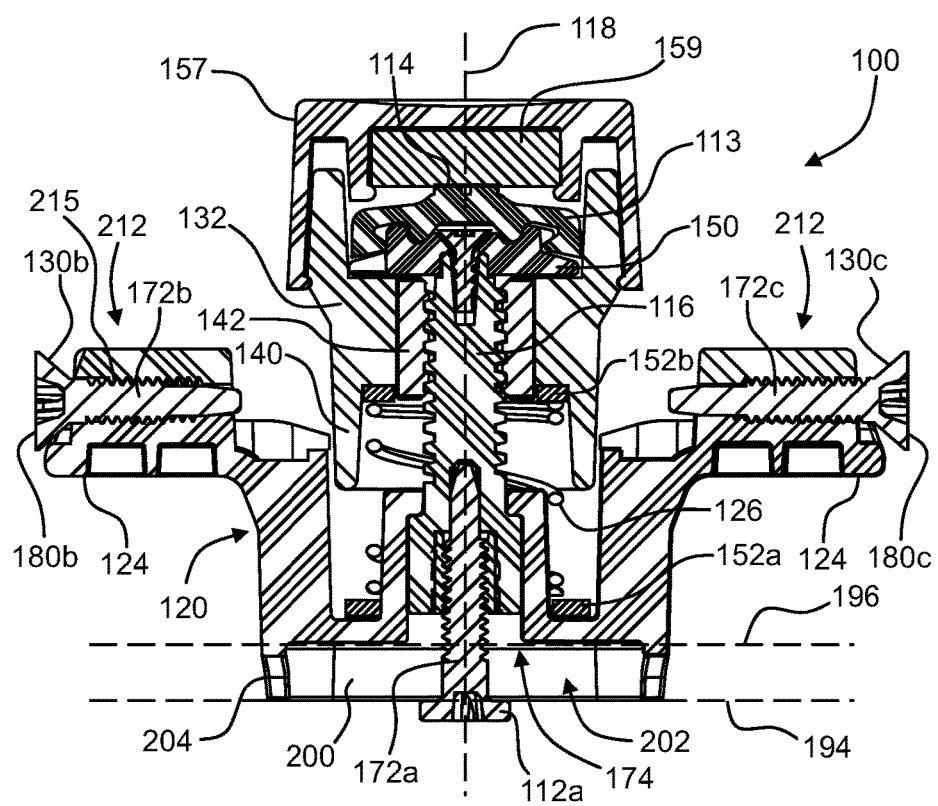
FIG. 21 is a diagrammatic cross-sectional view taken across lines 21-21 of FIG. 16.
Figure 22:
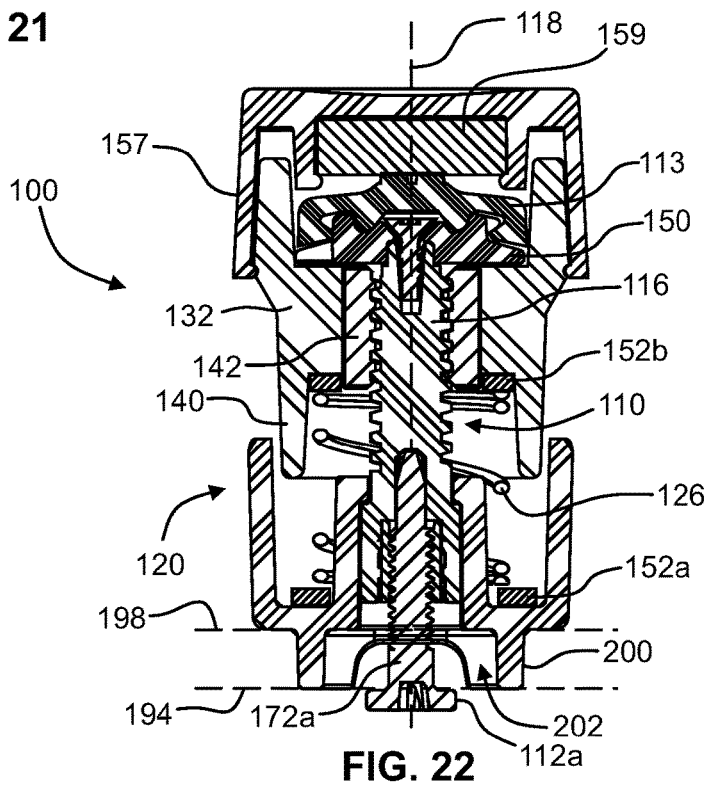
FIG. 22 is a diagrammatic cross-sectional view taken across lines 22-22 of FIG. 16.

Referring to FIGS. 3 and 14, in particular preferred embodiments, the post element 110 may include a shaft member 116, a marking end 114 and a first head adapter 111*a*. The shaft member 116 may have a rotational detent portion 190. The first head adapter 111*a* may have a first head portion 112*a* and a first shank portion 172*a*. Referring to FIGS. 21 and 22, the first head adapter 111*a* may be configured to be placed in releasable engagement with the shaft member 116 by way of the first shank portion 172 whereby the post element 110 extends from the first head portion 112*a* to the marking end 114 along a main axis 118. This releasable engagement may preferably be a threaded engagement. In the alternative, the releasable engagement may be a snap engagement or the like.

Figure 6:
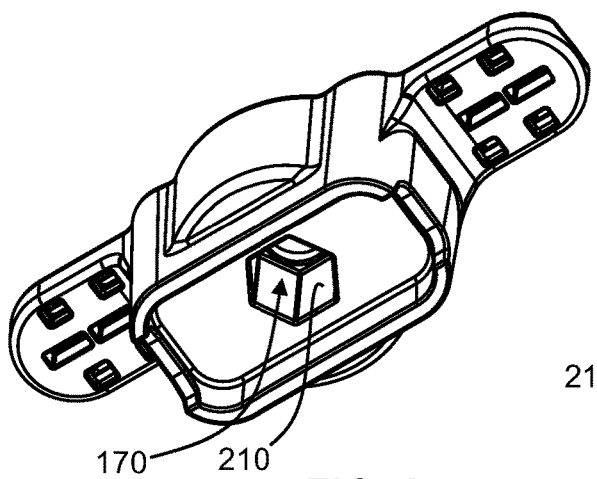
FIG. 6 is a diagrammatic perspective view of the object retention element of the example marking apparatus shown in FIG. 1.
Figure 7:
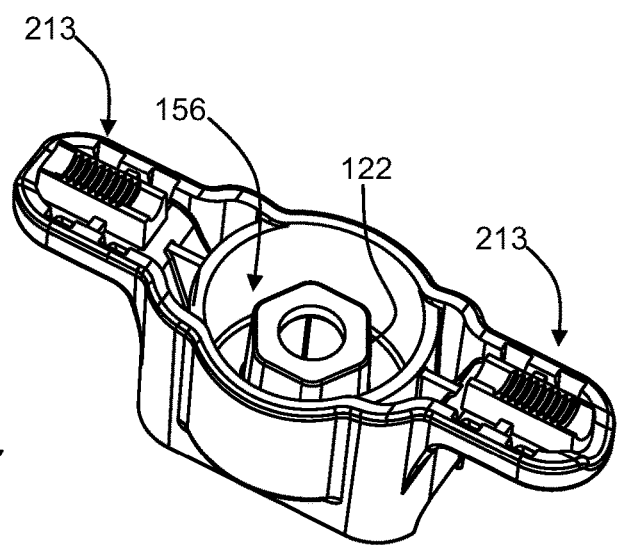
FIG. 7 is a further diagrammatic perspective view of the object retention element of the example marking apparatus shown in FIG. 1.
Figure 20:
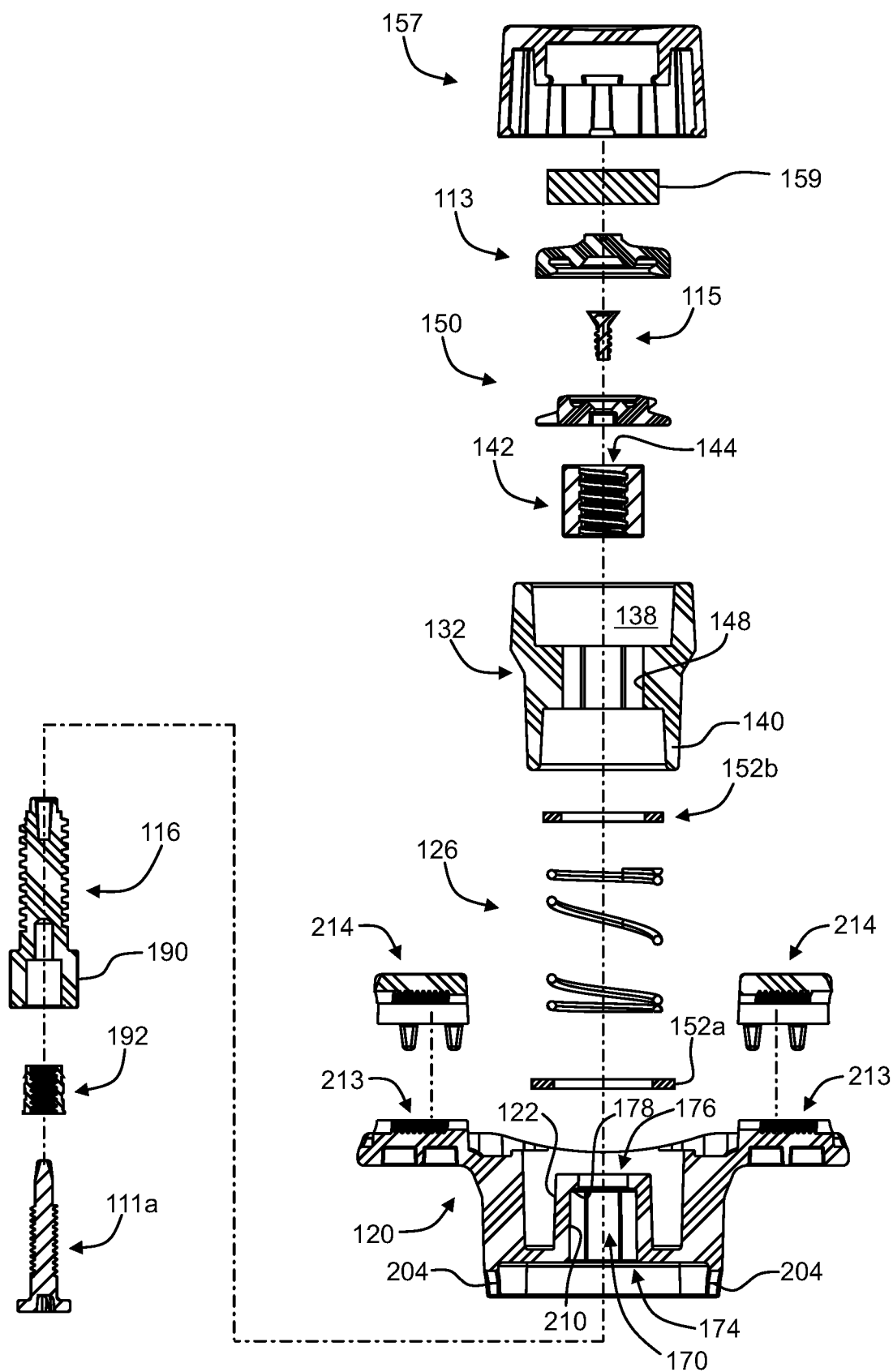
FIG. 20 is a diagrammatic exploded cross-sectional view taken across lines 21-21 of FIG. 16.
Figure 23:
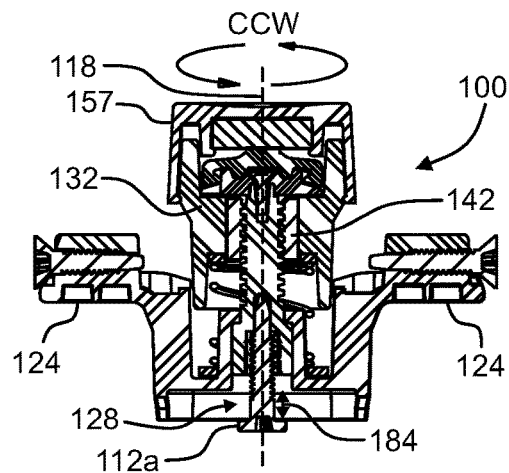
FIG. 23 is a diagrammatic cross-sectional view similar to that of FIG. 21, but wherein the cover element is shown being rotated counter-clockwise so as to ensure the tightening element is threadedly moved to a release position.
Figure 24:
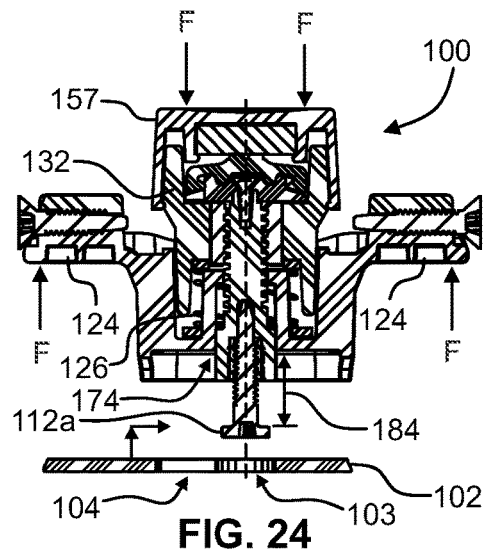
FIG. 24 is a diagrammatic cross-sectional view similar to that of FIG. 23, but wherein the object retention element is shown axially moved to its open position.
Figure 25:
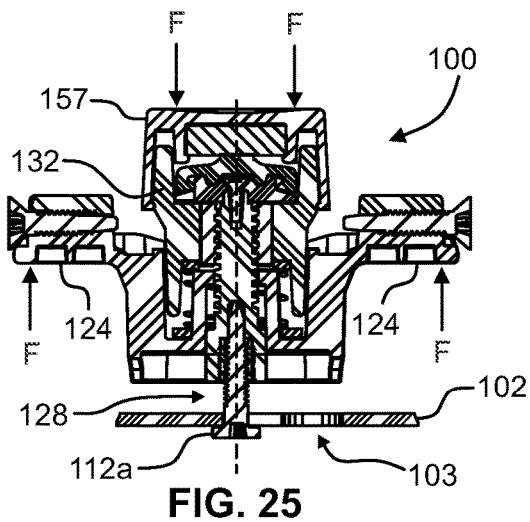
FIG. 25 is a diagrammatic cross-sectional view similar to that of FIG. 24, but wherein the head portion of the post element has been inserted through fastener head opening of a mounting slot of a respective object.
Figure 26:
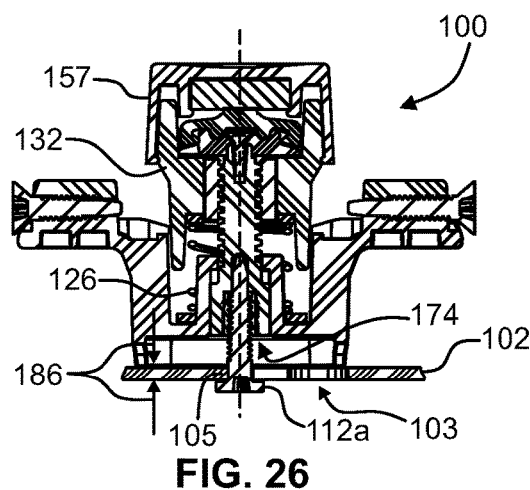
FIG. 26 is a diagrammatic cross-sectional view of the apparatus of FIG. 25, but showing the object retention element in a gripping position with the tightening element still in a release position.

Referring to FIGS. 6, 7 and 20, the object retention element 120 may have an alignment bore 170 extending along the main axis 118 between a bore proximal end 174 and a bore distal end 176. The alignment bore 170 may be in receipt of the post element 110 and include a rotational detent section 210. The rotational detent section 210 may be configured to engage the rotational detent portion 190 to restrict relative rotation between the shaft member 116 and the object retention element 120 about the main axis 118. The object retention element 120 may be movable with respect to the post element 110 along the main axis 118 between a closed position (see, for example, FIG. 23), an open position (see, for example, FIG. 24), and a gripping position therebetween (see, for example FIGS. 26 and 27). Referring to FIGS. 23 and 24, movement of the object retention element 120 from the closed position to the open position results in the expansion of a lip groove 128 for receiving a mounting lip of an object. The lip groove 128 may be at least partially defined by a gap distance 184 between the first head portion 112*a* and the bore proximal end 174. Referring to FIGS. 25, 26 and 28, movement of the object retention element 120 from the open position to the gripping position reduces the gap distance 184 for imposing onto the mounting lip 105 a gripping force 186 by the first head portion 112*a* toward the bore proximal end 174.

Figure 27:
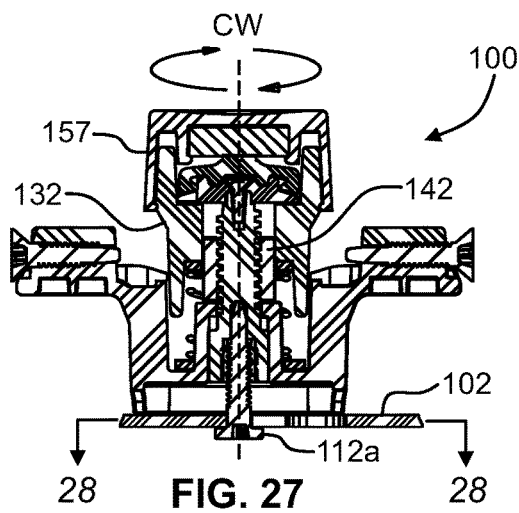
FIG. 27 is a diagrammatic cross-sectional view similar to that of FIG. 26, but showing the cover element being rotated while the rotational detent member remains non-rotatably engaged with the rotational detent face, thereby preventing the post element from being able to rotate with respect to the object retention element, to threadedly transport the tightening element to its lock position.
Figure 28:
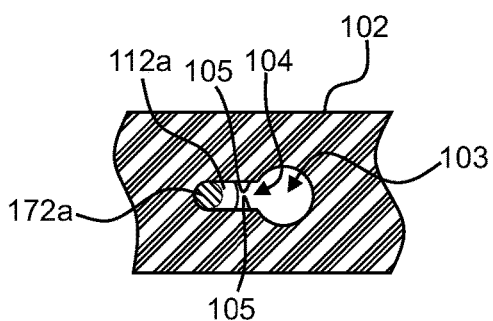
FIG. 28 is a diagrammatic cross-sectional view taken across lines 28-28 of FIG. 27.

Particular embodiments of the marking apparatus 100 may comprise a tightening element 142 transportable (e.g., threadedly) along the shaft member 116 between a release position (see, for example, FIG. 26) and a lock position (see, for example, FIG. 27). As a result, the tightening element may be configured to (i) when in the release position, allow movement of the object retention element 120 between the closed position and the open position, (ii) when in the lock position, prevent movement of the object retention element 120 from the gripping position toward the open position, and (iii) enable adjustability of the gripping force 186. The adjustability of the gripping force 186 may be configured to enable the gripping force 186 to be increased sufficiently so as to rigidly affix the marking apparatus 100 to the object 102.

A cover element 132 may be configured to engage the tightening element 142 to restrict relative rotational movement therebetween about the main axis 118 while enabling relative axial movement therebetween along the main axis 118.

Figure 15:
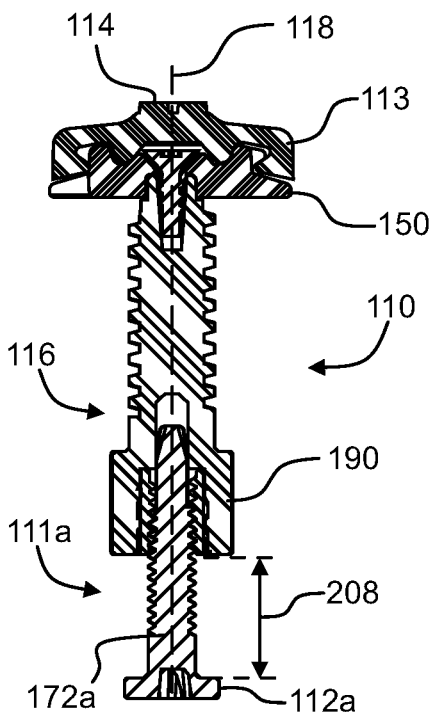
FIG. 15 is a diagrammatic cross-sectional view similar to that of FIG. 14, but wherein the head distance is increased by way of relative rotation between the head adapter and shaft member.
Figure 16:
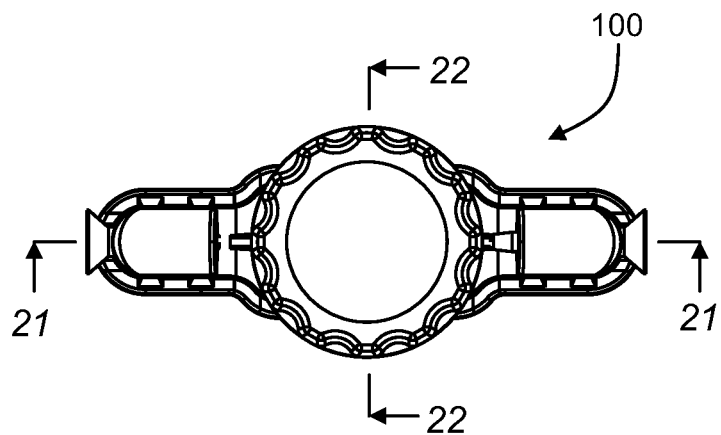
FIG. 16 is a diagrammatic top view of the example marking apparatus of FIG. 1.
Figure 17:
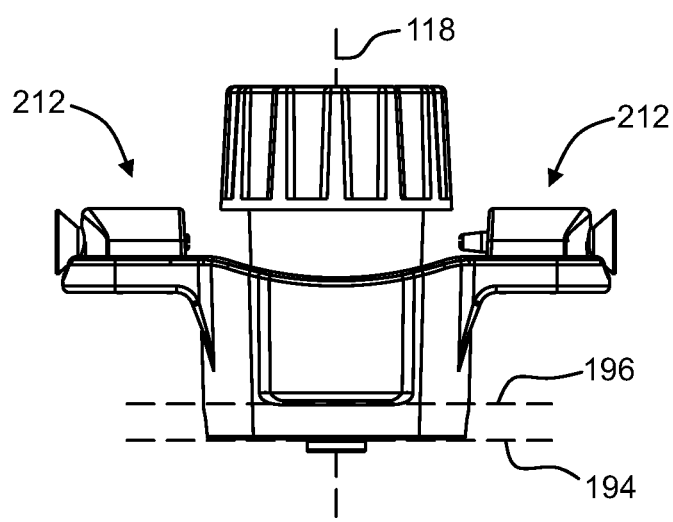
FIG. 17 is a diagrammatic front view of the example marking apparatus of FIG. 1.
Figure 18:
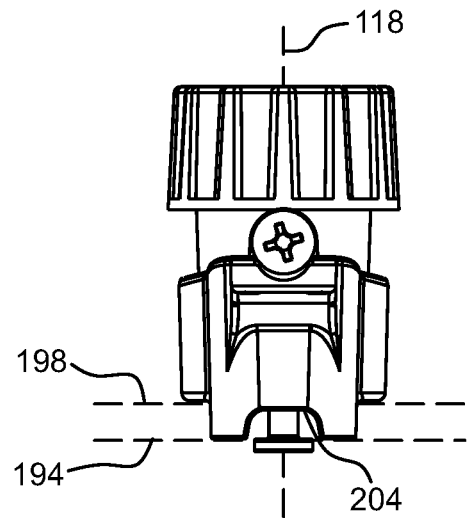
FIG. 18 is a diagrammatic side view of the example marking apparatus of FIG. 1.

Referring the FIGS. 14 and 15, in certain preferred embodiments of a marking apparatus 100, a head distance 208 is defined between the first head portion 112*a* and the shaft member 116. The releasable engagement between the first head adapter 111*a* and the shaft member 116 may be a threaded engagement enabling the head distance 208 to be adjusted by relative rotation between the shaft member 116 and the first head adapter 111*a*.

Figure 47:
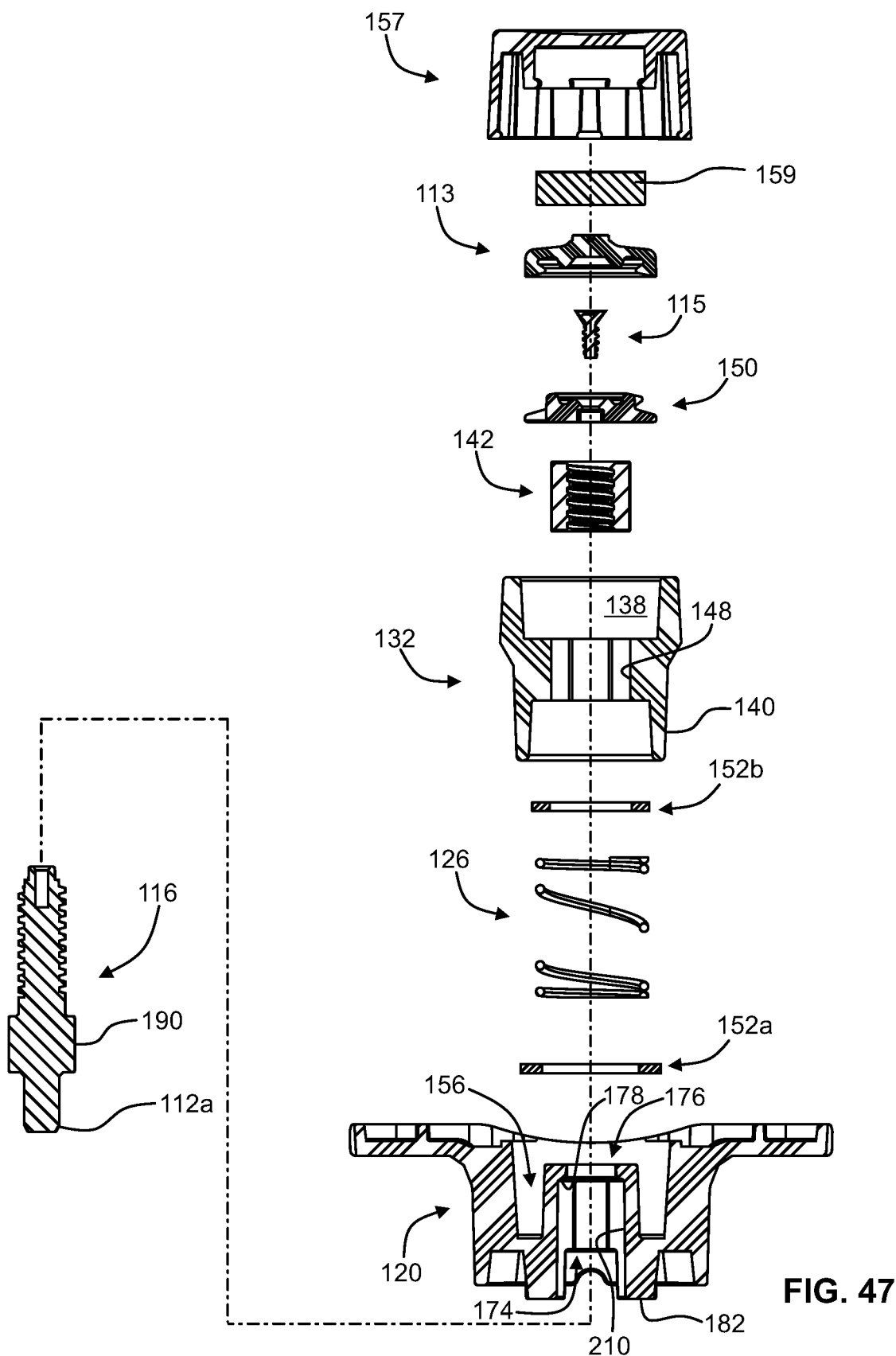
FIG. 47 is a diagrammatic exploded cross-sectional view taken across lines 48-48 of FIG. 43.
Figure 48:
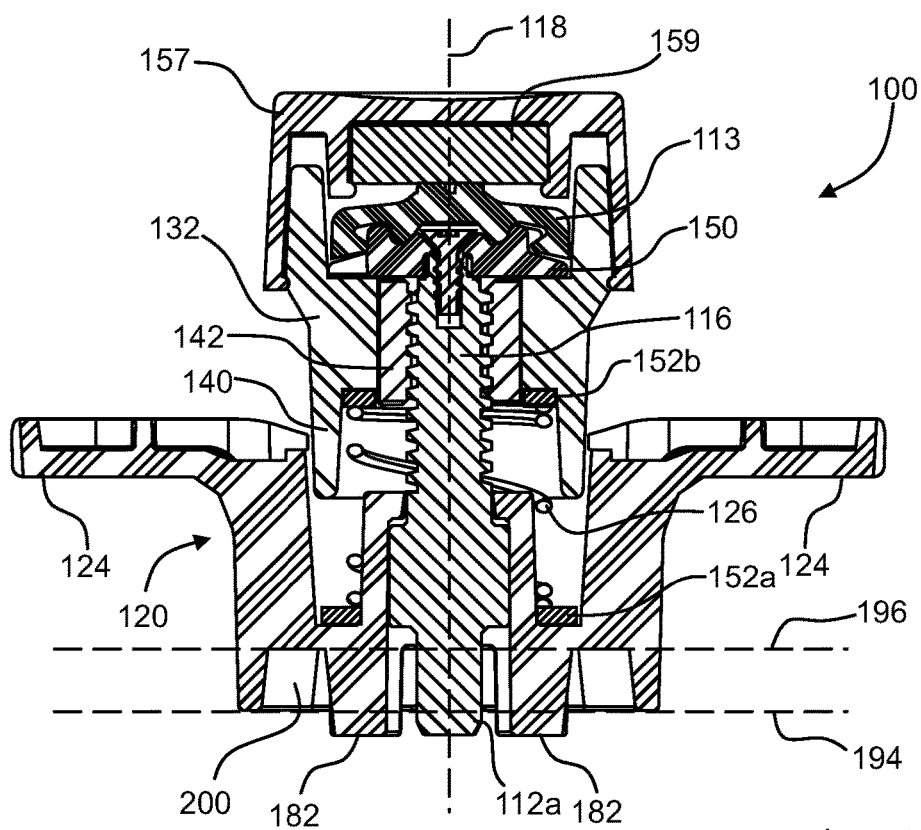
FIG. 48 is a diagrammatic cross-sectional view taken across lines 48-48 of FIG. 43.
Figure 49:
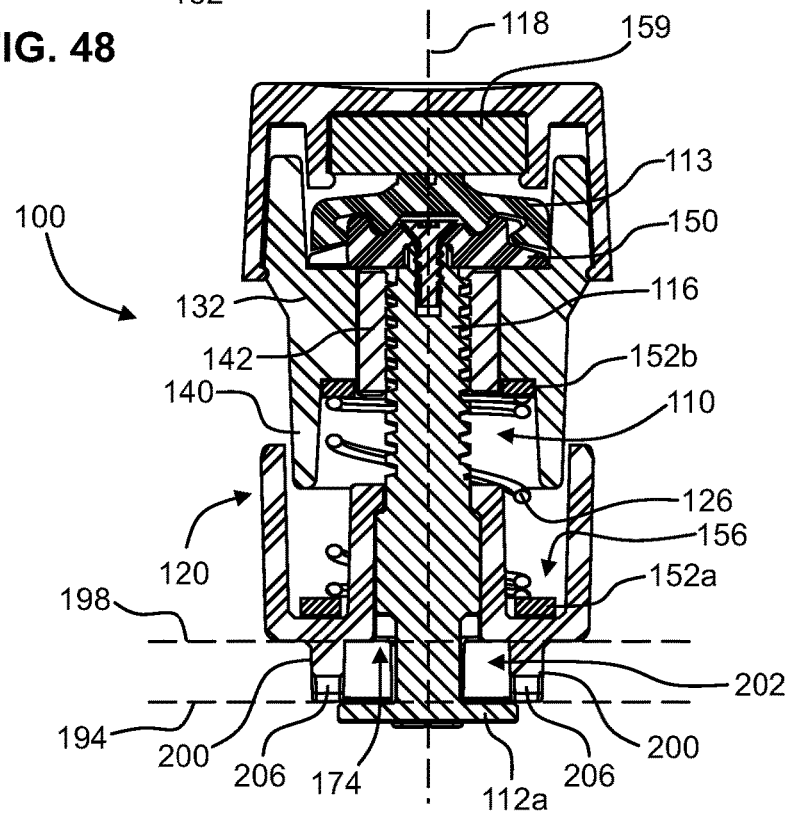
FIG. 49 is a diagrammatic cross-sectional view taken across lines 49-49 of FIG. 43.
Figure 50A:
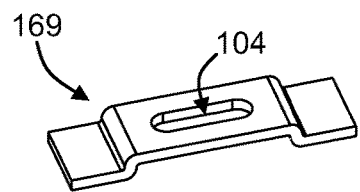
FIG. 50A is a diagrammatic perspective view of a conventional T-screw security hanger hardware element.
Figure 50B:
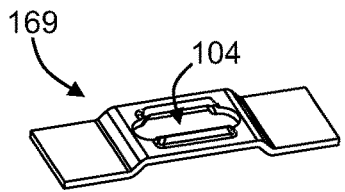
FIG. 50B is a diagrammatic perspective view of a second conventional T-screw security hanger hardware element.
Figure 50C:
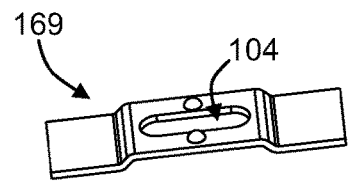
FIG. 50C is a diagrammatic perspective view of a third conventional T-screw security hanger hardware element.
Figure 51A:
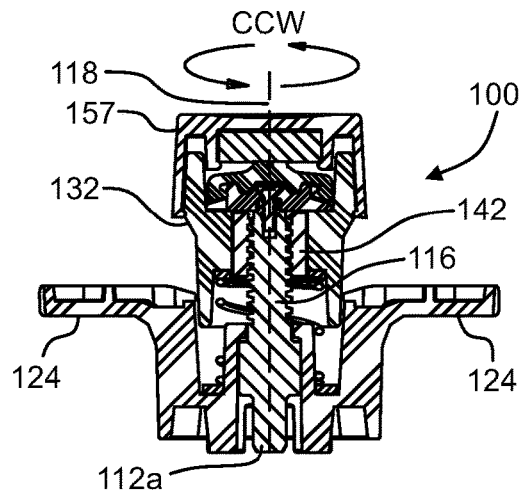
FIG. 51A is a diagrammatic cross-sectional view similar to that of FIG. 48, but wherein the cover element is shown being rotated counter-clockwise so as to ensure the tightening element is threadedly moved to a release position.
Figure 51B:
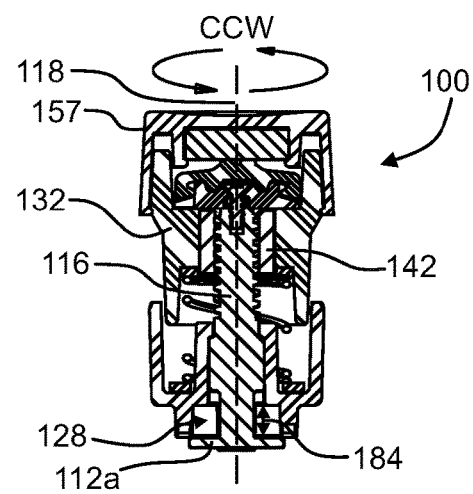
FIG. 51B is a diagrammatic cross-sectional taken at a 90-degree angle from FIG. 51A and showing the marking apparatus in the same configuration.
Figure 52A:
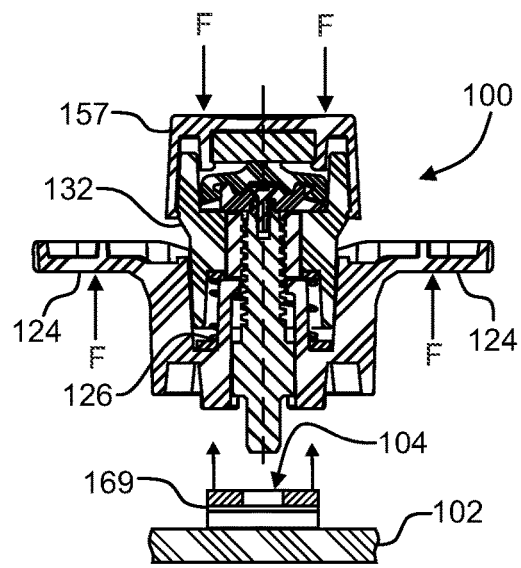
FIG. 52A is a diagrammatic cross-sectional view similar to that of FIG. 51A, but wherein the object retention element is shown axially moved to its open position.
Figure 52B:
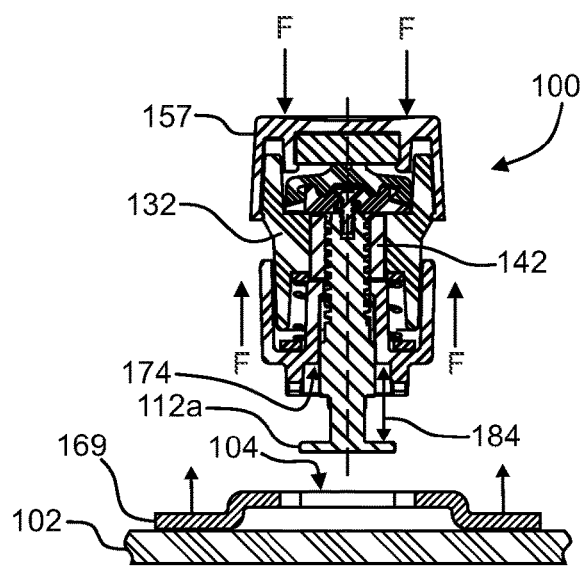
FIG. 52B is a diagrammatic cross-sectional taken at a 90-degree angle from FIG. 52A and showing the marking apparatus in the same configuration.
Figure 53A:
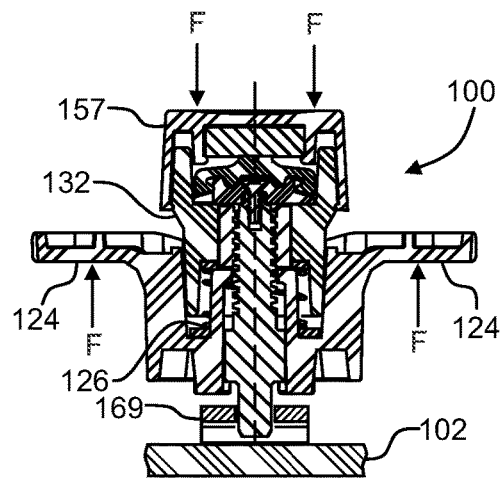
FIG. 53A is a diagrammatic cross-sectional view similar to that of FIG. 52A, but wherein the head portion of the post element has been inserted through a T-screw security hanger hardware element slot of a respective object.
Figure 53B:
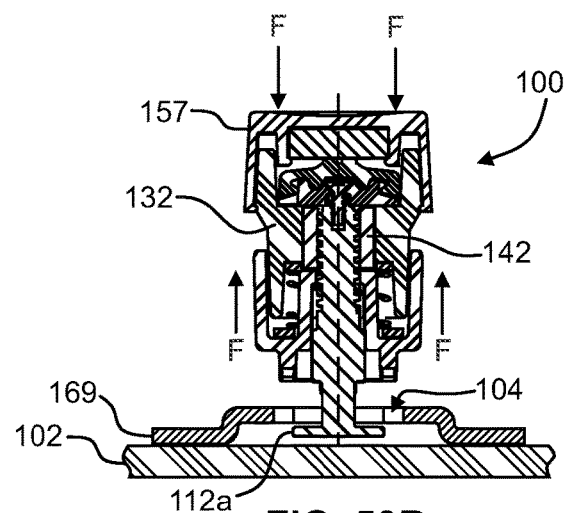
FIG. 53B is a diagrammatic cross-sectional taken at a 90-degree angle from FIG. 53A and showing the marking apparatus in the same configuration.
Figure 54A:
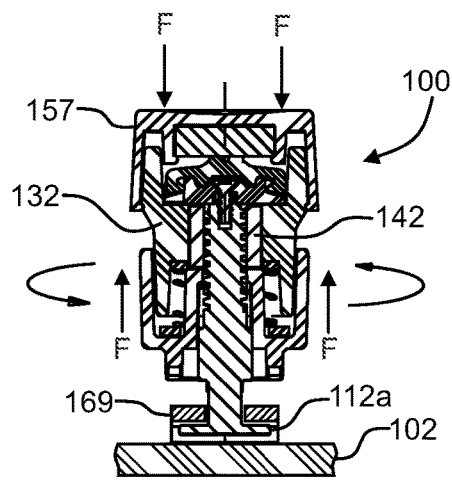
FIG. 54A is a diagrammatic cross-sectional view of the apparatus of FIG. 53A, but showing the apparatus having been rotated 90 degrees about the main axis so as to trap the elongated head portion behind the slot of the hardware element.
Figure 54B:
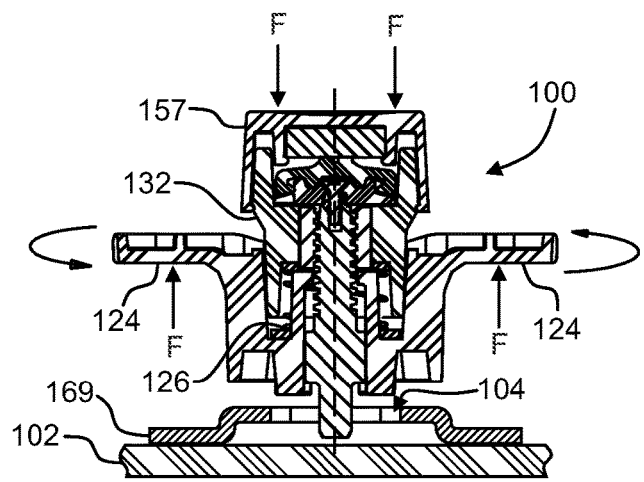
FIG. 54B is a diagrammatic cross-sectional taken at a 90-degree angle from FIG. 54A and showing the marking apparatus in the same configuration.
Figure 55A:
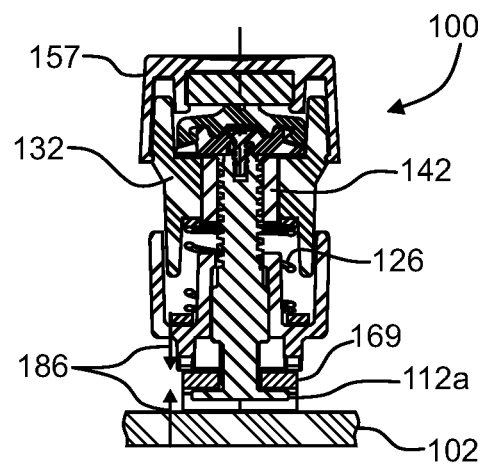
FIG. 55A is a diagrammatic cross-sectional view of the apparatus of FIG. 54A, but showing the object retention element in a gripping position with the tightening element still in a release position.
Figure 55B:
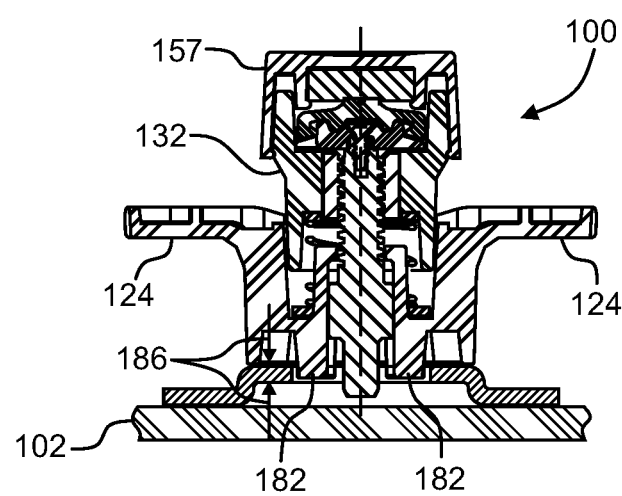
FIG. 55B is a diagrammatic cross-sectional taken at a 90-degree angle from FIG. 55A and showing the marking apparatus in the same configuration.
Figure 56A:
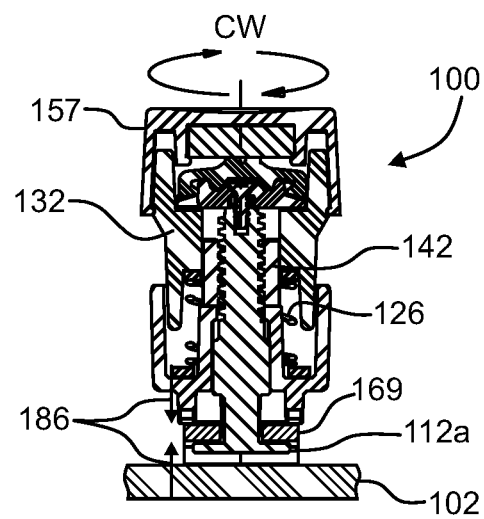
FIG. 56A is a diagrammatic cross-sectional view similar to that of FIG. 55A, but showing the cover element being rotated while the rotational detent member remains non-rotatably engaged with the rotational detent face, thereby preventing the post element from being able to rotate with respect to the object retention element, to threadedly transport the tightening element to its lock position.
Figure 56B:
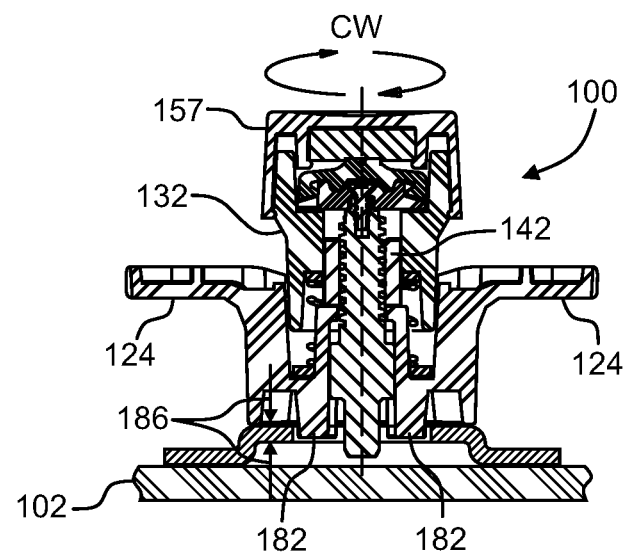
FIG. 56B is a diagrammatic cross-sectional taken at a 90-degree angle from FIG. 56A and showing the marking apparatus in the same configuration.
Figure 57:
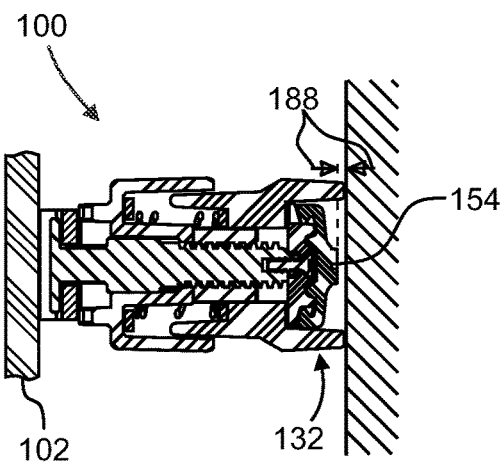
FIG. 57 is a diagrammatic cross-sectional view of the marking apparatus of FIG. 56A, but shown with the cap element removed and in a configuration in which the cover element is in its extended position and is positioned against the mounting surface prior to marking.
Figure 58:
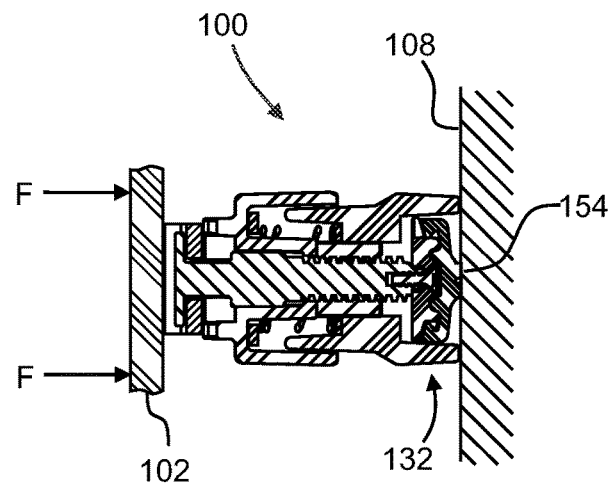
FIG. 58 is a diagrammatic cross-sectional view of the marking apparatus of FIG. 57, but shown in a further configuration in which the cover element is forced into its retracted position by pushing the object toward the mounting surface, thereby causing the marking tip to place a respective patch of marking substance on the mounting surface.
Figure 59A:
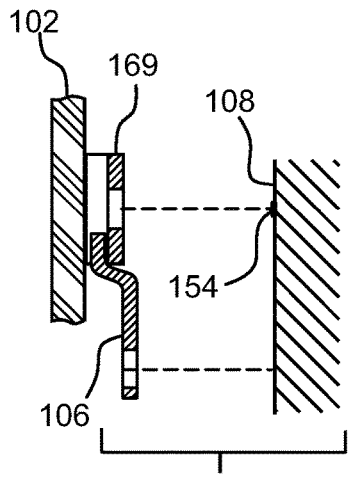
FIG. 59A is a diagrammatic partial cross-sectional view of a mounting surface with an apparatus-placed mark thereon, and showing the vertical distance between the mark applied by the marking apparatus and where the fastener element must be inserted, which the user would take note of prior to inserting the fastener.
Figure 59B:
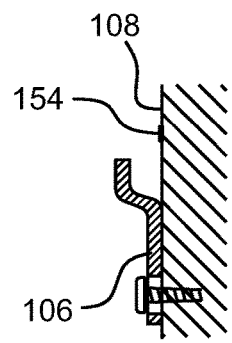
FIG. 59B is a diagrammatic partial cross-sectional view of a mounting surface with an apparatus-placed mark thereon, and the security hardware support bracket fastened in place.
Figure 59C:
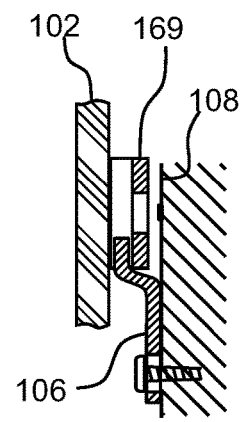
FIG. 59C is a diagrammatic partial cross-sectional view similar to that of FIG. 59B, but wherein the object with security hanger hardware element is hung on the mounted support bracket.
Figure 60A:
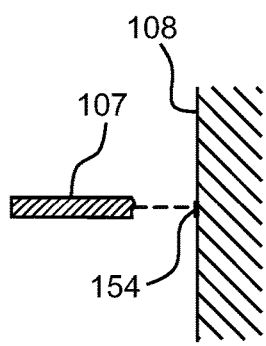
FIG. 60A is a diagrammatic partial cross-sectional view of a mounting surface with an apparatus-placed mark thereon, prior to inserting a T-screw fastener.
Figure 60B:
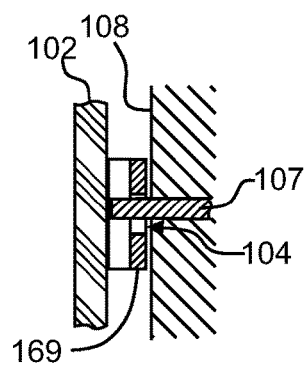
FIG. 60B is a diagrammatic partial cross-sectional view similar to that of FIG. 60A, but wherein the T-screw fastener is shown inserted into the mounting surface at the location of the apparatus-placed mark thereon and with the T-head being oriented horizontally.
Figure 60C:
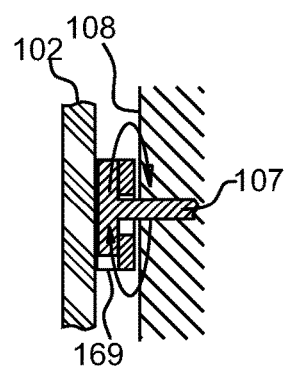
FIG. 60C is a diagrammatic partial cross-sectional view similar to that of FIG. 60B, but wherein the object with security hanger hardware element is hung on the T-screw fastener and with the T-head then being rotated toward a vertical position so as to lock the object to the mounting surface.
Figure 71:
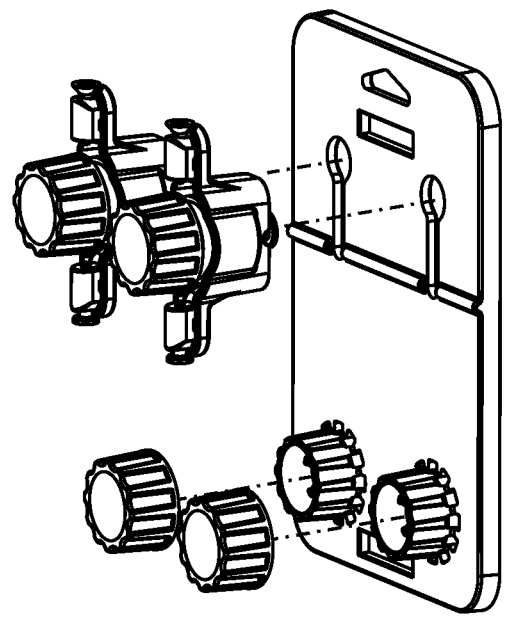
FIG. 71 is a diagrammatic exploded perspective view illustrating the assembly of one potential packaging system and method for a pair of consumer versions of the marking apparatus of the present disclosure, wherein additional cap elements are in included to provide alternate marking substance colors.
Figure 72:
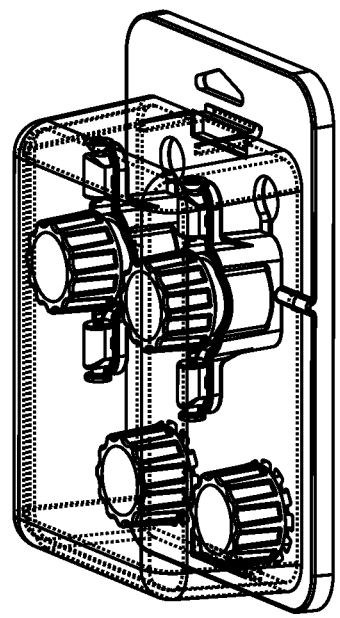
FIG. 72 is a diagrammatic perspective view of the assembled version of the packaging system of FIG. 71.
Figure 73:
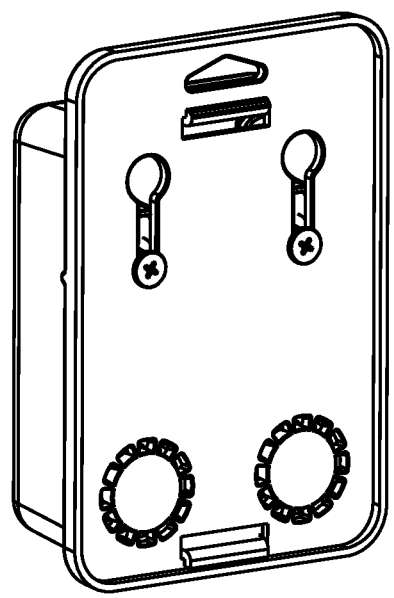
FIG. 73 is a further diagrammatic perspective view of the assembled packaging system of FIG. 72.
Figure 74:
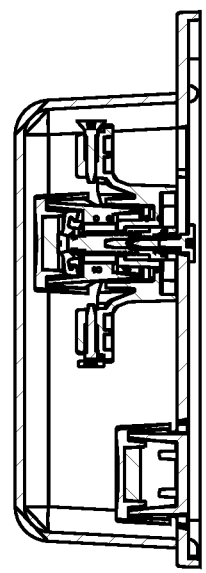
FIG. 74 is a diagrammatic cross-sectional view of the assembled packaging system of FIG. 72.
Figure 75:
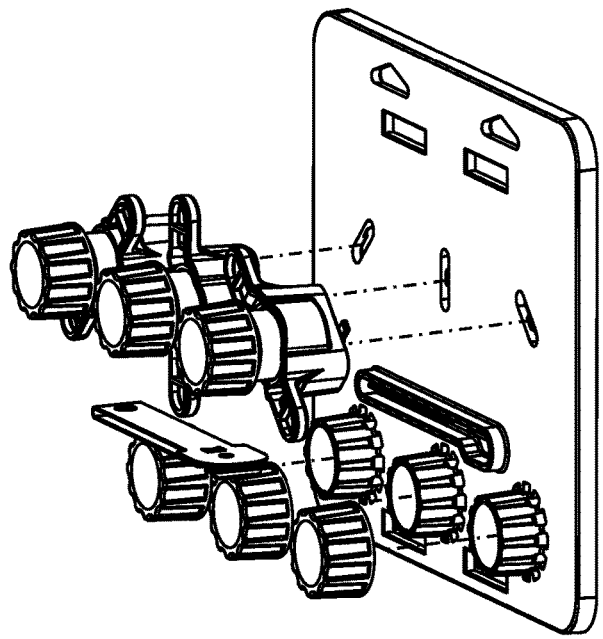
FIG. 75 is a diagrammatic exploded perspective view illustrating the assembly of one potential packaging system and method for a pair of commercial security versions of the marking apparatus of the present disclosure, wherein additional cap elements are in included to provide alternate marking substance colors.
Figure 76:
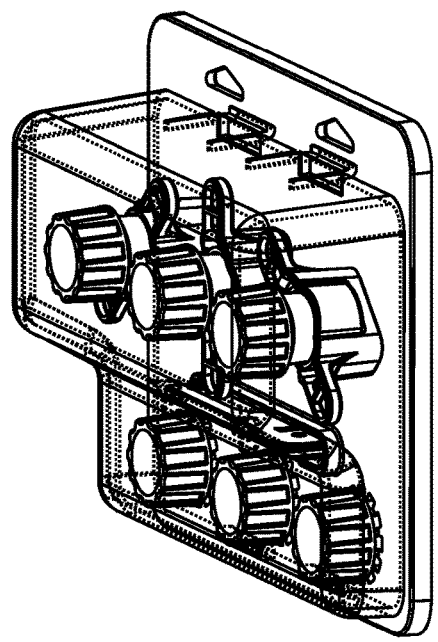
FIG. 76 is a diagrammatic perspective view of the assembled version of the packaging system of FIG. 75.
Figure 77:
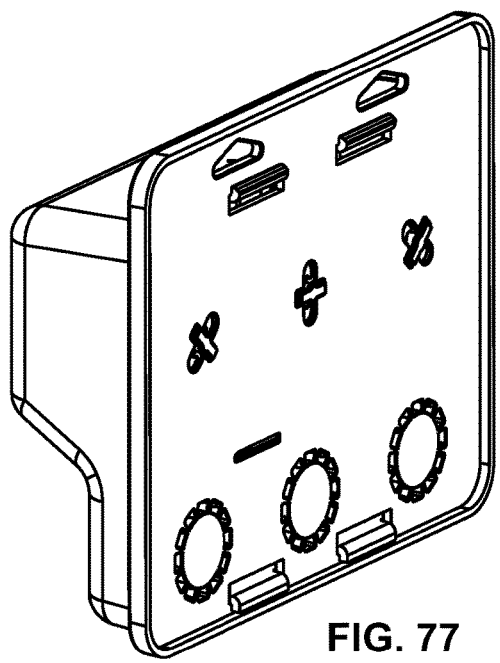
FIG. 77 is a further diagrammatic perspective view of the assembled packaging system of FIG. 76.
Figure 78:
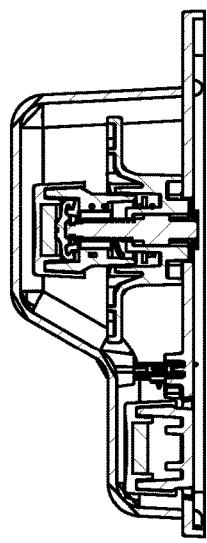
FIG. 78 is a diagrammatic cross-sectional view of the assembled packaging system of FIG. 76.
Figure 79A:
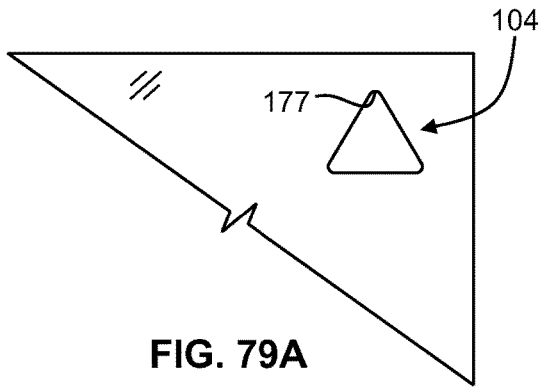
FIG. 79A is a diagrammatic partial plan view of an object with one alternate example shape of a slide-mount or fastener slot with respective slot closed end.
Figure 79B:
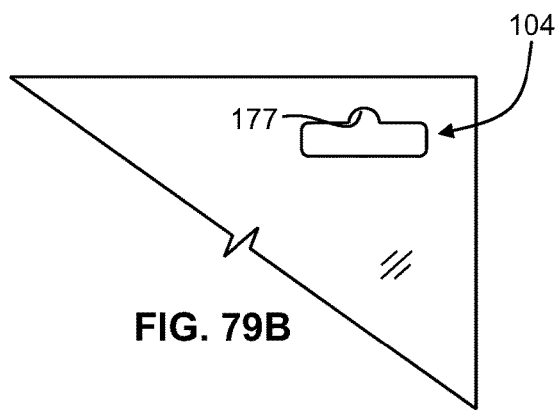
FIG. 79B is a diagrammatic partial plan view of an object with another alternate example shape of a slide-mount slot with respective slot closed end.
Figure 79C:
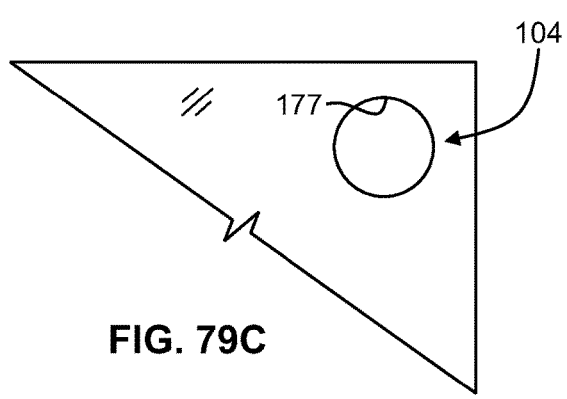
FIG. 79C is a diagrammatic partial plan view of an object with another alternate example shape of a slide-mount slot with respective slot closed end.
Figure 79D:
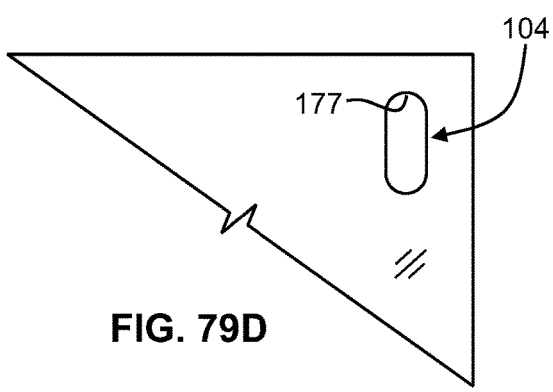
FIG. 79D is a diagrammatic partial plan view of an object with another alternate example shape of a slide-mount slot with respective slot closed end.
Figure 80:
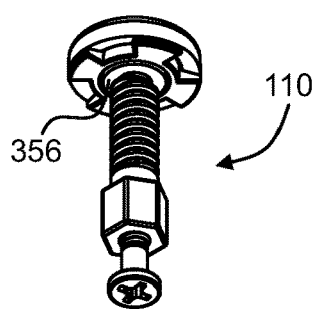
FIG. 80 is a diagrammatic perspective view of one example of a post element that includes a friction offset member in receipt of the shaft element in a manner restricting or preventing relative rotation therebetween.
Figure 81:
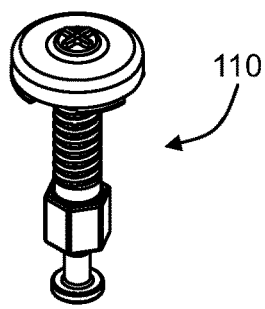
FIG. 81 is a further diagrammatic perspective view of the example post element of FIG. 80.
Figure 82:
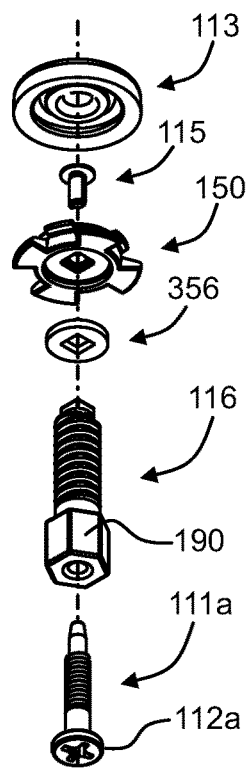
FIG. 82 is a diagrammatic exploded view of the example post element of FIG. 80.
Figure 83:
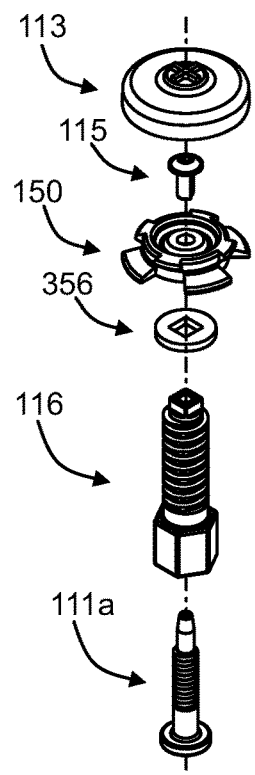
FIG. 83 is a further diagrammatic exploded view of the example post element of FIG. 80.
Figure 84:
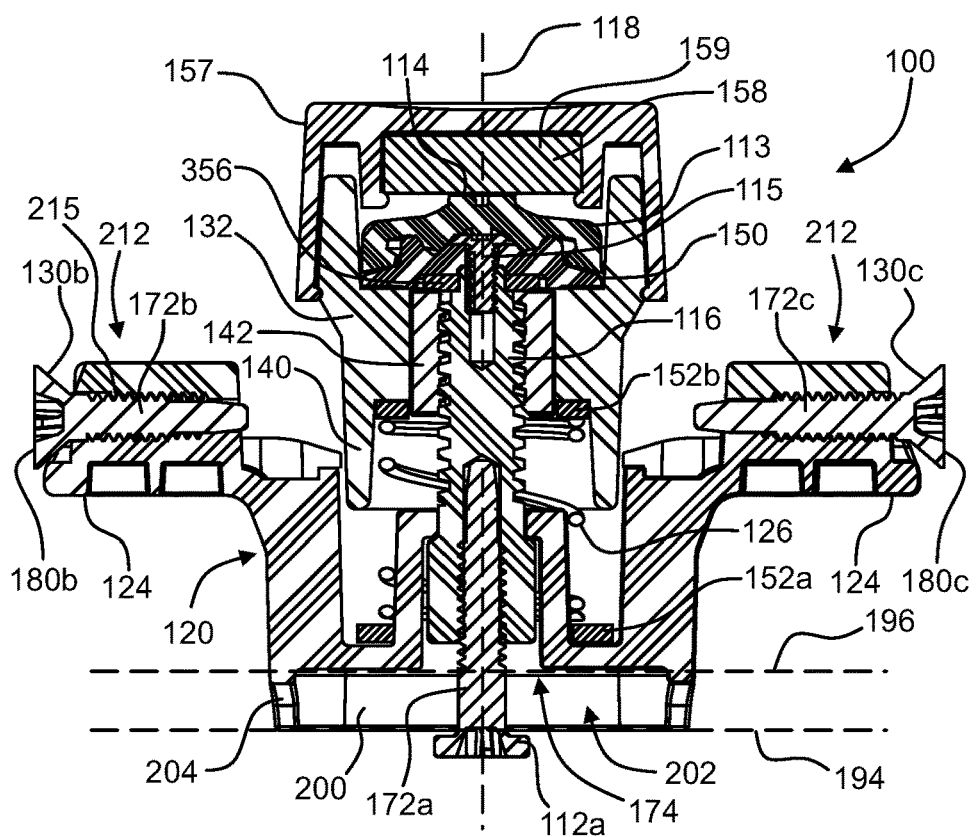
FIG. 84 is a diagrammatic cross-sectional view of another embodiment of a marking apparatus, wherein the post element includes a frictional offset washer as shown in FIG. 80.

In particular preferred embodiments of a marking apparatus 100, the shaft member 116 may be comprised of a polymer and may include a metallic (e.g., brass) threaded insert 192 by which the first head adapter 111a is in its threaded engagement with the shaft member 116. Alternatively, the shaft member 16 may be comprise of metal. Moreover, the shaft member, shank portion and head portion may be formed as a unitary component, as illustrated for example in FIG. 47.

Figure 34:
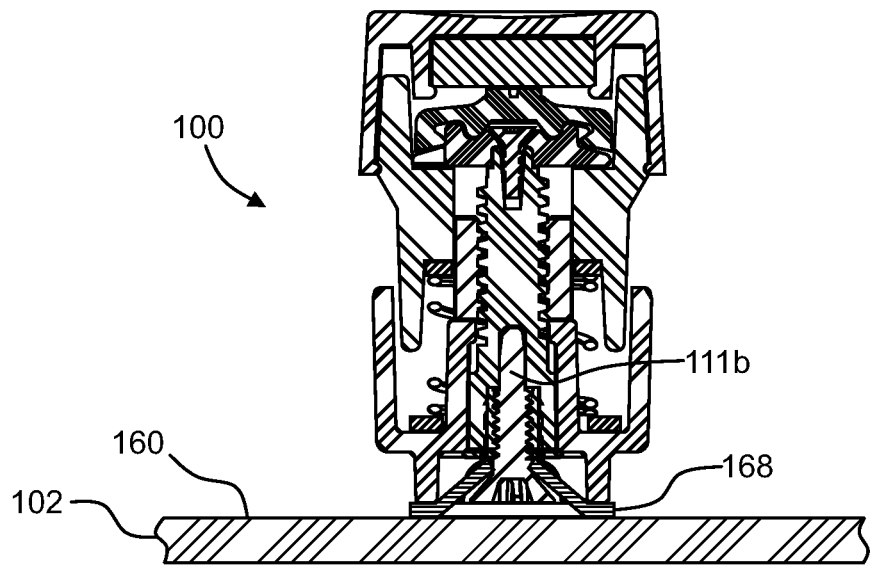
FIG. 34 is a diagrammatic cross-sectional view of the example marking apparatus shown in FIG. 1 in a configuration similar to that of FIG. 21, but wherein the marking apparatus is grippingly attached to a keyhole hardware element pre-mounted to the local planar surface of the respective object to be mounted, and wherein a head adapter with a tapered inner face substitutes for the previous head adapter having a substantially flat inner face.

Referring to FIGS. 3 and 21, certain preferred embodiments of a marking apparatus 100 may further comprise a second head adapter 111b including a second head portion 112b and a second shank portion 172b. The second head adapter 111b may be configured to be placed in said releasable engagement with the shaft member 116 in substitution of the first head adapter 111a, whereby the second head portion 112a substitutes for the first head portion 112a and the second shank portion 172b substitutes for the first shank portion 172a. See, for example, FIG. 34. In such embodiments, the first head portion 112a may include a first inner face 130a and a first outer face 180a. The first inner face 130a may be disposed between the first outer face 180a the first shank portion 172a. The first inner face 130a may extend radially of the first shank portion 172a in flat-planar fashion (see, for example, FIG. 14). Referring to FIG. 21, the second head portion 112b may include a second inner face 130b and a second outer face 180b. The second inner face 130b may be disposed between the second outer face 130b the second shank portion 172b. The second inner face 130b may be conically tapered with respect to the second shank portion 172b.

Figure 35:
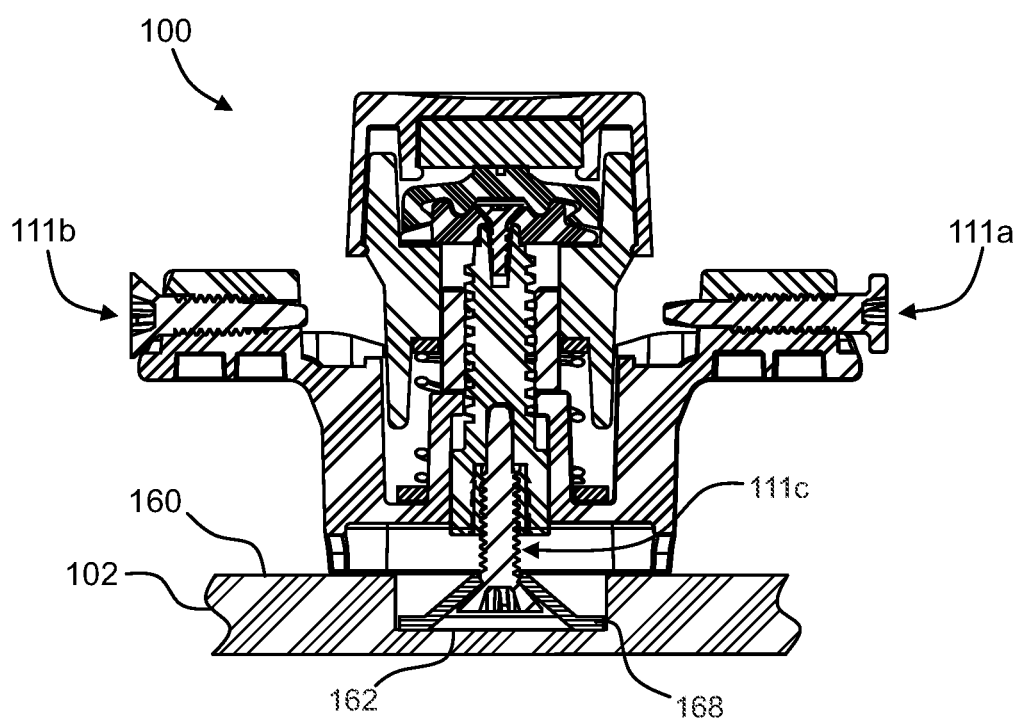
FIG. 35 is a diagrammatic cross-sectional view of the example marking apparatus similar to the configuration shown in FIG. 34, but wherein the marking apparatus is grippingly attached to a keyhole hardware element pre-mounted within a recess inward of the local planar surface of the respective object to be mounted, and wherein a head adapter with a longer shank substitutes for the shorter-shank head adapter used in FIG. 34.

Referring to FIGS. 3 and 21, particular embodiments of a marking apparatus 100 may further comprise a third head adapter 111c including a third head portion 112c and a third shank portion 172c. The third head adapter 111c may be configured to be placed in the aforementioned releasable engagement with the shaft member 116 in substitution of the first head adapter 111a (see, for example, FIG. 35), whereby the third head portion 112c substitutes for the first head portion 112a and the third shank portion 172c substitutes for the first shank portion 172a. In such embodiments, the third head portion 112c may include a third inner face 130c and a third outer face 180. The third inner face 130c may be disposed between the third outer face 180c the third shank portion 172c. The third inner face 130c may be conically tapered with respect to the third shank portion 172c. Referring to FIG. 21, the third shank portion 172c may be longer than the second shank portion 172b.

Figure 8:
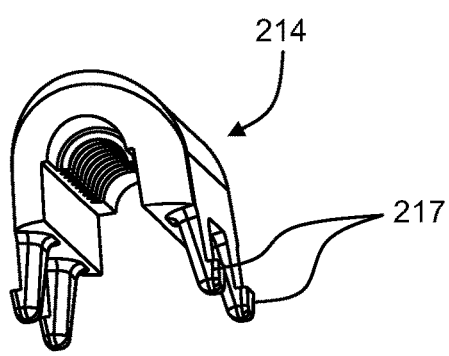
FIG. 8 is a diagrammatic perspective view of a fixture close-out element of the example marking apparatus shown in FIG. 1.
Figure 9:
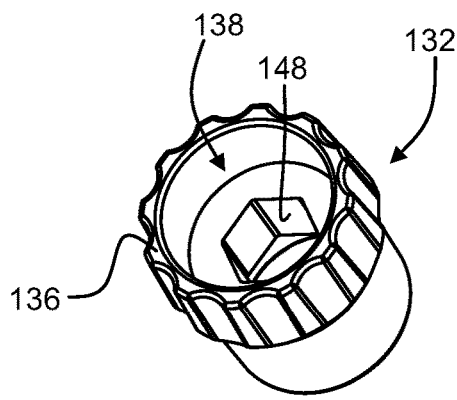
FIG. 9 is a diagrammatic perspective view of the cover element of the example marking apparatus shown in FIG. 1.

Referring to FIGS. 3 and 21, in certain embodiments of the marking adapter 100, the object retention element 120 may include finger grip portions 124 extending radially of the main axis 118. At least one of the finger grip portions 124 may include a head adapter fixture 212 configured to removably retain a respective head adapter for storage thereof. This removable retention may be, for example, by way of threaded interface between the head adapter fixture 212 and respective shank portion (172a, 172b or 172c). The head adapter fixture 212 may include a threaded fixture bore 215 for threadably receiving the respective shank portion. Referring to FIGS. 7 and 8, each head adapter fixture 212 may include a fixture close-out element 215 attached to a fixture base portion 213. In such embodiments, the threaded fixture bore 115 may be formed therebetween. The attachment of the fixture close-out element 214 to the fixture base portion 213 is by way of one or more cantilever snaps 217.

The cover element 132 may include a surface engagement portion 136 and may be movable with respect to the post element 110 along the main axis 118 between an extended position (see, for example, FIGS. 27 and 29) and a marking position (see, for example, FIG. 30). The cover element 132 may be elastically biased toward the extended position. The surface engagement portion 136 may extend axially beyond the marking end 114 when the cover element 132 is in the extended position, and may be axially aligned with or inward of the marking end 114 when the cover element 132 is in the marking position.

Referring to FIG. 21, in particular embodiments of the marking apparatus 100, the object retention element 120 may be resiliently biased toward the closed position, and may include a spring groove 156. The resilient bias and elastic bias may be provided by way of a spring element 126 at least partially disposed within the spring groove 156. Moreover, the marking apparatus may further comprise a first spring interface 152a washer and a second spring interface washer 152b. The first spring interface washer 152a may be disposed along the main axis 118 between the spring element 126 and the object retention element 120. The second spring interface washer 152b may be disposed along the main axis 118 between the spring element 126 and the cover element 132.

Figure 10:
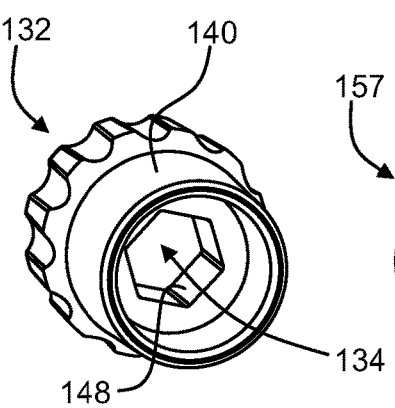
FIG. 10 is a further diagrammatic perspective view of the cover element of the example marking apparatus shown in FIG. 1.
Figure 11:
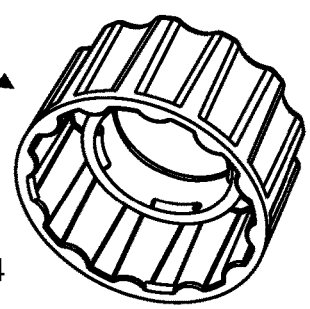
FIG. 11 is a diagrammatic perspective view of the cap element of the example marking apparatus shown in FIG. 1.

Referring to FIGS. 10 and 21, in certain embodiments of a marking apparatus 100 the cover element 132 may include a spring shroud 140 extending oppositely of the surface engagement portion 136. The spring shroud 140 may be in at least partial receipt of the spring element 126 and configured to be at least partially received by the spring groove 156 throughout the movement of the cover element 132 between extended and marking positions. Moreover, the spring groove 156 and spring shroud 140 may be configured to cooperate to fully-envelope the spring element 126 about the main axis 118 throughout the movement of the cover element 132 between extended and marking positions.

Referring to FIGS. 5, 14 and 21, in particular embodiments of a marking apparatus 100, the post element 110 may include a cover retention element 150 attached to the shaft portion 116 (e.g., by snap, adhesive or threaded arrangement). When the cover retention element 150 is attached to the shaft member 116, the cover retention element 150 may be configured to (a) axially retain the cover element 132 on the post element 110, (b) limit the axial distance between the surface engagement portion 136 and the marking end 114 when the cover element 132 is in the extended position, and (c) prevent the post element 110 from being removed from the object retention element 120.

Figure 12A:
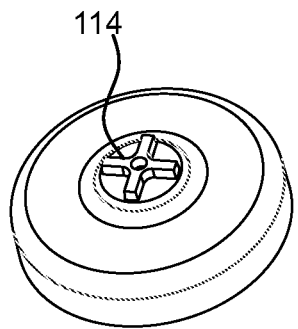
FIG. 12A is a diagrammatic perspective view of the stamp element of the example marking apparatus shown in FIG. 1.
Figure 12B:
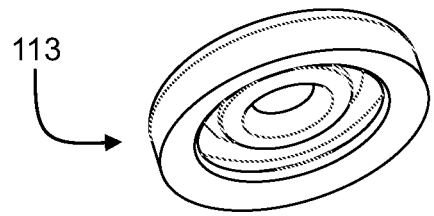
FIG. 12B is a further diagrammatic perspective view of the stamp element of the example marking apparatus shown in FIG. 1.
Figure 13A:
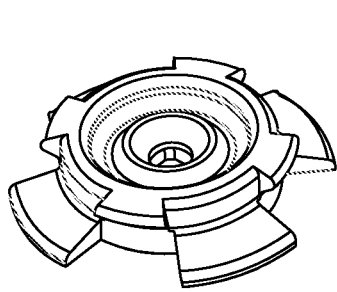
FIG. 13A is a diagrammatic perspective view of the cover retention element of the example marking apparatus shown in FIG. 1.
Figure 13B:
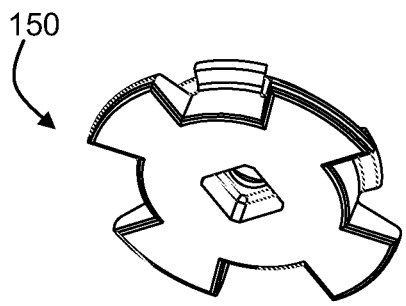
FIG. 13B is a further diagrammatic perspective view of the cover retention element of the example marking apparatus shown in FIG. 1.

Referring to FIGS. 12a-15, in particular embodiments of a marking apparatus 100, the post element 110 may include a stamp member 113 with the marking end 114 protruding therefrom. The stamp member 113 may be removably attached to the cover retention element 150, for example, by way of snap or press-fit. Referring to FIG. 12A, the marking end 114 may comprise a variety of point-target-like shapes, including a cross-shaped protrusion. Referring to FIGS. 5 and 14, the post element 110 may include a threaded fastener 115 configured to extend through the cover retention element 150 and be threadedly received by the shaft member 116. The threaded fastener 115 may thereby attach the cover element 132 to the shaft member 116.

Certain embodiment of a marking apparatus 100 may further comprise a cap element 157 with a marking substance pad 159 disposed therein. The cap element 157 may have an outer color which matches the color of the marking substance. The cap element 157 may preferably be configured to receivingly engage a portion of the cover element 132. For example, as shown in the several figures, the cap element may have internal features which are configured to engage complementary features on the outside surface the cover element 132. Accordingly, when the cap 157 is in the receiving engagement with the cover element 132, (i) the cap element 157 and the cover element 132 may be configured to restrict relative rotation therebetween about the main axis 118, and (ii) the marking substance pad 159 is contactable by the marking end 114.

Figure 19:
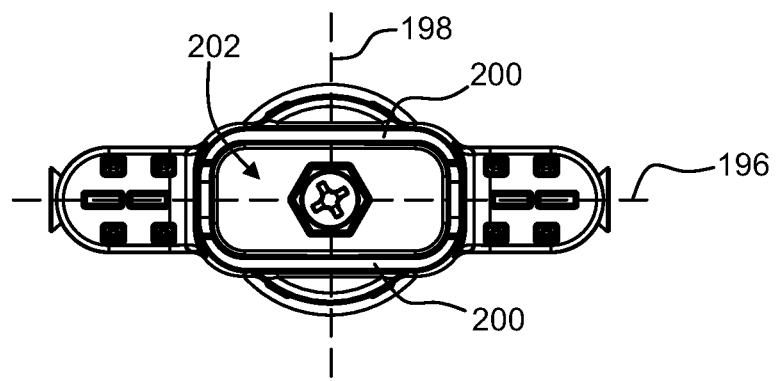
FIG. 19 is a diagrammatic bottom view of the example marking apparatus of FIG. 1.
Figure 46:
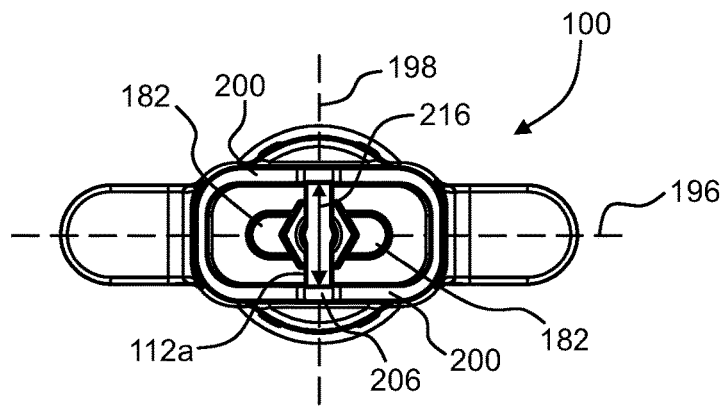
FIG. 46 is a diagrammatic bottom view of the example marking apparatus of FIG. 36.

Referring now to FIGS. 21, 22, 48 and 49, in particular preferred embodiments of a marking apparatus 100, the object retention element 120 may include an object reference plane 194, and one or more offset portions 200. The object reference plane 194 is preferably defined orthogonally to the main axis 118 and outward of the bore proximal end 174. A first offset portion and a second offset portion may extend to and terminate at the object reference plane, and be disposed on opposing sides of the main axis 118 thereby defining a hardware relief channel 202 therebetween. The offset portions 200 may be elongated and run parallel to one another, as shown for example in FIGS. 19 and 46. Moreover, as shown in FIGS. 19 and 46, the offset portions 200 may be part of a single continuous perimeter wall. In such case, the perimeter wall may include a pair of opposingly disposed hardware relief cuts 204.

Referring to FIGS. 20 and 21, in particular preferred embodiments of a marking apparatus 100, the alignment bore 170 may include an axial detent portion 178 configured to limit axial movement of the shaft member 116 in a retraction direction from the bore proximal 174 toward the bore distal end 176. The limitation of axial movement may be by way of, for example, engagement between the axial detent portion 178 and the rotational detent member 190.

Figure 41:
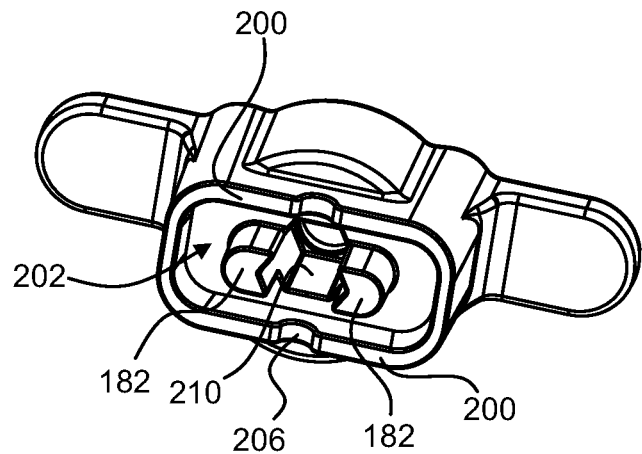
FIG. 41 is a diagrammatic perspective view of the object retention element of the example marking apparatus shown in FIG. 36.
Figure 42:
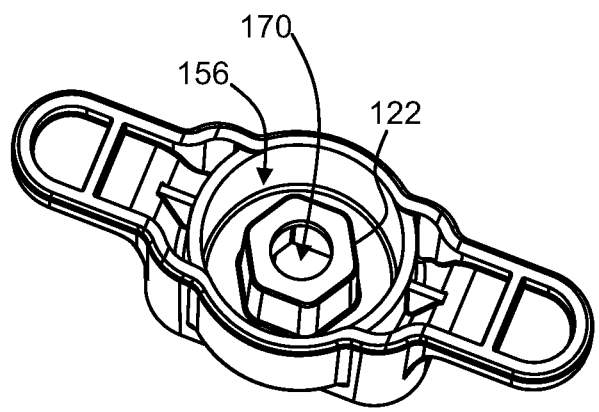
FIG. 42 is a further diagrammatic perspective view of the object retention element of the example marking apparatus shown in FIG. 36.
Figure 43:
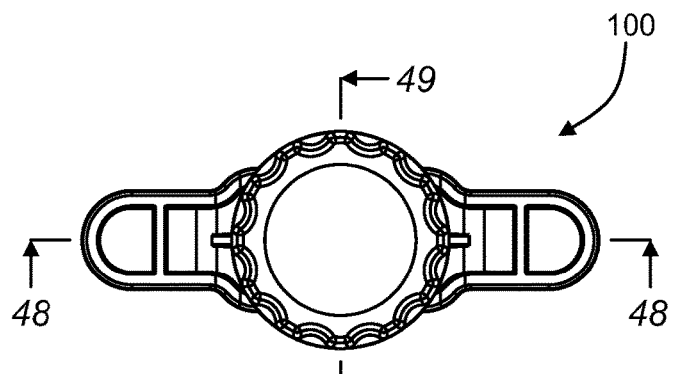
FIG. 43 is a diagrammatic top view of the example marking apparatus of FIG. 36.
Figure 44:
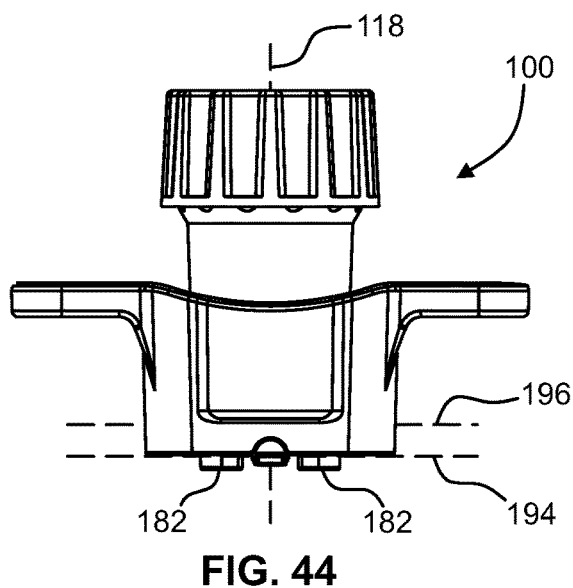
FIG. 44 is a diagrammatic front view of the example marking apparatus of FIG. 36.
Figure 45:
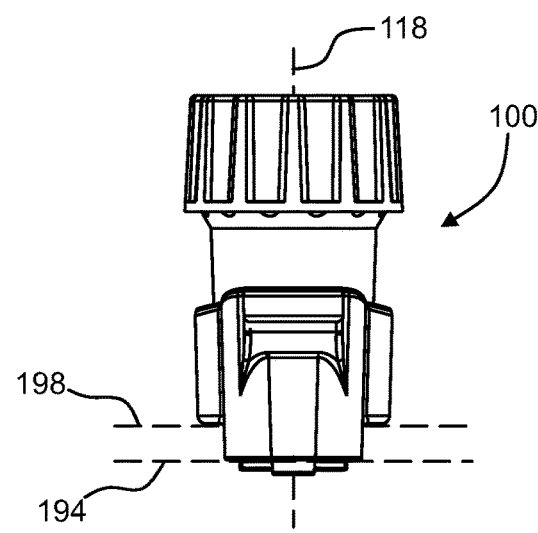
FIG. 45 is a diagrammatic side view of the example marking apparatus of FIG. 36.

Referring to FIGS. 39, 40 and 46, in certain preferred embodiments of a marking apparatus 100 the first head portion 112a is elongated along a head length 216 orthogonally to the main axis 118. In such embodiments, the head portion 112a may be oriented with the head length 216 parallel with the transverse axis 198. Moreover, the object retention element 120 may include at least one slot alignment boss 182 extending outward of the alignment bore 170 in a direction parallel to the main axis 118. The alignment boss 182 may be in distinct pairs or have boss portions on opposing sides of the main axis 118. The slot alignment bosses 182 may be disposed within the hardware relief channel 202 in embodiments in which such a channel exists. Referring to FIG. 46, the slot alignment bosses 182 may preferably be aligned with one another in parallel with the longitudinal axis 196. The at least one slot alignment boss 182 may extend beyond the object reference plane 194 in embodiments in which such a plane exists. In particular embodiments, at least one slot alignment boss 182 may include a boss termination end and a shoulder portion disposed inward thereof. Referring to FIGS. 41 and 46, the first and second offset portions 200 may each include a relief notch 206 therein, and the relief notches 206 may be aligned with one another in parallel with the transverse axis 198.

Referring to FIGS. 61-67, one example implementation of a slot-securable point marking tool 262 in accordance with the present disclosure may comprise a first arm portion 290 and a second arm portion 292. The first arm portion 290 may extend longitudinally from a base end 294 to a guide leading edge 316. The second arm portion 292 may extend longitudinally from the base end 294 to an insertion guide lip 298. Referring to FIGS. 61 and 63, the insertion guide lip 298 may preferably be angularly deflected away from the lateral guide portion 300.

A tool mouth 320 may be defined between the guide leading edge 316 and the insertion guide lip 298. A tool axis 308 may extend from the base end 294 to the tool mouth 320. A point axis 306 may be defined orthogonally to the tool axis 308. Referring to FIG. 65, the tool mouth 320 may be movable in a direction parallel to the point axis 306 between a securement configuration and an expanded configuration (an expanded configuration being shown in broken lines in FIG. 65). The tool mouth 320 may be resiliently biased toward the securement configuration. The second arm portion 292 may include at least one slot alignment protuberance 310 extending toward the first arm portion 290 in a direction parallel to the point axis 306. The second arm portion 292 may include a marking point element 302 extending along the point axis 306 oppositely of the at least one slot alignment protuberance 310.

Referring to FIGS. 65 and 68, in particular implementations of a slot-securable point marking tool 262 the one or more slot alignment protuberance 310 is collectively centered about the point axis 306. The implementation shown in FIGS. 61-70 includes two slot alignment protuberances 310 collectively centered about the point axis 306.

Referring to FIGS. 62, 65 and 68, in certain implementations of a slot-securable point marking tool 262, the marking point element 302 may be mounted in (e.g., extending through) a point-mounting protuberance 312 disposed between two slot alignment protuberances 310, and oppositely of the slot alignment protuberances 310 in a direction parallel to the point axis 306. For example, as shown in FIGS. 63, 65 and 68, the marking point element 302 may be threadedly mounted to the point-mounting protuberance 312. In such case, referring to FIGS. 62 and 66, a point element access port 314 may be provided in the first arm portion 290 in order to facilitate threaded mounting of the marking point element 302 in the point-mounting protuberance 312, so that the pointed tip of the marking point element 302 can extend outward of the second arm portion 292. Additionally, or in the alternative, the marking point element 302 may be mounted by way of weld joint, adhesive joint or the like. In further alternative, the marking point element 302 may be formed as an integral part of the second arm portion 292 or the point-mounting protuberance 312.

Referring to FIGS. 65, and 66, the first arm portion 290 may include a hardware insertion detent 304 between the base end 294 and the point axis 306. Referring to FIG. 70, the hardware insertion detent may act as an insertion stop when coming into engagement with the hanger hardware element 169.

Referring to FIGS. 66 and 67, in particular implementations of a slot-securable point marking tool 262, the first arm portion 290 may include a lateral guide portion 300 extending from the guide leading edge 316 toward the base end 294. The lateral guide portion 300 may include an opposing pair of guide lateral edges 318. Referring to FIG. 67, the guide lateral edges 318 may be disposed laterally of the tool axis 308 beyond the at least one slot alignment protuberance 310. Referring to FIGS. 62 and 67, the guide leading edge 316 may intersect the guide lateral edges 318 at respectively radiused or chamfered transition edges 332.

In certain preferred implementations of the slot-securable point marking tool 262, such as the one depicted in FIGS. 61-70, the first arm portion 290 and the second arm portion 292 may be unitarily formed of a single piece of material, such as sheet metal (e.g., a spring steel). Such construction may be what provides the tool mouth 320 its resilient bias toward its securement configuration. FIGS. 69 and 70 illustrate how particular preferred implementations of the slot-securable point marking tool 262 may be used in conjunction with a conventional security hanger hardware element 169 affixed to an object 102 in order to mark a mounting surface 108 where a corresponding slot fastener is to be placed.

Referring now to FIGS. 180-195, a magnetic slot-securable point marking tool 322 may comprise a base wall 324, at least one marking point element 302, at least one slot alignment protuberance 310, and at least one magnetic element 330. The base wall 324 may preferably define a tool plane. Referring to FIGS. Referring to FIGS. 181, 183, 184 and 191, the at least one marking point element 302 may extend outward of the base wall 324 in a direction orthogonal to the tool plane. Referring to FIGS. 189 and 191, in certain implementations, at least two said marking point elements 302 may extend outward of the base wall 324.

The at least one slot alignment protuberance 310 may extend outward of the base wall 324 in a direction orthogonal and oppositely of the at least one marking point element 302. Referring to FIGS. 187A and 192, the at least one magnetic element 330 may be configured to magnetically affix the base wall element 324 with respect to a hanger hardware element 169 having a fastener slot 104 when the at least one slot alignment protuberance 310 is received by the fastener slot.

Referring to FIGS. 182 and 185, in certain implementations of the magnetic slot-securable point marking tool 322, a magnetic element 330 may be disposed between two slot alignment protuberances 310. Additionally, or in the alternative, the base wall 324 may be comprised of magnetically-infused polymer or similar material, thereby comprising the at least one magnetic element 330. Additionally, or in the alternative, referring to FIGS. 194 and 195, the at least one slot alignment protuberance 310 may itself also be the at least one magnetic element 330.

Referring to FIGS. 181 and 185, in certain implementations of the magnetic slot-securable point marking tool 322, an offset portion 326 may extend from the base wall 324 oppositely of the at least one marking point element 302. In such case, referring to FIG. 190 a respective magnetic element 330 may be disposed between the offset portion 326 and a slot alignment protuberance 310. Referring to FIGS. 181 and 182, the offset portion 326 may include at least one relief notch 328.

Referring to FIGS. 125-179 illustrate various example embodiment of a further alternative marking apparatus 100 in accordance with the present disclosure, wherein the apparatuses 100 are particularly adapted for facilitating slotless mounting (e.g., via cleat or sawtooth-type hanger hardware elements) of an object to a mounting surface in a desired alignment using the object as an alignment template. As shown in these several figures, these particular-adapted apparatuses 100 may still include many or most of the components and features described above in connection with other versions of the apparatus.

The apparatuses 100 corresponding to FIGS. 125-179 may comprise a post element 110 including a specially-adapted head portion (e.g., such as those shown at 112d-112g), a marking end 114 and a shaft member 116 extending therebetween along a main axis 118. A transverse axis 198 may be defined orthogonally to the main axis 118. The head portion may have a nose end 340 and may extend radially of the main axis 118 to the nose end 340. The head portion (e.g., 112d-112g) may have a corresponding inner face (e.g., 130d-130g). Referring to FIGS. 140, 153 and 179, a grip angle 288 may be defined between the inner face and the transverse axis 198. In the apparatuses 100 corresponding to FIGS. 125-179, the head portion preferably extends asymmetrically outward of the main axis 118, typically at least from the main axis 118 to the nose end 340.

The apparatuses 100 corresponding to FIGS. 125-179 may comprise a specially-adapted object retention element 120 having an alignment bore 170 extending along the main axis 118 between a bore proximal end 174 and a bore distal end 176. The alignment bore 170 may be in receipt of the post element 110. Relative rotation between the object retention element 120 and the post element 110 (partially the shaft member 116 and the head portion) about the main axis 118 may be restricted (e.g., limited to small tolerances less than, for example 5 angular degrees). The object retention element 120 may be movable with respect to the post element 110 along the main axis 118 between the aforementioned closed position, an open position, and a gripping position therebetween.

Preferred embodiments of the apparatuses 100 corresponding to FIGS. 125-179 will comprise a tightening element 142 and cover element 132 in accordance with other portions of the present disclosure.

Referring to FIGS. 140, 153 and 163, depending upon the particular embodiment of the apparatus 100, the grip angle 288 may vary from, for example, 0 degrees to 30 degrees. These variances may be incremental based on the particular cleat hardware element 264 the respective apparatus 100 is adapted to accommodate. For example, as of the time of this disclosure, many conventional cleat hardware elements 264 are designed with cleat angle increments of 7.5 angular degrees (e.g., 7.5-degree cleats, 15-degree cleats, 22.5-degree cleats and 30-degree cleats). With these variances in mind, referring to FIGS. 178 and 179, in particular preferred embodiment of the apparatus 100, the grip angle 288 may be selectively adjustable.

As illustrated for example in FIGS. 178 and 179, the head portion 112g and the shaft member 116 may be cooperatively configured to enable the grip angle to 288 be selectively-adjustable. In certain such embodiments, the selective-adjustability may be in 7.5-degree increments. By way of example, referring to FIGS. 174-179, the head portion 112g shown in FIG. 176 may include a series of laterally-extending grooves (e.g., shown extending between the pin saddles 276) which are configured to receive respective laterally-extending splines in the lower portion of the post element 116 (e.g., the shaft member 116 in FIG. 175 depending upon which grip angle is desired. A rotation lock fastener 272 may extend through the head portion 112 and threadedly engage a head mounting pin 270 to keep the subassembly together with the selected grip angle rigidly maintained. In an alternative embodiment of the apparatus 100 in which the grip angle 288 is selectively adjustable, an adjustable frictional engagement between the head portion and the shaft member may rigidly maintain the selected grip angle. The adjustability of that frictional engagement may be by way of, for example, a threaded fastener extending through the head portion and correspondingly-adapted shaft member 118.

In particular embodiments of apparatuses 100 corresponding to FIGS. 125-179, a longitudinal axis 196 may be defined orthogonally to the main axis 118 and the transverse axis 198. Moreover, referring to FIGS. 127-130, the object retention element 120 may include at least one lip alignment detent 278 extending outward of the bore proximal end 174 and in coplanar alignment with the main axis 118 and longitudinal axis 196. In such embodiments, the object retention element 120 may include, for example, two lip alignment detents 278 and an opposing pair of lip relief grooves 280. Each lip relief groove 280 may preferably be in adjacent alignment with a respective one of the lip alignment detents 278. Furthermore, referring to FIG. 128, each lip relief groove 280 may include a chamfered cleat relief edge 282.

In certain embodiments of apparatuses 100 corresponding to FIGS. 125-179 in which the object retention element 120 includes two lip alignment detents 278 (see, e.g., FIG. 127-130) a relief notch 206 may be disposed in coplanar alignment with the main axis 118 and the transverse axis 198. Alternatively, or in addition, a head retraction relief 284 may be disposed in coplanar alignment with the main axis 118 and the transverse axis 198. Referring to FIG. 134, the head portion may have a head width 338 and the head retraction relief may have a relief width 336 equal to or greater than the head width 338. In further alterative or addition, referring to FIGS. 134, 135 and 137, a lip offset relief 286 may be defined at the interface of the shaft member 116 and the head portion. The lip offset relief 286 may be in coplanar alignment with the main axis 118 and the longitudinal axis 196.

Referring to FIGS. 80-84, in certain embodiments of a marking apparatus 100 the post element 110 may further include a friction offset member 356. The friction offset member 356 may preferably be (a) disposed between the cover retention element 150 and the tightening element 142; and (b) in engagement with the shaft member 116 in a manner restricting relative rotation between the shaft member 116 and the friction offset member 356 about the main axis 118. With regard to the development of the friction offset member 150, extensive testing of earlier prototypes of the marking apparatus 100 via cycle-testing between fully-tightened and fully-loosened revealed an opportunity for improvement of the apparatus's robustness. Specifically, in the early prototypes, full untightening put the tightening element 142 in contact with the cover retention element 150 secured by the retention screw 115, thereby exerting both axial and rotational forces on the cover retention element 150 and the retention screw 115. Both of these elements were able to withstand substantial untightening axial force, but were less capable of withstanding rotational force. To mitigate the rotational force on those elements, the frictional offset element 150 was designed to be keyed to the shaft member 116, thereby preventing rotational force from being transmitted from the tightening element 142 to the cover retention element 150 and retention screw 115.

Figure 94:
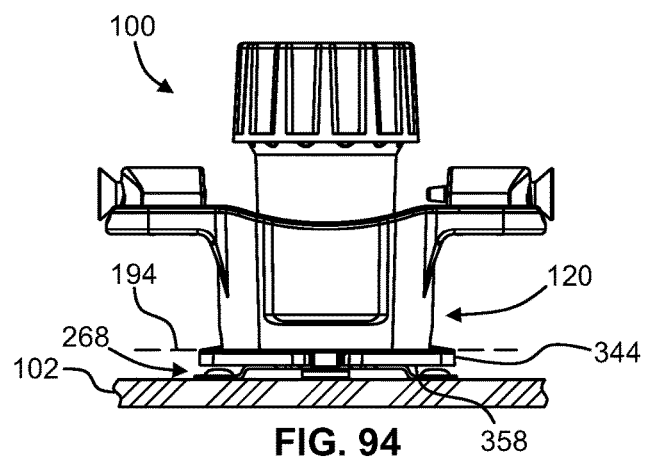
FIG. 94 is a diagrammatic front view of the marking apparatus, channel adapter and sawtooth hanger hardware element of FIG. 93 affixed to an object to be mounted to a mounting surface.

Referring to FIGS. 87-100, particular embodiments of a marking apparatus 100 may further comprise a channel adapter 344. A channel adapter 344 may preferably have an outboard surface 358 and may have a shank relief aperture 346. The channel adapter 344 may be configured to be releasably secured to the object retention element 120 such that the channel adapter 344 extends across the hardware relief channel 202 with the outboard surface 358 being parallel to the object reference plane 194 and flush with or extending outward of the object reference plane 194. FIG. 100 illustrates one case in which the outboard surface 358 of the channel adapter 344 is flush with the object reference plane 194. In contrast, FIGS. 94 and 96 illustrate two cases in which the outboard surface 358 of the channel adapter 344 extends outward of the object reference plane 194. Also, referring to FIGS. 89 and 100, when the channel adapter 344 is in its releasable securement, the post element 110 is preferably at least partially extendable through the shank relief aperture 346.

Figure 95:
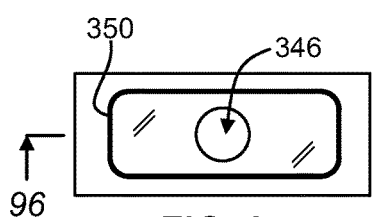
FIG. 95 is a diagrammatic plan view of one alternative example of a channel adapter, wherein the shank relief aperture has a diameter equal to or greater than the head portion of the post element, and an upper portion of the channel adapter includes an adapter friction element (e.g., an elastomer ring) to frictionally engage the inner surface of the hardware relief channel for releasably retaining the channel adapter.
Figure 97:
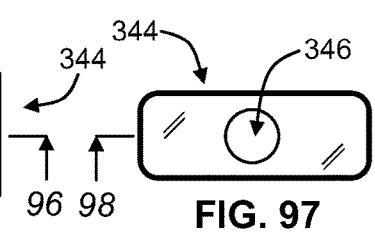
FIG. 97 is a diagrammatic plan view of another alternative example of a channel adapter, wherein the shank relief aperture has a diameter equal to or greater than the head portion of the post element, and the channel adapter is configured to be releasably frictionally retained entirely within the hardware relief channel so that its outboard face remains flush with the object reference plane.
Figure 96:
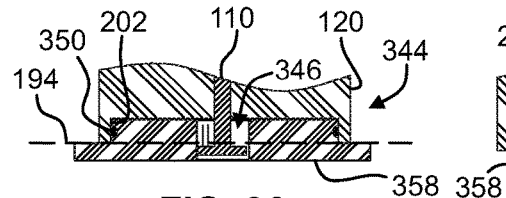
FIG. 96 is a diagrammatic cross-sectional view taken along lines 96-96 of FIG. 95; showing the channel adapter of FIG. 95 releasably secured to the object retention element by way of an elastomeric adapter friction element.
Figure 98:
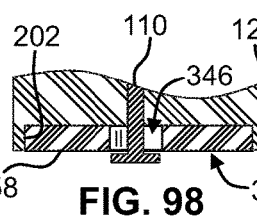
FIG. 98 is a diagrammatic cross-sectional view taken along lines 98-98 of FIG. 97, showing the channel adapter of FIG. 97 releasably secured to the object retention element within the hardware relief channel.

Referring to FIGS. 95-98, in certain embodiments of a marking apparatus 100 with a channel adapter 344, the releasable securement of the channel adapter 344 may be by way of frictional engagement between the channel adapter 344 and the hardware relief channel 202. Referring to FIGS. 95 and 96, in certain such embodiments, the channel adapter 344 may include an elastomeric adaptor friction element 350 for facilitating the frictional engagement.

Figure 99:
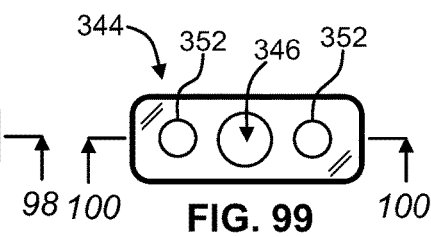
FIG. 99 is a diagrammatic plan view of further alternative example of a channel adapter, wherein the shank relief aperture has a diameter equal to or greater than the head portion of the post element, and the channel adapter is configured to be releasably magnetically retained in its releasable securement by way of one or more adapter magnet elements in magnetic engagement with one or more corresponding retention magnet elements of the object retain element.
Figure 100:
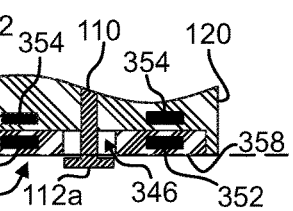
FIG. 100 is a diagrammatic cross-sectional view taken along lines 100-100 of FIG. 99, showing the channel adapter of FIG. 99 releasably secured to the object retention element within the hardware relief channel.

Referring to FIGS. 99 and 100, in particular embodiments of a marking apparatus 100 with a channel adapter 344, the releasable securement may be by way of magnetic engagement between the channel adapter 344 and the object retention element 120. By way of example, the channel adapter 344 may include one or more adapter magnet elements 352 in magnetic engagement with one or more corresponding retention magnet elements 354 of the object retention element 120.

Figures 87, 88, 89:
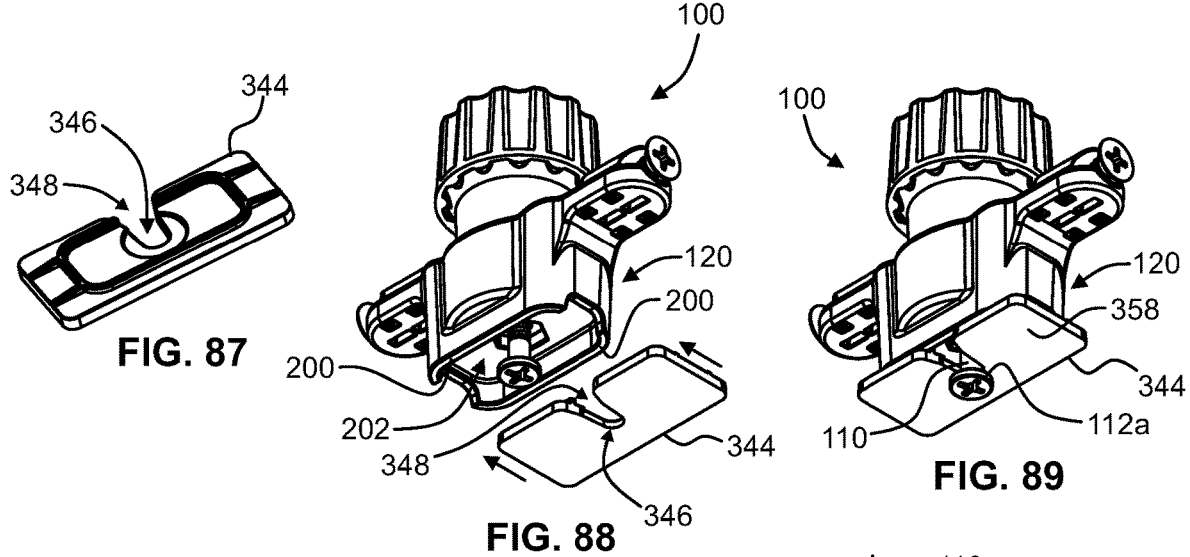
FIG. 87 is a diagrammatic perspective view of one example channel adapter for use in remedying the operating condition such as described above with regard to FIG. 86
FIG. 88 is a diagrammatic perspective view of the example channel adapter of FIG. 87 being deployed on one example marking apparatus described herein, wherein the channel adapter includes a shank slot for laterally receiving a shank portion of the post element and guiding it into a shank relief aperture.
FIG. 89 is a diagrammatic perspective view similar to that of FIG. 88, but wherein the shank portion of the post element extends through the shank relief aperture of the channel adapter, and the head portion of the post element has a head diameter smaller than the shank relief aperture so as to allow the head portion to resiliently secure the channel adapter in releasable securement across the hardware relief channel of the object retention element.
Figures 90, 91:
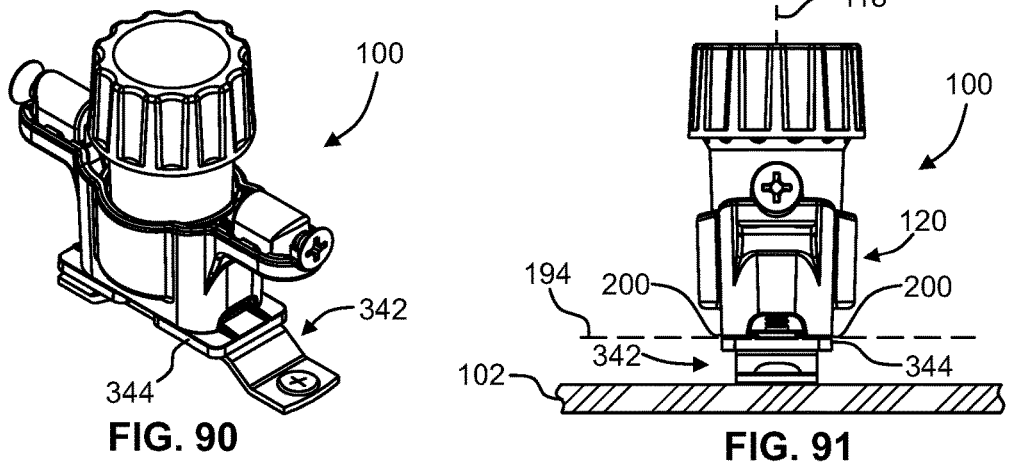
FIG. 90 is a diagrammatic perspective view illustrating the marking apparatus shown in FIG. 86 grippingly attached to the keyhole hardware element shown in FIG. 86, but wherein the channel adapter has been deployed on the marking apparatus so as to prevent portions of the keyhole hardware element from being asymmetrically received by the hardware relief channel.
FIG. 91 is a diagrammatic perspective view similar to FIG. 86, but wherein a channel adapter prevents the hardware relief channel from asymmetrically receiving a portion of the hardware element, thereby allowing the marking apparatus to remain orthogonal to the object's surface.
Figure 92:
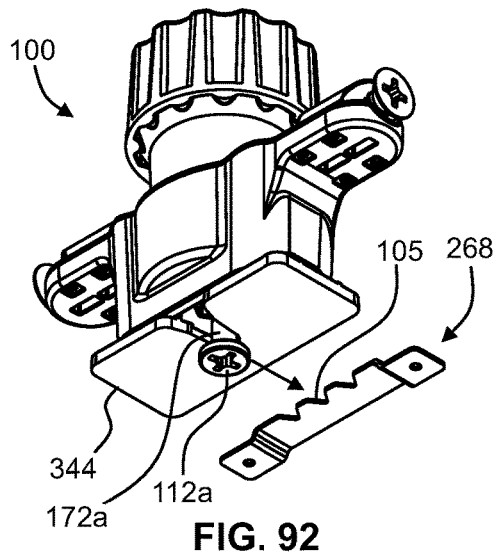
FIG. 92 is a diagrammatic perspective view illustrating an example marking apparatus with channel adapter deployed thereon, wherein the marking apparatus is being grippingly attached to a sawtooth hanger hardware element.
Figure 93:
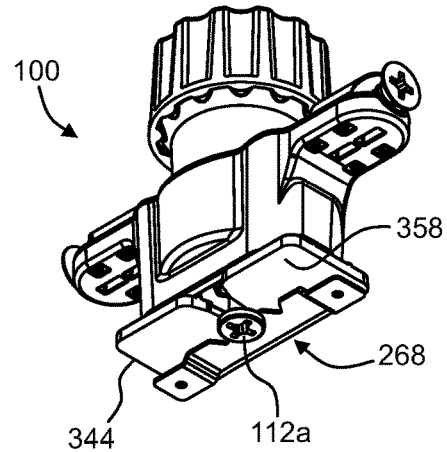
FIG. 93 is a diagrammatic perspective view similar to FIG. 92, but wherein the marking apparatus with deployed channel adapter is grippingly attached to the sawtooth hanger hardware element.

Referring to FIGS. 88 and 89, in certain embodiments of a marking apparatus 100 with a channel adapter 344, the releasable securement of the channel adapter 344 may be by way of clamping of the channel adapter 344 between the object retention element 120 and the head portion 112*a* on the shaft member of the post element 110. In particular such embodiments, the channel adapter 344 may include a shank slot 348 extending from a lateral edge to the shank relief aperture 346.

Figures 85, 86:
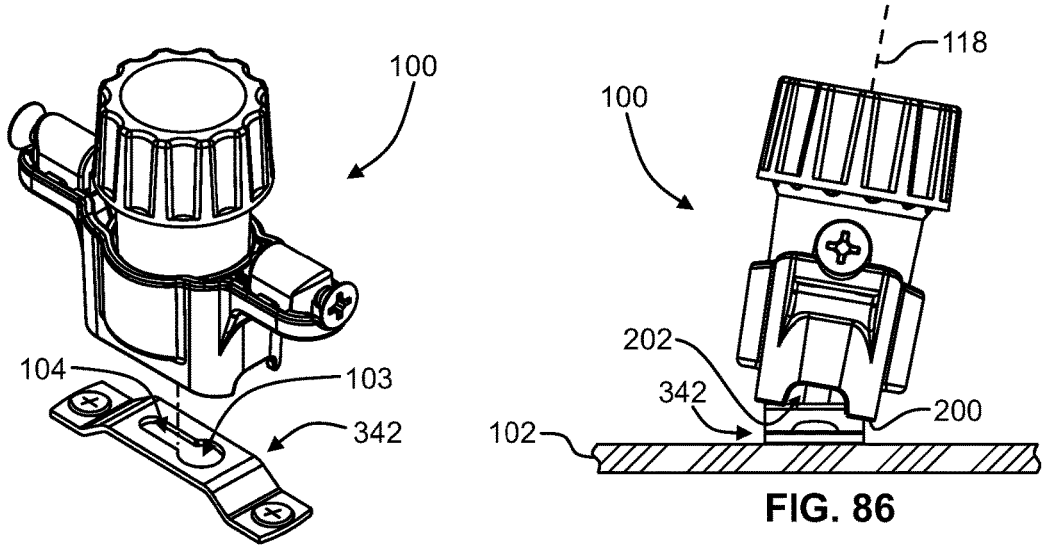
FIG. 85 is a diagrammatic perspective view of one embodiment of a marking apparatus being installed on a keyhole hardware element affixed to an object to be mounted.
FIG. 86 is a diagrammatic end view of the embodiment of a marking apparatus shown in FIG. 85, illustrating a potential operating condition in which the size and shape of a particular keyhole hardware element may result in the hardware relief channel asymmetrically receiving a portion of the hardware element, thereby preventing the apparatus from sitting orthogonally to the object's surface.

With regard to the development of the channel adapter 344, the offset portions 200 and hardware relief channel 202 of particular embodiments of a marking apparatus 100 allow the apparatus to be used with the most common add-on keyhole hardware element types. There are less common add-on applications, however, where the hardware geometry may benefit from some adaptation of such marking apparatuses in order to mount the apparatus orthogonally to the object surface. One example of the potential need for such occasional adaptation is illustrated in FIG. 86, which shows a potential operating condition in which the size and shape of a particular keyhole hardware element may result in the hardware relief channel asymmetrically receiving a portion of the hardware element, thereby preventing the apparatus from sitting orthogonally to the object's surface. The provision of a channel adapter 344 to cover or plug the hardware relief channel 202 as disclosed herein remedies this condition, without forcing the user to resort to using shims or other inconvenient adaptations.

The following listing correlates certain terminology used within this disclosure with corresponding reference numbers used in certain non-limiting embodiments illustrated in the several figures. To the extent that any description in this specification contradicts items in this listing, the description of the specification will control.

100 marking apparatus
102 object
103 fastener head opening/aperture
104 slide mount slot, fastener slot (e.g., keyhole or other configuration)
105 mounting lip
106 fastener/bracket
107 fastener head/T-screw
108 mounting surface
110 post element
111*a* first head adapter
111*b* second head adapter
111*c* third head adapter
112*a* first head portion
112*b* second head portion
112*c* third head portion
112*d* head portion (cleat-engagement-type 1)
112*e* head portion (cleat-engagement-type 2)
112*f* head portion (cleat-engagement-type 3)

112g head portion (adjustable type)
113 stamp element
114 marking end (marking tip)
115 retention screw
116 shaft member
118 main axis
120 object retention element
122 alignment boss
124 finger grip portions
126 spring element (e.g., compression spring)
128 lip groove, annular slot
130a first inner face, inboard surface
130b second inner face, inboard surface
130c third inner face, inboard surface
130d inner face of head portion (cleat-engagement-type 1)
130e inner face of head portion (cleat-engagement-type 2)
130f inner face of head portion (cleat-engagement-type 3)
130g inner face of head portion (adjustable type)
132 cover element
134 shaft aperture
136 surface engagement portion
138 tip chamber
140 spring shroud
142 tightening element
144 main bore (e.g., threaded)
146 first torque detent
148 second torque detent
150 cover retention element
152a first spring interface washer
152b second spring interface washer
154 marking patch, deposited mark
156 spring groove/recess
157 cap element
158 marking substance (e.g., ink or viscous marking substance; e.g., various colors)
159 marking substance pad
160 local planar surface
162 recess
168 keyhole hardware element
169 T-screw security hanger hardware element
170 alignment bore
172a first shank portion
172b second shank portion
172c third shank portion
174 bore proximal end
176 bore distal end
177 slot closed end
178 axial detent portion
180a first outer face
180b second outer face
180c third outer face
182 slot alignment boss
184 gap distance
186 gripping force
190 rotational detent portion
192 threaded insert (e.g., metallic/brass)
194 object reference plane
196 longitudinal axis
198 transverse axis
200 offset portions
202 hardware relief channel
204 relief cut
206 relief notch
208 head distance
210 rotational detent face/section
212 head adapter fixture
213 fixture base portion
214 fixture close-out element
215 threaded fixture bore
216 head length
217 cantilever snaps
262 slot-securable point marking tool
264 cleat hardware element (object side)
266 cleat hardware element (wall side)
268 sawtooth hanger hardware element
270 head mounting pin
272 rotation lock fastener
274 pin aperture
276 pin saddle
278 lip alignment detent
280 lip relief groove
282 cleat relief edge
284 head retraction relief
286 lip offset relief
288 grip angle
290 first arm portion
292 second arm portion
294 base end
296 slot-engagement end
298 insertion guide lip
300 lateral guide portion
302 marking point element
304 hardware insertion detent
306 point axis
308 tool axis
310 slot alignment protuberance
312 point-mounting protuberance
314 point element access port
316 guide leading edge
318 guide lateral edges
320 tool mouth
322 magnetic slot-securable point marking tool
324 base wall
326 offset portion
328 relief notch
330 magnetic element
332 transition edge
334 tool plane
336 relief width
338 head width
340 nose end
342 keyhole hardware element (further type)
344 channel adapter
346 shank relief aperture
348 shank slot
350 adaptor friction element (e.g., elastomeric ring)
352 adaptor magnet element
354 retention magnet element
356 friction offset member (e.g., metal washer)
358 outboard face While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A marking apparatus for facilitating blind mounting of an object to a mounting surface in a desired alignment using the object as an alignment template, the apparatus comprising:

(a) a post element including a shaft member, a marking end and a first head adapter, the shaft member having a rotational detent portion, the first head adapter having a first head portion and a first shank portion, the first head adapter being configured to be placed in releasable engagement with the shaft member by way of the first shank portion whereby the post element extends from the first head portion to the marking end along a main axis;
(b) an object retention element having an alignment bore extending along the main axis between a bore proximal end and a bore distal end, the alignment bore being in receipt of the post element and including a rotational detent section, the rotational detent section being configured to engage the rotational detent portion to restrict relative rotation between the shaft member and the object retention element about the main axis, the object retention element being movable with respect to the post element along the main axis between a closed position, an open position, and a gripping position therebetween wherein:
  (i) movement of the object retention element from the closed position to the open position results in the expansion of a lip groove for receiving a mounting lip of an object, the lip groove being at least partially defined by a gap distance between the first head portion and the bore proximal end, and
  (ii) movement of the object retention element from the open position to the gripping position reduces the gap distance for imposing onto the mounting lip a gripping force by the first head portion toward the bore proximal end;
(c) a tightening element threadedly transportable along the shaft member between a release position and a lock position, thereby being configured to:
  (i) when in the release position, allow movement of the object retention element between the closed position and the open position,
  (ii) when in the lock position, prevent movement of the object retention element from the gripping position toward the open position, and
  (iii) enable adjustability of the gripping force; and
(d) a cover element configured to engage the tightening element to restrict relative rotational movement therebetween about the main axis while enabling relative axial movement therebetween along the main axis.

2. A marking apparatus as defined in claim 1 wherein
(a) a head distance is defined between the first head portion and the shaft member,
(b) the releasable engagement is a threaded engagement enabling the head distance to be adjusted by relative rotation between the shaft member and the first head adapter.

3. A marking apparatus as defined in claim 2 wherein the shaft member is comprised of a polymer and includes a metallic threaded insert by which the first head adapter is in said threaded engagement with the shaft member.

4. A marking apparatus as defined in claim 1 further comprising a second head adapter including a second head portion and a second shank portion, the second head adapter being configured to be placed in said releasable engagement with the shaft member in substitution of the first head adapter, whereby the second head portion substitutes for the first head portion and the second shank portion substitutes for the first shank portion.

5. A marking apparatus as defined in claim 4 wherein
(a) the first head portion includes a first inner face and a first outer face, the first inner face being disposed between the first outer face the first shank portion, the first inner face extending radially of the first shank portion in flat-planar fashion, and
(b) the second head portion includes a second inner face and a second outer face, the second inner face being disposed between the second outer face the second shank portion, the second inner face being conically tapered with respect to the second shank portion.

6. A marking apparatus as defined in claim 5 further comprising a third head adapter including a third head portion and a third shank portion, the third head adapter being configured to be placed in said releasable engagement with the shaft member in substitution of the first head adapter, whereby the third head portion substitutes for the first head portion and the third shank portion substitutes for the first shank portion, wherein
(a) the third head portion includes a third inner face and a third outer face, the third inner face being disposed between the third outer face the third shank portion, the third inner face being conically tapered with respect to the third shank portion, and
(b) the third shank portion is longer than the second shank portion.

7. A marking apparatus as defined in claim 4 wherein the releasable engagement is a threaded engagement.

8. A marking apparatus as defined in claim 4 wherein
(a) the releasable engagement is a threaded engagement,
(b) the object retention element includes finger grip portions extending radially of the main axis, and
(c) at least one of the finger grip portions includes a head adapter fixture configured to removably retain a respective said head adapter for storage thereof.

9. A marking apparatus as defined in claim 8 wherein the removable retention is by way of threaded interface between the head adapter fixture and respective shank portion.

10. A marking apparatus as defined in claim 9 wherein
(a) the head adapter fixture includes a threaded fixture bore for threadably receiving the respective shank portion, and
(b) the head adapter fixture includes a fixture close-out element attached to a fixture base portion, the threaded fixture bore being formed therebetween.

11. A marking apparatus as defined in claim 10 wherein the attachment of the fixture close-out element to the fixture base portion is by way of one or more cantilever snaps.

12. A marking apparatus as defined in claim 1 wherein:
(a) the cover element includes a surface engagement portion and is movable with respect to the post element along the main axis between an extended position and a marking position, the cover element being elastically biased toward the extended position;
(b) the surface engagement portion
  (i) extends axially beyond the marking end when the cover element is in the extended position, and
  (ii) is axially aligned with or inward of the marking end when the cover element is in the marking position;
(c) the object retention element is resiliently biased toward the closed position;
(d) the object retention element includes a spring groove; and
(e) the resilient bias and elastic bias are provided by way of a spring element at least partially disposed within the spring groove.

13. A marking apparatus as defined in claim 12 further comprising a first spring interface washer and a second spring interface washer, the first spring interface washer being disposed along the main axis between the spring element and the object retention element, the second spring interface washer being disposed along the main axis between the spring element and the cover element.

14. A marking apparatus as defined in claim 12 wherein the cover element includes a spring shroud extending oppositely of the surface engagement portion, the spring shroud being in at least partial receipt of the spring element and configured to be at least partially received by the spring groove throughout the movement of the cover element between extended and marking positions.

15. A marking apparatus as defined in claim 14 wherein the spring groove and spring shroud are configured to cooperate to fully-envelope the spring element about the main axis throughout the movement of the cover element between extended and marking positions.

16. A marking apparatus as defined in claim 12 wherein the post element includes a cover retention element attached to the shaft portion, wherein
  when the cover retention element is attached to the shaft member, the cover retention element is configured to
    (a) axially retain the cover element on the post element,
    (b) limit the axial distance between the surface engagement portion and the marking end when the cover element is in the extended position, and
    (c) prevent the post element from being removed from the object retention element.

17. A marking apparatus as defined in claim 16 wherein the post element includes a stamp member with the marking end protruding therefrom, the stamp member being removably attached to the cover retention element.

18. A marking apparatus as defined in claim 17 wherein the marking end comprises a cross-shaped protrusion.

19. A marking apparatus as defined in claim 17 wherein the post element includes a threaded fastener configured to extend through the cover retention element and be threadedly received by the shaft member, the threaded fastener thereby attaching the cover retention element to the shaft member.

20. A marking apparatus as defined in claim 16 wherein the post element further includes a friction offset member which is
  (a) disposed between the cover retention element and the tightening element; and
  (b) in engagement with the shaft member in a manner restricting relative rotation between the shaft member and the friction offset member about the main axis.

21. A marking apparatus as defined in claim 1 further comprising a cap element with a marking substance pad disposed therein, wherein
  (a) the cap element is configured to receivingly engage a portion of the cover element, and
  (b) when the cap is in the receiving engagement
    (i) the cap element and the cover element are configured to restrict relative rotation therebetween about the main axis, and
    (ii) the marking substance pad is contactable by the marking end.

22. A marking apparatus as defined in claim 1 wherein the object retention element includes
  (a) an object reference plane defined orthogonally to the main axis and outward of the bore proximal end,
  (b) a first offset portion and a second offset portion, each of which
    (i) extends to and terminates at the object reference plane, and
    (ii) is disposed on opposing sides of the main axis thereby defining a hardware relief channel therebetween.

23. A marking apparatus as defined in claim 22 wherein the offset portions are parallel to one another.

24. A marking apparatus as defined in claim 22 wherein the offset portions are part of a single continuous perimeter wall.

25. A marking apparatus as defined in claim 22 wherein the perimeter wall includes a pair of opposingly disposed hardware relief cuts.

26. A marking apparatus as defined in claim 22, further comprising a channel adapter having an outboard surface and a shank relief aperture, the channel adapter being configured to be releasably secured to the object retention element such that
  (a) the channel adapter extends across the hardware relief channel with the outboard surface being
    (i) parallel to the object reference plane; and
    (ii) flush with or extending outward of the object reference plane; and
  (b) the post element is partially extendable through the shank relief aperture.

27. A marking apparatus as defined in claim 26 wherein the releasable securement is by way of frictional engagement between the channel adapter and the hardware relief channel.

28. A marking apparatus as defined in claim 27 wherein the channel adapter includes an elastomeric adaptor friction element for facilitating the frictional engagement.

29. A marking apparatus as defined in claim 26 wherein the releasable securement is by way of magnetic engagement between the channel adapter and the object retention element.

30. A marking apparatus as defined in claim 26 wherein the releasable securement is by way of clamping of the channel adapter between the object retention element and the head portion on the shaft member.

31. A marking apparatus as defined in claim 30 wherein the channel adapter includes a shank slot extending from a lateral edge to the shank relief aperture.

32. A marking apparatus as defined in claim 1 wherein the alignment bore includes an axial detent portion configured to limit axial movement of the shaft member in a retraction direction from the bore proximal end toward the bore distal end.

33. A marking apparatus as defined in claim 32 wherein the limitation of axial movement is by way of engagement between the axial detent portion and the rotational detent member.

34. A marking apparatus for facilitating blind mounting of an object to a mounting surface in a desired alignment using the object as an alignment template, the apparatus comprising:
  (a) a post element including a shaft member, a marking end and a first head adapter, the shaft member having a rotational detent portion, the first head adapter having a first head portion and a first shank portion, the first head adapter being configured to be placed in releasable engagement with the shaft member by way of the first shank portion whereby the post element extends from the first head portion to the marking end along a main axis;
  (b) an object retention element having an alignment bore extending along the main axis between a bore proximal end and a bore distal end, the alignment bore being in receipt of the post element and including a rotational detent section, the rotational detent section being configured to engage the rotational detent portion to restrict relative rotation between the shaft member and the object retention element about the main axis, the object retention element being movable with respect to the post element along the main axis between a closed position, an open position, and a gripping position therebetween wherein:
  (i) movement of the object retention element from the closed position to the open position results in the expansion of a lip groove for receiving a mounting lip of an object, the lip groove being at least partially defined by a gap distance between the first head portion and the bore proximal end, and
  (ii) movement of the object retention element from the open position to the gripping position reduces the gap distance for imposing onto the mounting lip a gripping force by the first head portion toward the bore proximal end;
(c) a tightening element transportable along the shaft member between a release position and a lock position, thereby being configured to:
  (i) when in the release position, allow movement of the object retention element between the closed position and the open position,
  (ii) when in the lock position, prevent movement of the object retention element from the gripping position toward the open position, and
  (iii) enable adjustability of the gripping force; and
(d) a cover element configured to engage the tightening element to enable relative axial movement therebetween along the main axis.

35. A marking apparatus as defined in claim 34 wherein:

(a) the transportability of the tightening element being threaded transportability; and
(b) the cover element is configured to engage the tightening element to restrict relative rotational movement therebetween about the main axis.

\* \* \* \* \*